(12) United States Patent
Russo et al.

(10) Patent No.: US 12,070,694 B2
(45) Date of Patent: *Aug. 27, 2024

(54) SYSTEMS AND METHODS FOR TRAINING AND APPLYING VIRTUAL OCCURRENCES TO A VIRTUAL CHARACTER USING TELEMATICS DATA OF ONE OR MORE REAL TRIPS

(71) Applicant: BlueOwl, LLC, San Francisco, CA (US)

(72) Inventors: Micah Wind Russo, Oakland, CA (US); Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,301

(22) Filed: Apr. 25, 2023

(65) Prior Publication Data
US 2023/0256344 A1    Aug. 17, 2023

Related U.S. Application Data

(63) Continuation of application No. 17/867,834, filed on Jul. 19, 2022, now Pat. No. 11,691,084, which is a
(Continued)

(51) Int. Cl.
*A63F 13/42*        (2014.01)
*A63F 13/216*       (2014.01)
(Continued)

(52) U.S. Cl.
CPC ............ *A63F 13/69* (2014.09); *A63F 13/216* (2014.09); *A63F 13/42* (2014.09); *A63F 13/428* (2014.09);
(Continued)

(58) Field of Classification Search
CPC ........ A63F 13/69; A63F 13/216; A63F 13/42; A63F 13/428; A63F 13/65; A63F 13/67;
(Continued)

(56) References Cited

U.S. PATENT DOCUMENTS

| | | | |
|---|---|---|---|
| 2014/0128146 A1* | 5/2014 | Story, Jr. ................. | A63F 13/00 463/36 |
| 2014/0195272 A1* | 7/2014 | Sadiq ..................... | G06Q 40/08 705/4 |

(Continued)

*Primary Examiner* — Thomas H Henry
(74) *Attorney, Agent, or Firm* — BRYAN CAVE LEIGHTON PAISNER LLP

(57) ABSTRACT

Method and system for training a virtual character of a telematics-based game. In some examples, a computer-implemented method includes: determining, based at least in part upon telematics data, a plurality of skill points associated with a plurality of real skills exhibited by the user during the one or more real trips; training a virtual character by at least updating, based at least in part upon the plurality of skill points, the plurality of virtual ratings; generating, based at least in part upon the character profile, one or more virtual occurrences to be encountered by the virtual character; determining, based at least in part upon the updated plurality of virtual ratings, one or more outcomes associated with the one or more virtual occurrences; updating the character profile by at least applying the one or more virtual occurrences based on the associated one or more outcomes to the virtual character.

22 Claims, 34 Drawing Sheets

Related U.S. Application Data continuation of application No. PCT/US2021/013911, filed on Jan. 19, 2021.

(60) Provisional application No. 62/963,332, filed on Jan. 20, 2020.

(51) Int. Cl.
*A63F 13/428* (2014.01)
*A63F 13/65* (2014.01)
*A63F 13/67* (2014.01)
*A63F 13/69* (2014.01)
*A63F 13/798* (2014.01)
*A63F 13/803* (2014.01)
*A63F 13/825* (2014.01)

(52) U.S. Cl.
CPC .............. *A63F 13/65* (2014.09); *A63F 13/67* (2014.09); *A63F 13/798* (2014.09); *A63F 13/803* (2014.09); *A63F 13/825* (2014.09); *A63F 2300/205* (2013.01); *A63F 2300/69* (2013.01); *A63F 2300/8017* (2013.01)

(58) Field of Classification Search
CPC .... A63F 13/798; A63F 13/803; A63F 13/825; A63F 2300/205; A63F 2300/69; A63F 2300/8017

See application file for complete search history.

(56) References Cited

U.S. PATENT DOCUMENTS

| | | | | |
|---|---|---|---|---|
| 2014/0322676 | A1* | 10/2014 | Raman | G09B 19/167 434/65 |
| 2015/0112504 | A1* | 4/2015 | Binion | G07C 5/008 701/1 |
| 2015/0178998 | A1* | 6/2015 | Attard | G07C 5/008 701/23 |
| 2016/0003636 | A1* | 1/2016 | Ng-Thow-Hing | G01C 21/365 701/418 |

* cited by examiner

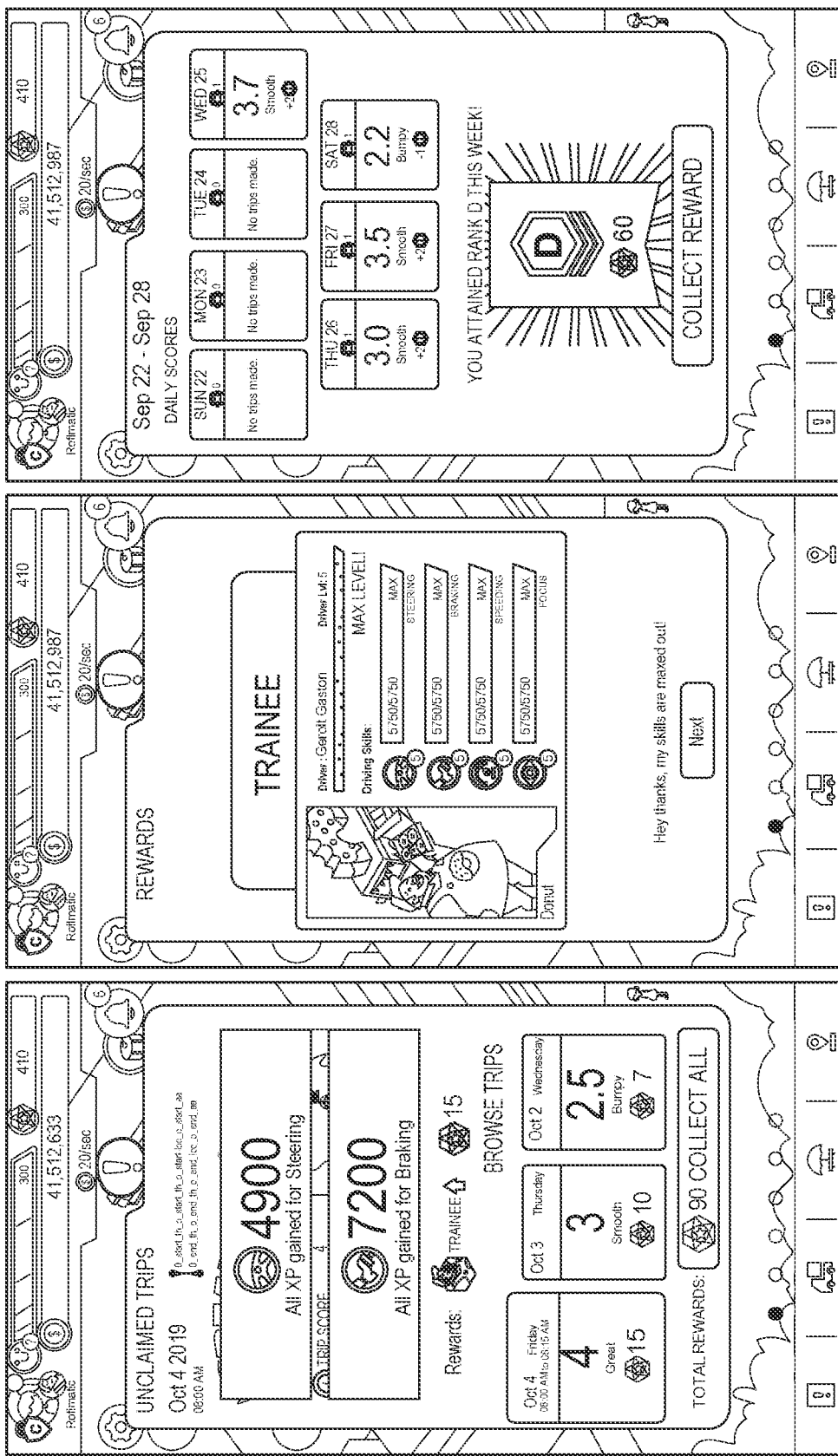

SYSTEMS AND METHODS FOR TRAINING AND APPLYING VIRTUAL OCCURRENCES TO A VIRTUAL CHARACTER USING TELEMATICS DATA OF ONE OR MORE REAL TRIPS

CROSS-REFERENCES TO RELATED APPLICATIONS

This application is a continuation of and claims priority to U.S. patent application Ser. No. 17/867,834 filed Jul. 19, 2022, which is a continuation of and claims priority to PCT Application No. PCT/US2021/013911 filed Jan. 19, 2021, which claims priority to U.S. Patent Application No. 62/963,332 filed Jan. 20, 2020, all of which are incorporated by reference herein for all purposes.

U.S. patent application Ser. No. 16/206,063 and U.S. patent application Ser. No. 16/205,989 are incorporated by reference herein for all purposes.

The following four applications, including this one, are being filed concurrently and the other three are hereby incorporated by reference in their entirety for all purposes:
1. International PCT Application No. PCT/US2021/013911, titled "Systems and Methods for Training and Applying Virtual Occurrences to a Virtual Character Using Telematics Data of One or More Real Trips";
2. International PCT Application No. PCT/US2021/013918, titled "Systems and Methods for Training and Applying Virtual Occurrences to a Virtual Character Using Telematics Data of One or More Real Trips in Real-Time";
3. International PCT Application No. PCT/US2021/013928, titled "Systems and Methods for Training and Applying Virtual Occurrences with Modifiable Outcomes to a Virtual Character Using Telematics Data of One or More Real Trips"; and
4. International PCT Application No. PCT/US2021/013930, titled "Systems and Methods for Training and Applying Virtual Occurrences and Granting In-Game Resources to a Virtual Character Using Telematics Data of One or More Real Trips".

FIELD OF THE DISCLOSURE

Some embodiments of the present disclosure are directed to virtual vehicle operation in a virtual environment. More particularly, certain embodiments of the present disclosure provide systems and methods for training and applying virtual occurrences to a virtual character using telematics data of one or more real trips. Merely by way of example, the present disclosure has been applied to vehicle operation in a vehicle environment, but it would be recognized that the present disclosure has much broader range of applicability.

BACKGROUND

Individuals frequently operate or otherwise travel in vehicles, where vehicular safety is consistently of paramount importance. While individuals generally exercise care while operating vehicles, because vehicular accidents are relatively rare, it may be psychologically difficult for many vehicle operators to appreciate the risks that vehicular operation still pose, and the vehicle operators may not be readily mindful of or accepting of reducing these risks. Accordingly, there is an opportunity for technologies directed to increasing vehicular safety by increasing a vehicle operator's appreciation and awareness of risks posed by vehicle operation. For at least the foregoing reasons, there is a need for systems and methods for training a virtual character using telematics data of one or more completed trips of a driver to motivate adjustments and improvements in the driver's operational behaviors.

BRIEF SUMMARY OF THE DISCLOSURE

Some embodiments of the present disclosure are directed to virtual vehicle operation in a virtual environment. More particularly, certain embodiments of the present disclosure provide systems and methods for training and applying virtual occurrences to a virtual character using telematics data of one or more real trips. Merely by way of example, the present disclosure has been applied to vehicle operation in a vehicle environment, but it would be recognized that the present disclosure has much broader range of applicability.

According to various embodiments, a computer-implemented method for training a virtual character of a telematics-based game includes: receiving telematics data associated with one or more real trips during which a user operated a real vehicle; determining, based at least in part upon the telematics data, a plurality of skill points associated with a plurality of real skills exhibited by the user during the one or more real trips; receiving, from the user, a selection of a virtual character, the virtual character having a character profile and a plurality of virtual ratings associated with a plurality of virtual skills; training the virtual character by at least updating, based at least in part upon the plurality of skill points, the plurality of virtual ratings; generating, based at least in part upon the character profile, one or more virtual occurrences to be encountered by the virtual character; determining, based at least in part upon the updated plurality of virtual ratings, one or more outcomes associated with the one or more virtual occurrences; updating the character profile by at least applying the one or more virtual occurrences based on the associated one or more outcomes to the virtual character; and presenting the updated character profile to the user.

According to various embodiments, a system for training a virtual character of a telematics-based game includes: a data receiving module configured to receive telematics data associated with one or more real trips during which a user operated a real vehicle; a skill point determining module configured to determine, based at least in part upon the telematics data, a plurality of skill points associated with a plurality of real skills exhibited by the user during the one or more real trips; a user input module configured to receive, from the user, a selection of a virtual character, the virtual character having a character profile and a plurality of virtual ratings associated with a plurality of virtual skills; a character training module configured to train the virtual character by at least updating, based at least in part upon the plurality of skill points, the plurality of virtual ratings; a virtual occurrence generating module configured to generate, based at least in part upon the character profile, one or more virtual occurrences to be encountered by the virtual character; an outcome determining module configured to determine, based at least in part upon the updated plurality of virtual ratings, one or more outcomes associated with the one or more virtual occurrences; a character profile updating module configured to update the character profile by at least applying the one or more virtual occurrences based on the associated one or more outcomes to the virtual character; and a presenting module configured to present the updated character profile to the user.

According to various embodiments, a non-transitory computer-readable medium with instructions stored thereon, that upon execution by a processor, causes the processor to perform: receiving telematics data associated with one or more real trips during which a user operated a real vehicle; determining, based at least in part upon the telematics data, a plurality of skill points associated with a plurality of real skills exhibited by the user during the one or more real trips; receiving, from the user, a selection of a virtual character, the virtual character having a character profile and a plurality of virtual ratings associated with a plurality of virtual skills; training the virtual character by at least updating, based at least in part upon the plurality of skill points, the plurality of virtual ratings; generating, based at least in part upon the character profile, one or more virtual occurrences to be encountered by the virtual character; determining, based at least in part upon the updated plurality of virtual ratings, one or more outcomes associated with the one or more virtual occurrences; updating the character profile by at least applying the one or more virtual occurrences based on the associated one or more outcomes to the virtual character; and presenting the updated character profile to the user.

Depending upon the embodiment, one or more benefits may be achieved. These benefits, features, and advantages of the present disclosure can be fully appreciated with reference to the detailed description and accompanying drawings that follow.

BRIEF DESCRIPTION OF THE DRAWINGS

FIGS. 7A-34 are simplified diagrams showing interfaces associated with various functionalities according to various embodiments of the present disclosure.

DETAILED DESCRIPTION OF THE DISCLOSURE

Some embodiments of the present disclosure are directed to virtual vehicle operation in a virtual environment. More particularly, certain embodiments of the present disclosure provide systems and methods for training and applying virtual occurrences to a virtual character using telematics data of one or more real trips. Merely by way of example, the present disclosure has been applied to vehicle operation in a vehicle environment, but it would be recognized that the present disclosure has much broader range of applicability.

Figure 1:
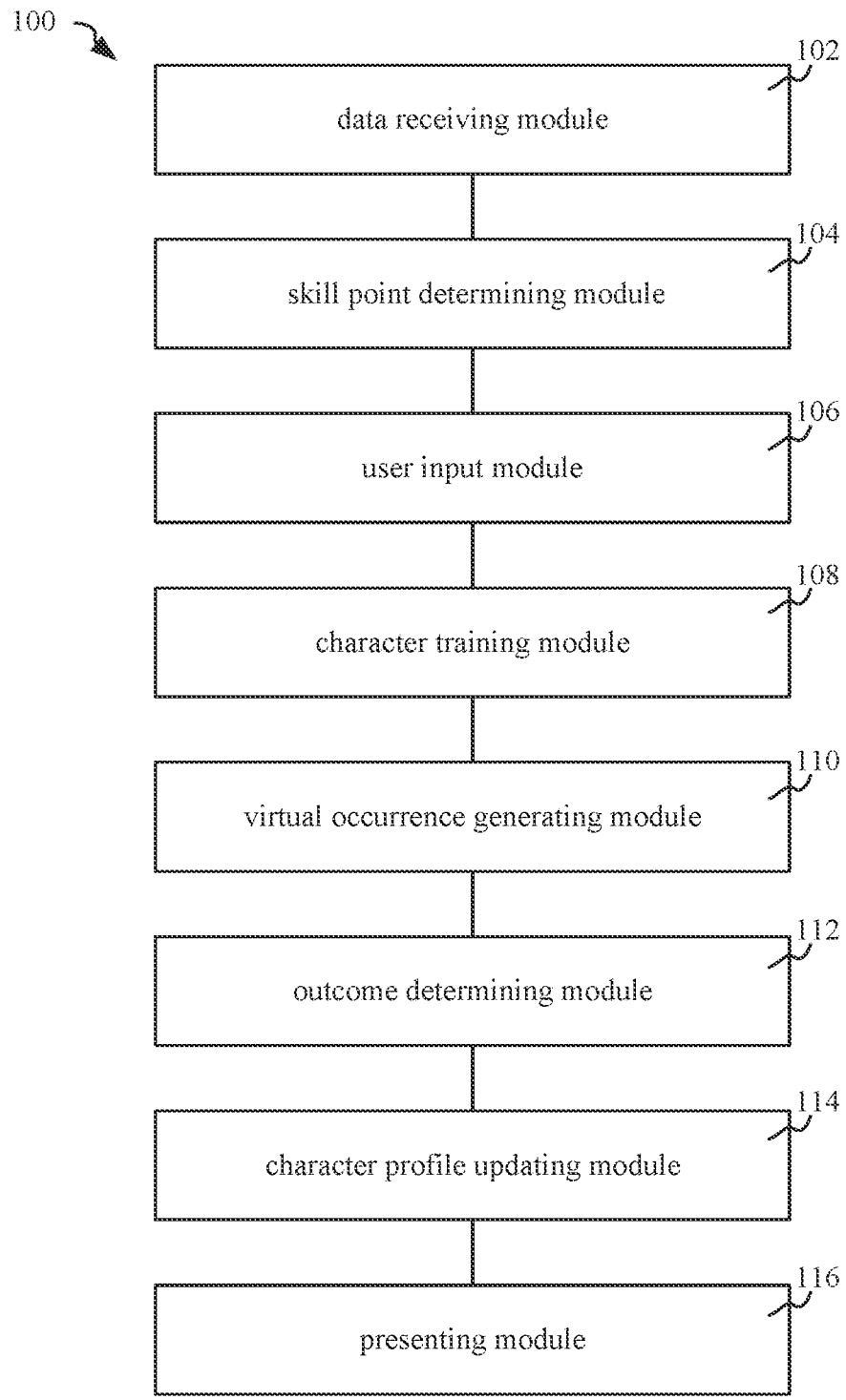
FIG. 1 is a simplified diagram showing a system for training a virtual operator according to various embodiments of the present disclosure.

One or More Systems for Training a Virtual Character According to Various Embodiments FIG. 1 is a simplified diagram showing a system 100 for training a virtual character of a telematics-based game, according to various embodiments of the present disclosure. This diagram is merely an example, which should not unduly limit the scope of the claims. One of ordinary skill in the art would recognize many variations, alternatives, or modifications. In some examples, the system 100 includes a data receiving module 102, a skill point determining module 104, a user input module 106, a character training module 108, a virtual occurrence generating module 110, an outcome determining module 112, a character profile updating module 114, and a presenting module 116. In certain examples, the system 100 is configured to implement method 200 of FIG. 2. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the data receiving module 102 is configured to receive telematics data, such as to receive telematics data associated with one or more real trips, such as to receive telematics data associated with one or more real trips during which a user operated a real vehicle. In certain examples, the one or more real trips are travelled in the real world.

In various embodiments, the skill point determining module 104 is configured to determine, such as based at least in part upon the telematics data, a plurality of skill points. In some examples, the plurality of skill points is associated with a plurality of real skills exhibited by the user during the one or more real trips.

In various embodiments, the user input module 106 is configured to receive, such as from the user, a selection of a virtual character, such as from a plurality of selectable virtual characters. In some examples, the virtual character has a character profile and a plurality of virtual ratings associated with a plurality of virtual skills.

In various embodiments, the character training module 108 is configured to train the virtual character, such as by at least updating, such as based at least in part upon the plurality of skill points, the plurality of virtual ratings. In some examples, the character training module 108 is configured to update, such as based at least in part upon the plurality of skill points, a plurality of fill-levels corresponding to the plurality of virtual skills. In certain examples, the character training module 108 is configured to increase one or more virtual ratings of the plurality of virtual ratings upon any of the fill-levels of the plurality of fill-levels exceeding one or more predetermined fill targets.

In various embodiments, the virtual occurrence generating module 110 is configured to generate, such as based at least in part upon the character profile, one or more virtual occurrences. In various examples, the one or more virtual occurrences are to be encountered by the virtual character, in the telematics-based game. In some examples, the virtual occurrence generating module 110 is configured to generate the one or more virtual occurrences based further in part upon one or more unlocked regions of a virtual map of the telematics-based game. In certain examples, each virtual occurrence of the one or more virtual occurrences includes one or more virtual obstacles to be encountered by the virtual character. In certain examples, each virtual occurrence of the one or more virtual occurrences includes a steering difficulty corresponding to one or more virtual steering obstacles, a braking difficulty corresponding to one or more virtual braking obstacles, a speeding difficulty corresponding to one or more virtual speeding obstacles, and/or a focus difficulty corresponding to one or more virtual focus obstacles. In certain examples, the plurality of real skills includes a real steering skill, a real braking skill, a real speeding skill, and/or a real focus skill. In certain examples, the plurality of virtual skills includes a virtual steering skill, a virtual braking skill, a virtual speeding skill, and/or a virtual focus skill.

In various embodiments, the outcome determining module 112 is configured to determine, such as based at least in part upon the updated plurality of virtual ratings, one or more outcomes associated with the one or more virtual occurrences. In certain examples, each outcome of the one or more outcomes correspond to a likelihood of success of the virtual character overcoming the one or more virtual obstacles in each virtual occurrence of the one or more virtual occurrences. In some examples, the outcome determining module 112 is configured to determine the one or more outcomes based at least in part upon a plurality of occurrence difficulties and the plurality of virtual ratings corresponding to the plurality of virtual skills. In various examples, the plurality of occurrence difficulties includes a steering difficulty associated with one or more virtual steering obstacles, a braking difficulty associated with one or more virtual braking obstacles, a speeding difficulty associated with one or more virtual speeding obstacles, and/or a focus difficulty associated with one or more virtual focus obstacles. In various examples, the plurality of virtual ratings includes a virtual steering rating of a virtual steering skill, a virtual braking rating of a virtual braking skill, a virtual speeding rating of a virtual speeding skill, and/o a virtual focus rating of a virtual focus skill.

In various embodiments, the character profile updating module 114 is configured to update the character profile, such as by at least applying the one or more virtual occurrences based on the associated one or more outcomes to the virtual character. In some examples, the character profile updating module 114 is configured to update a vehicle condition of a virtual vehicle associated with the virtual character. In certain examples, the vehicle condition is indicative of a degree of damage sustained by the virtual vehicle during the one or more virtual occurrences based on the associated one or more outcomes.

In various embodiments, the presenting module 116 is configured to present the updated character profile to the user. In some examples, the presenting module 116 is configured to present the updated vehicle condition of the virtual vehicle to the user.

Figure 2:
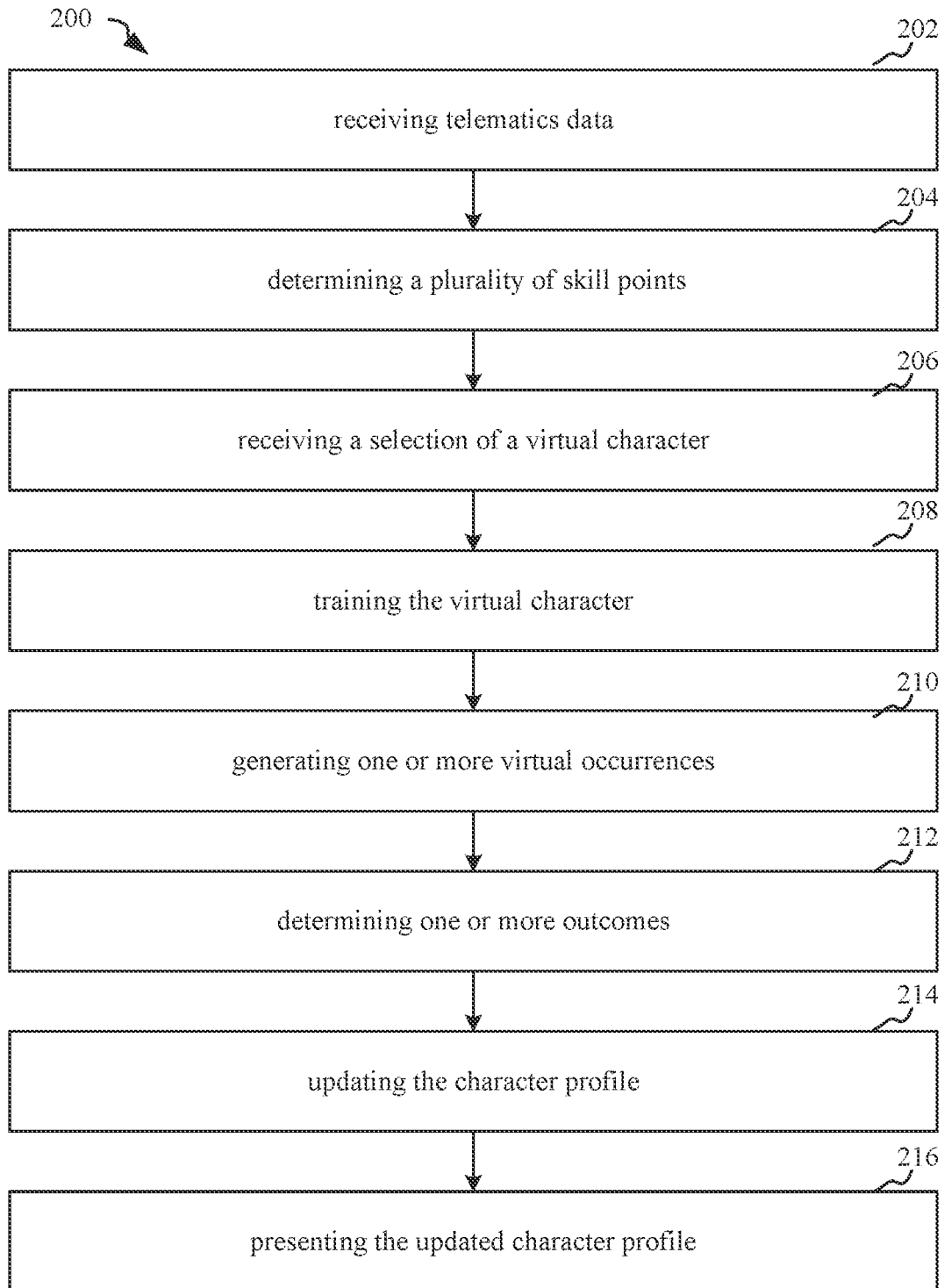
FIG. 2 is a simplified diagram showing a method for training a virtual operator according to various embodiments of the present disclosure.

One or More Methods for Training a Virtual Character According to Various Embodiments FIG. 2 is a simplified method 200 for training a virtual character, according to various embodiments of the present disclosure. This diagram is merely an example, which should not unduly limit the scope of the claims. One of ordinary skill in the art would recognize many variations, alternatives, and modifications. The method 200 includes a process 202 of receiving telematics data, a process 204 of determining a plurality of skill points, a process 206 of process 206 of receiving a selection of a virtual character, a process 208 of training the virtual character, a process 210 of generating one or more virtual occurrences, a process 212 of determining one or more outcomes, a process 214 of updating the character profile, and a process 216 of presenting the updated character profile. In certain examples, the method 200 is configured to be implemented by system 100 of FIG. 1. Although the above has been shown using a selected group of processes for the method, there can be many alternatives, modifications, and variations. In some examples, some of the processes may be expanded and/or combined. Other processes may be inserted to those noted above. Depending upon the embodiment, the sequence of processes may be interchanged with others replaced. In some examples, some or all processes of the method are performed by a computing device or a processor directed by instructions stored in memory. As an example, some or all processes of the method are performed according to instructions stored in a non-transitory computer-readable medium.

In various embodiments, the process 202 of receiving telematics data includes receiving telematics data associated with one or more real trips during which a user operated a real vehicle.

In various embodiments, the process 204 of determining a plurality of skill points includes determining, based at least in part upon the telematics data, a plurality of skill points associated with a plurality of real skills exhibited by the user during the one or more real trips.

In various embodiments, the process 206 of receiving a selection of a virtual character includes receiving, from the user, a selection of a virtual character, the virtual character. In some examples, the virtual character includes a character profile and a plurality of virtual ratings associated with a plurality of virtual skills. In certain examples, the plurality of real skills includes a real steering skill, a real braking skill, a real speeding skill, and/or a real focus skill. In certain examples, the plurality of virtual skills includes a virtual steering skill, a virtual braking skill, a virtual speeding skill, and/or a virtual focus skill.

In various embodiments, the process 208 of training the virtual character includes training the virtual character by at least updating, based at least in part upon the plurality of skill points, the plurality of virtual ratings. In some embodiments, the process 208 of training the virtual character includes: updating, based at least in part upon the plurality of skill points, a plurality of fill-levels corresponding to the plurality of virtual skills. In some examples, the process 208 of training the virtual character further includes increasing one or more virtual ratings of the plurality of virtual ratings upon any of the fill-levels of the plurality of fill-levels exceeding one or more predetermined fill targets.

In various embodiments, the process 210 of generating one or more virtual occurrences includes generating, based at least in part upon the character profile, one or more virtual occurrences to be encountered by the virtual character. In certain examples, each virtual occurrence of the one or more virtual occurrences includes one or more virtual obstacles to be encountered by the virtual character. In certain examples, each virtual occurrence of the one or more virtual occurrences includes a steering difficulty corresponding to one or more virtual steering obstacles, a braking difficulty corresponding to one or more virtual braking obstacles, a speeding difficulty corresponding to one or more virtual speeding obstacles, and/or a focus difficulty corresponding to one or more virtual focus obstacles. In some examples, the process 210 of generating the one or more virtual occurrences includes generating the one or more virtual occurrences based further in part upon one or more unlocked regions of a virtual map of the telematics-based game.

In various embodiments, the process 212 of determining one or more outcomes includes determining, based at least in part upon the updated plurality of virtual ratings, one or more outcomes associated with the one or more virtual occurrences. In certain examples, each outcome of the one or more outcomes correspond to a likelihood of success of the virtual character overcoming the one or more virtual obstacles in each virtual occurrence of the one or more virtual occurrences. In some examples, the process 212 of determining the one or more outcomes includes determining the one or more outcomes based at least in part upon the steering difficulty, the braking difficulty, the speeding difficulty, the focus difficulty, a virtual steering rating of the virtual steering skill, a virtual braking rating of the virtual braking skill, a virtual speeding rating of the virtual speeding skill, and/or a virtual focus rating of the virtual focus skill.

In various embodiments, the process 214 of updating the character profile includes updating the character profile by at least applying the one or more virtual occurrences based on the associated one or more outcomes to the virtual character. In some embodiments, the process 214 of updating the character profile includes updating a vehicle condition of a virtual vehicle associated with the virtual character. In some examples, the vehicle condition is indicative of a degree of damage sustained by the virtual vehicle during the one or more virtual occurrences based on the associated one or more outcomes.

In various embodiments, the process 216 of presenting the updated character profile includes presenting the updated character profile to the user. In some examples, the process 216 of presenting the updated character profile includes presenting the updated vehicle condition of the virtual vehicle to the user.

Figure 3:
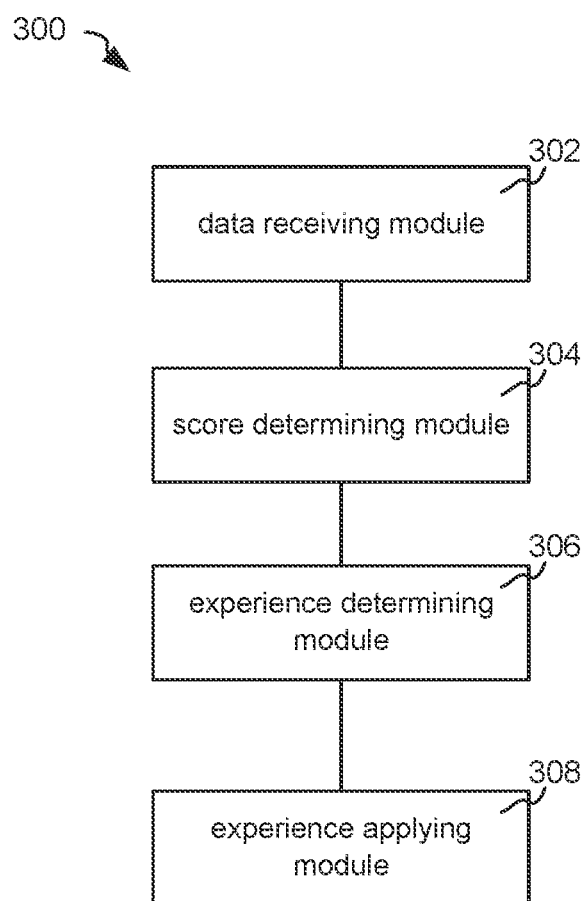
FIG. 3 is a simplified diagram showing a system for training a virtual operator according to various embodiments of the present disclosure.

One or More Systems for Training a Virtual Driver According to Various Embodiments FIG. 3 is a simplified diagram showing a system for training a virtual driver, according to some embodiments. This diagram is merely an example, which should not unduly limit the scope of the claims. One of ordinary skill in the art would recognize many variations, alternatives, and modifications. In some examples, the system 300 includes a data receiving module 302, a score determining module 304, an experience determining module 306, and an experience applying module 308. In certain examples, the system 300 is configured to implement method 400 of FIG. 4. Although the above has been shown using a selected group of components, there can be many alternatives, modifications, and variations. For example, some of the components may be expanded and/or combined. Some components may be removed. Other components may be inserted to those noted above. Depending upon the embodiment, the arrangement of components may be interchanged with others replaced.

In some embodiments, the data receiving module 302 is configured to receive telematics data associated with a real-world driver. In some examples, the data receiving module 302 is configured to receive telematics data associated with one or more real trips during which the real-world driver (e.g., a user or player) operated a real vehicle. In certain examples, the telematics data are collected via one or more sensors associated with the real vehicle and/or with a mobile device associated with the user. In various examples, the telematics data are received in real-time, or in near real-time, with the collection thereof, such as during the commencement of the one or more real trips.

In some embodiments, the score determining module 304 is configured to determine one or more driving scores corresponding to one or more real-world driving characteristics based at least in part upon the telematics data. A characteristic may also be referred to as a trait or a skill. In various examples, the one or more real-world driving characteristics includes a braking characteristic, a steering characteristic, a speeding characteristic, and/or a focus characteristic. In some examples, the braking characteristic corresponds to the real-world driver's ability to decelerate the real vehicle upon encountering braking obstacles, such as T-junctions or pedestrian crossings. In some examples, the steering characteristic corresponds to the real-world driver's ability to steer the real vehicle upon encountering steering obstacles, such as on-road objects (e.g., potholes, road kills) or sharp turns. In some examples, the speeding characteristic corresponds to the real-world driver's ability to decelerate the real vehicle upon encountering speeding obstacles, such as instances of the real vehicle operated by the user is faster than a speed limit. In some examples, the focus characteristic corresponds to the real-world driver's ability to maintain or regain focus while operating the real vehicle upon encountering focus obstacles, such as when the user is about to use their phone.

In some embodiments, the experience determining module 306 is configured to determine one or more virtual experiences for a telematics-based game. A virtual experience may be referred to as a virtual occurrence or virtual event. In some examples, the experience determining module 306 is configured to determine the one or more virtual experiences based in part upon a character profile of a virtual character. For example, the experience determining module 306 is configured to determine the one or more virtual experiences based in part upon a one or more skill ratings (or levels) of a plurality of virtual skills (e.g., steering, braking, speeding, focus), and/or one or more unlocked regions of a virtual game map.

In some embodiments, the experience applying module 308 is configured to apply the one or more virtual experiences to a pre-selected virtual driver to train the virtual driver. In some examples, the experience applying module 308 is configured to initiate the one or more virtual experiences for a virtual character, such as one selected by a user. In various examples, a virtual experience includes a virtual trip, a virtual scene, a virtual occurrence, a virtual event, a virtual incident, a virtual mini-game, and/or a virtual interaction. For example, a virtual trip includes one or more virtual obstacles configured to be encountered by the virtual character, where the virtual character may succeed in overcoming based on a plurality of ratings of a plurality of virtual characteristics associated with the virtual character.

Figure 4:
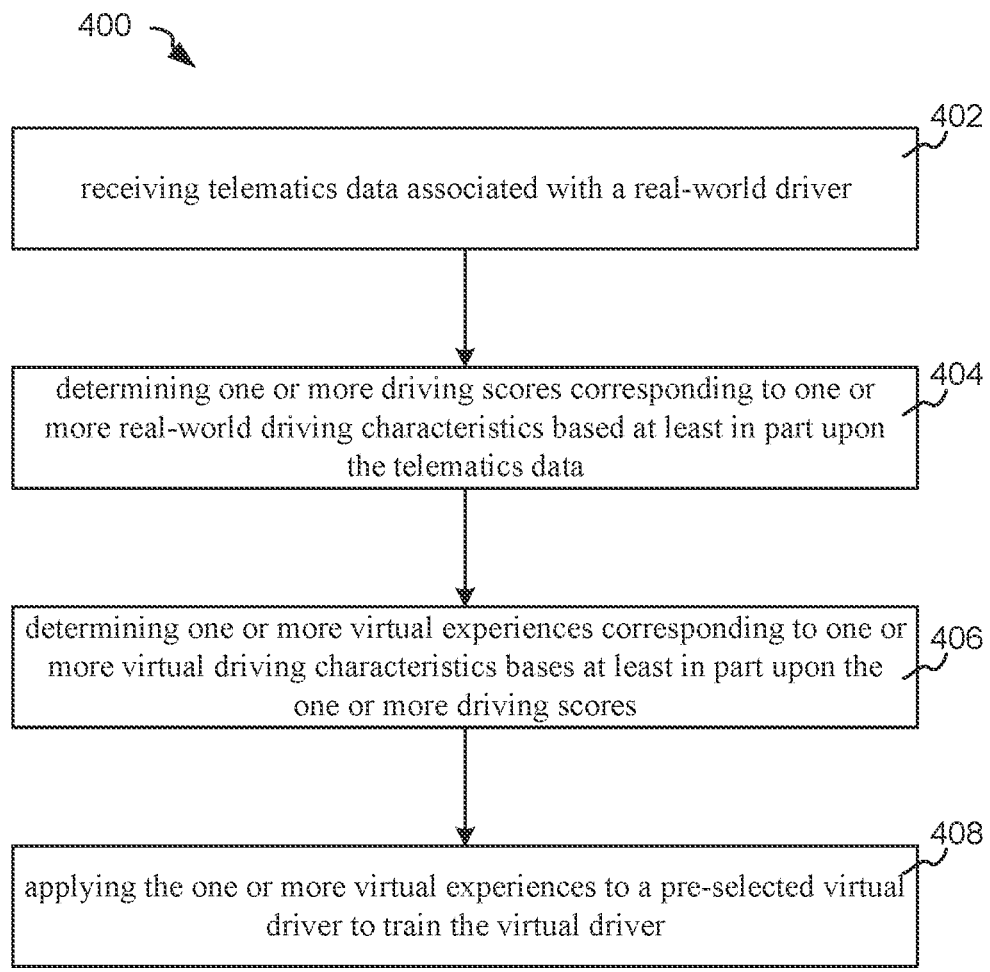
FIG. 4 is a simplified diagram showing a method for training a virtual operator according to various embodiments of the present disclosure.

One or More Methods for Training a Virtual Driver According to Various Embodiments FIG. 4 is a simplified diagram showing a method for training a virtual driver, according to some embodiments. This diagram is merely an example, which should not unduly limit the scope of the claims. One of ordinary skill in the art would recognize many variations, alternatives, and modifications. In certain examples, the method 400 is implemented by the system 300 of FIG. 3. In some examples, the method 400 includes a process 402 of receiving telematics data associated with a real-world driver, a process 404 of determining one or more driving scores corresponding to one or more real-world driving characteristics based at least in part upon the telematics data, a process 406 of determining one or more virtual experiences corresponding to one or more virtual driving characteristics bases at least in part upon the one or more driving scores, and a process 408 of applying the one or more virtual experiences to a pre-selected virtual driver to train the virtual driver. Although the above has been shown using a selected group of processes for the method, there can be many alternatives, modifications, and variations. For example, some of the processes may be expanded and/or combined. Other processes may be inserted to those noted above. Some processes may be removed. Depending upon the embodiment, the sequence of processes may be interchanged with others replaced.

In some embodiments, the process 402 of receiving telematics data associated with a real-world driver includes receiving telematics data associated with one or more real trips during which the real-world driver (e.g., a user or player) operated a real vehicle. In certain examples, the telematics data are collected via one or more sensors associated with the real vehicle and/or with a mobile device associated with the user. In various examples, the telematics data are received in real-time, or in near real-time, with the collection thereof, such as during the commencement of the one or more real trips.

In some embodiments, the process 404 of determining one or more driving scores includes determining driving scores for a braking characteristic, a steering characteristic, a speeding characteristic, and/or a focus characteristic. In some examples, the braking characteristic corresponds to the real-world driver's ability to decelerate the real vehicle upon encountering braking obstacles, such as T-junctions or pedestrian crossings. In some examples, the steering characteristic corresponds to the real-world driver's ability to steer the real vehicle upon encountering steering obstacles, such as on-road objects (e.g., potholes, road kills) or sharp turns. In some examples, the speeding characteristic corresponds to the real-world driver's ability to decelerate the real vehicle upon encountering speeding obstacles, such as instances of the real vehicle operated by the user is faster than a speed limit. In some examples, the focus characteristic corresponds to the real-world driver's ability to maintain or regain focus while operating the real vehicle upon encountering focus obstacles, such as when the user is about to use their phone.

In some embodiments, the process 406 of determining one or more virtual experiences includes determining the one or more virtual experiences based in part upon a character profile of a virtual character. For example, determining the one or more virtual experiences includes determining the one or more virtual experiences based in part upon a one or more skill ratings (or levels) of a plurality of virtual skills (e.g., steering, braking, speeding, focus), and/or one or more unlocked regions of a virtual game map.

In some embodiments, the process 408 of applying the one or more virtual experiences includes applying the one or more virtual experiences to a pre-selected virtual driver to train the virtual driver. In some examples, the process 408 of applying the one or more virtual experiences includes initiating the one or more virtual experiences for a virtual character, such as one selected by a user. In various examples, a virtual experience includes a virtual trip, a virtual scene, a virtual occurrence, a virtual event, a virtual incident, a virtual mini-game, and/or a virtual interaction. For example, a virtual trip includes one or more virtual obstacles configured to be encountered by the virtual character, where the virtual character may succeed in overcoming based on a plurality of ratings of a plurality of virtual characteristics associated with the virtual character.

One or More Computer Devices According to Various Embodiments

Figure 5:
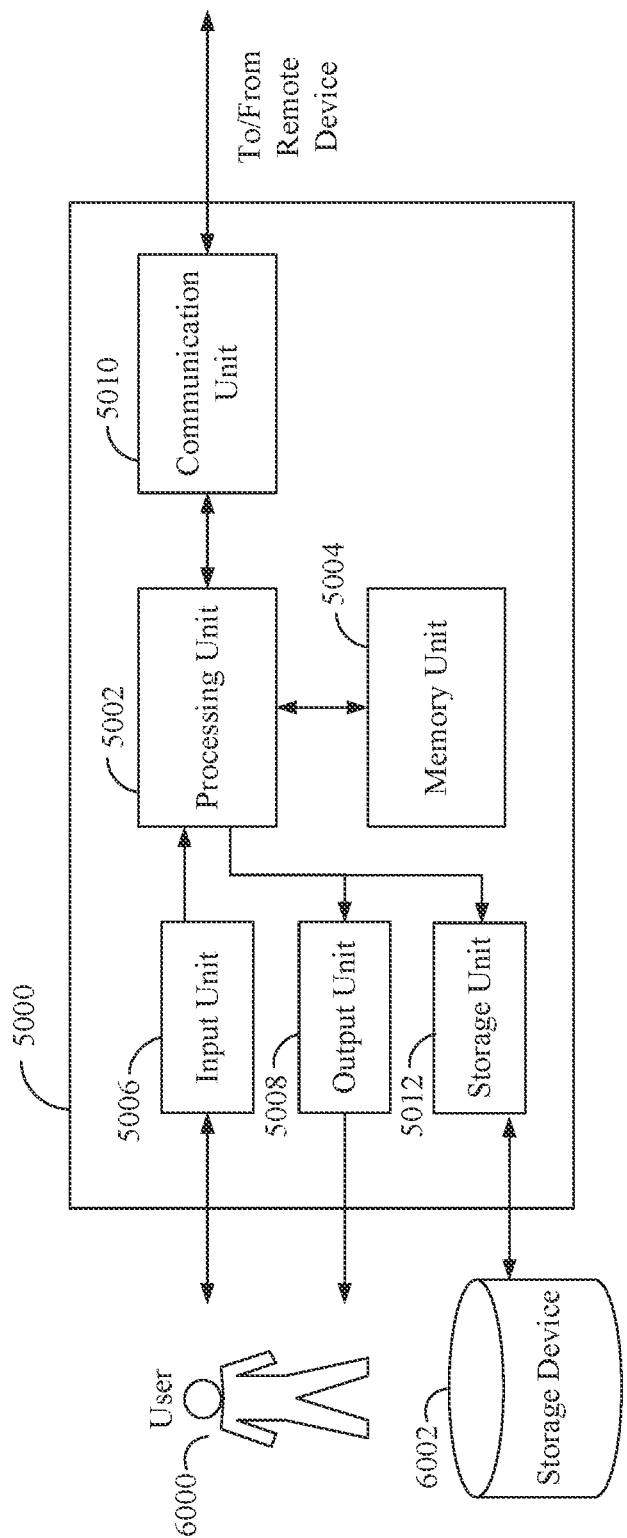
FIG. 5 is a simplified diagram showing a computer device, according to various embodiments of the present disclosure.

FIG. 5 is a simplified diagram showing a computer device 5000, according to various embodiments of the present disclosure. This diagram is merely an example, which should not unduly limit the scope of the claims. One of ordinary skill in the art would recognize many variations, alternatives, and modifications. In some examples, the computer device 5000 includes a processing unit 5002, a memory unit 5004, an input unit 5006, an output unit 5008, and a communication unit 5010. In various examples, the computer device 5000 is configured to be in communication with a user 5100 and/or a storage device 5200. In certain examples, the system computer device 5000 is configured according to system 100 of FIG. 1, system 300 of FIG. 3, to implement method 200 of FIG. 2, and/or to implement method 400 of FIG. 4. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the processing unit 5002 is configured for executing instructions, such as instructions to implement method 200 of FIG. 2 and/or method 400 of FIG. 4. In some embodiments, executable instructions may be stored in the memory unit 5004. In some examples, the processing unit 5002 includes one or more processing units (e.g., in a multi-core configuration). In certain examples, the processing unit 5002 includes and/or is communicatively coupled to one or more modules for implementing the systems and methods described in the present disclosure. In some examples, the processing unit 5002 is configured to execute instructions within one or more operating systems, such as UNIX, LINUX, Microsoft Windows®, etc. In certain examples, upon initiation of a computer-implemented method, one or more instructions is executed during initialization. In some examples, one or more operations is executed to perform one or more processes described herein. In certain examples, an operation may be general or specific to a particular programming language (e.g., C, C#, C++, Java, or other suitable programming languages, etc.). In various examples, the processing unit 5002 is configured to be operatively coupled to the storage device 5200, such as via an on-board storage unit 5012.

In various embodiments, the memory unit 5004 includes a device allowing information, such as executable instructions and/or other data to be stored and retrieved. In some examples, memory unit 5004 includes one or more computer readable media. In some embodiments, stored in memory unit 5004 include computer readable instructions for providing a user interface, such as to the user 5004, via the output unit 5008. In some examples, a user interface includes a web browser and/or a client application. In various examples, a web browser enables one or more users, such as the user 5004, to display and/or interact with media and/or other information embedded on a web page and/or a website. In certain examples, the memory unit 5004 include computer readable instructions for receiving and processing an input, such as from the user 5004, via the input unit 5006. In certain examples, the memory unit 5004 includes random access memory (RAM) such as dynamic RAM (DRAM) or static RAM (SRAM), read-only memory (ROM), erasable programmable read-only memory (EPROM), electrically erasable programmable read-only memory (EEPROM), and/or non-volatile RAM (NVRAN).

In various embodiments, the input unit 5006 is configured to receive input, such as from the user 5004. In some examples, the input unit 5006 includes a keyboard, a pointing device, a mouse, a stylus, a touch sensitive panel (e.g., a touch pad or a touch screen), a gyroscope, an accelerometer, a position detector (e.g., a Global Positioning System), and/or an audio input device. In certain examples, the input unit 5006, such as a touch screen of the input unit, is configured to function as both the input unit and the output unit.

In various embodiments, the output unit 5008 includes a media output unit configured to present information to the user 5004. In some embodiments, the output unit 5008 includes any component capable of conveying information to the user 5004. In certain embodiments, the output unit 5008 includes an output adapter, such as a video adapter and/or an audio adapter. In various examples, the output unit 5008, such as an output adapter of the output unit, is operatively coupled to the processing unit 5002 and/or operatively coupled to an presenting device configured to present the information to the user, such as via a visual display device (e.g., a liquid crystal display (LCD), a light emitting diode (LED) display, an organic light emitting diode (OLED) display, a cathode ray tube (CRT) display, an "electronic ink" display, a projected display, etc.) or an audio display device (e.g., a speaker arrangement or headphones).

In various embodiments, the communication unit 5010 is configured to be communicatively coupled to a remote device. In some examples, the communication unit 5010 includes a wired network adapter, a wireless network adapter, a wireless data transceiver for use with a mobile phone network (e.g., Global System for Mobile communications (GSM), 3G, 4G, or Bluetooth), and/or other mobile data networks (e.g., Worldwide Interoperability for Microwave Access (WIMAX)). In certain examples, other types of short-range or long-range networks may be used. In some examples, the communication unit 5010 is configured to provide email integration for communicating data between a server and one or more clients.

In various embodiments, the storage unit 5012 is configured to enable communication between the computer device 5000, such as via the processing unit 5002, and an external storage device 5200. In some examples, the storage unit 5012 is a storage interface. In certain examples, the storage interface is any component capable of providing the processing unit 5002 with access to the storage device 5200. In various examples, the storage unit 5012 includes an Advanced Technology Attachment (ATA) adapter, a Serial ATA (SATA) adapter, a Small Computer System Interface (SCSI) adapter, a RAID controller, a SAN adapter, a network adapter, and/or any other component capable of providing the processing unit 5002 with access to the storage device 5200.

In some examples, the storage device 5200 includes any computer-operated hardware suitable for storing and/or retrieving data. In certain examples, storage device 5200 is integrated in the computer device 5000. In some examples, the storage device 5200 includes a database, such as a local database or a cloud database. In certain examples, the storage device 5200 includes one or more hard disk drives. In various examples, the storage device is external and is configured to be accessed by a plurality of server systems. In certain examples, the storage device includes multiple storage units such as hard disks or solid state disks in a redundant array of inexpensive disks (RAID) configuration. In some examples, the storage device 5200 includes a storage area network (SAN) and/or a network attached storage (NAS) system.

One or More Computer Systems According to Various Embodiments

Figure 6:
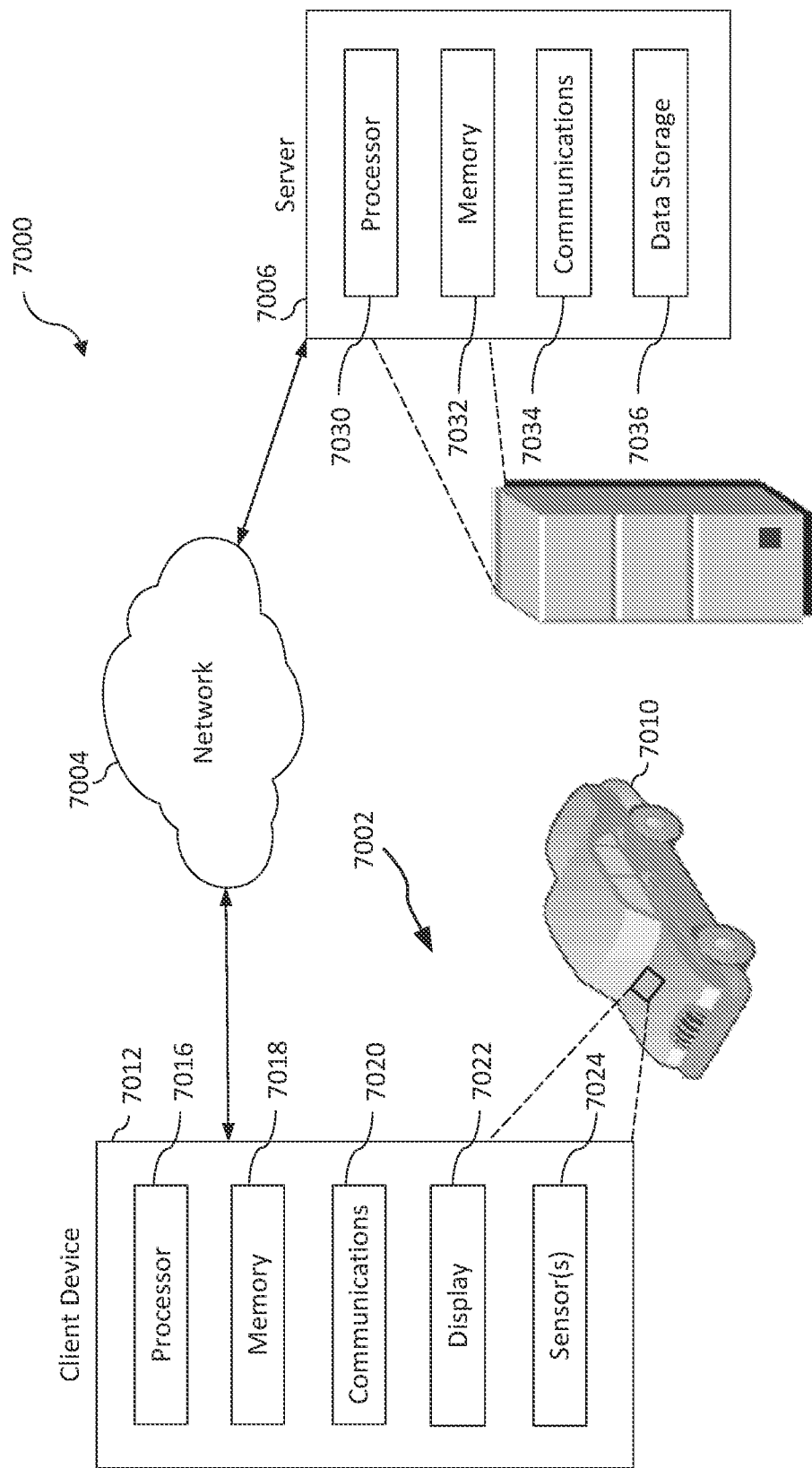
FIG. 6 is a simplified diagram showing a computer system, according to various embodiments of the present disclosure.

FIG. 6 is a simplified computer system 7000 according to various embodiments of the present disclosure. This diagram is merely an example, which should not unduly limit the scope of the claims. One of ordinary skill in the art would recognize many variations, alternatives, and modifications. In some examples, the system 7000 includes a vehicle system 7002, a network 7004, and a server 7006. In certain examples, the system 7000, the vehicle system 7002, and/or the server 7006 is configured according to system 100 of FIG. 1, system 300 of FIG. 3, to implement method 200 of FIG. 2, and/or to implement method 400 of FIG. 4. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the vehicle system 7002 includes a vehicle 7010 and a client device 7012 associated with the vehicle 7010. In various examples, the client device 7012 is an on-board computer embedded or located in the vehicle 7010. As an example, the client device 7012 is a mobile device (e.g., a smartphone) that is connected (e.g., via a wired connection or a wireless connection) to the vehicle 7010. In some examples, the client device 7012 includes a processor 7016 (e.g., a central processing unit (CPU), and/or a graphics processing unit (GPU)), a memory 7018 (e.g., storage unit, random-access memory (RAM), and/or read-only memory (ROM), flash memory), a communications unit 7020 (e.g., a network transceiver), a display unit 7022 (e.g., a touchscreen), and one or more sensors 7024 (e.g., an accelerometer, a gyroscope, a magnetometer, and/or a GPS sensor).

In various embodiments, the vehicle 7010 is operated by a user. In certain embodiments, the system 7000 includes multiple vehicles 7010, each vehicle of the multiple vehicles operated by a respective user of multiple users. In various examples, the one or more sensors 7024 monitors, during one or more vehicle trips, the vehicle 7010 by at least collecting data associated with one or more operating parameters of the vehicle, such as speed, speeding, braking, location, engine status, and/or other suitable parameters. In certain examples, the collected data include vehicle telematics data. According to some embodiments, the data are collected continuously, at predetermined time intervals, and/or based on one or more triggering events (e.g., when a sensor has acquired measurements greater than a threshold amount of sensor measurements). In various examples, the data collected by the one or more sensors 7024 correspond to user driving data, which may correspond to a driver's driving behaviors, in the methods and/or systems of the present disclosure.

According to various embodiments, the collected data are stored in the memory 7018 before being transmitted to the server 7006 using the communications unit 7020 via the network 7004 (e.g., via a local area network (LAN), a wide area network (WAN), or the Internet). In some examples, the collected data are transmitted directly to the server 7006 via the network 7004. In certain examples, the collected data are transmitted to the server 7006 via a third party. In some examples, a data monitoring system, managed or operated by a third party, is configured to store data collected by the one or more sensors 7024 and to transmit such data to the server 7006 via the network 7004 or a different network.

According to various embodiments, the server 7006 includes a processor 7030 (e.g., a microprocessor, a microcontroller), a memory 7032 (e.g., a storage unit), a communications unit 7034 (e.g., a network transceiver), and a data storage 7036 (e.g., one or more databases). In some examples, the server 7006 is a single server, while in certain embodiments, the server 7006 includes a plurality of servers with distributed processing and/or storage. In certain examples, the data storage 7036 is part of the server 7006, such as coupled via a network (e.g., the network 7004). In some examples, data, such as processed data and/or results, may be transmitted from the data storage, such as via the communications unit 7034, the network 7004, and/or the communications unit 7020, to the client device 7012, such as for display by the display 7022.

In some examples, the server 7006 includes various software applications stored in the memory 7032 and executable by the processor 7030. In some examples, these software applications include specific programs, routines, and/or scripts for performing functions associated with the methods of the present disclosure. In certain examples, the software applications include general-purpose software applications for data processing, network communication, database management, web server operation, and/or other functions typically performed by a server. In various examples, the server 7006 is configured to receive, such as via the network 7004 and via the communications unit 7034, the data collected by the one or more sensors 7024 from the client device 7012, and stores the data in the data storage 7036. In some examples, the server 7006 is further configured to process, via the processor 7030, the data to perform one or more processes of the methods of the present disclosure.

Examples of Computer Program Product According to Some Embodiments of the Present Disclosure FIGS. 7A-34 depict respective example interfaces associated with various functionalities described herein. In particular, the example interfaces relate to operation of a virtual vehicle within a virtual environment. In embodiments, a computing device (e.g., the computer device 5000 or computer system 7000) may be configured to display the interfaces, where the computing device may be located within a vehicle and an operator of the vehicle may review the interfaces. It should be appreciated that the interfaces are merely exemplary, and that additional and alternative content is envisioned. In various examples, the example interface presents an in-game wallet corresponding to the user and/or a particular virtual character.

Figure 7A:
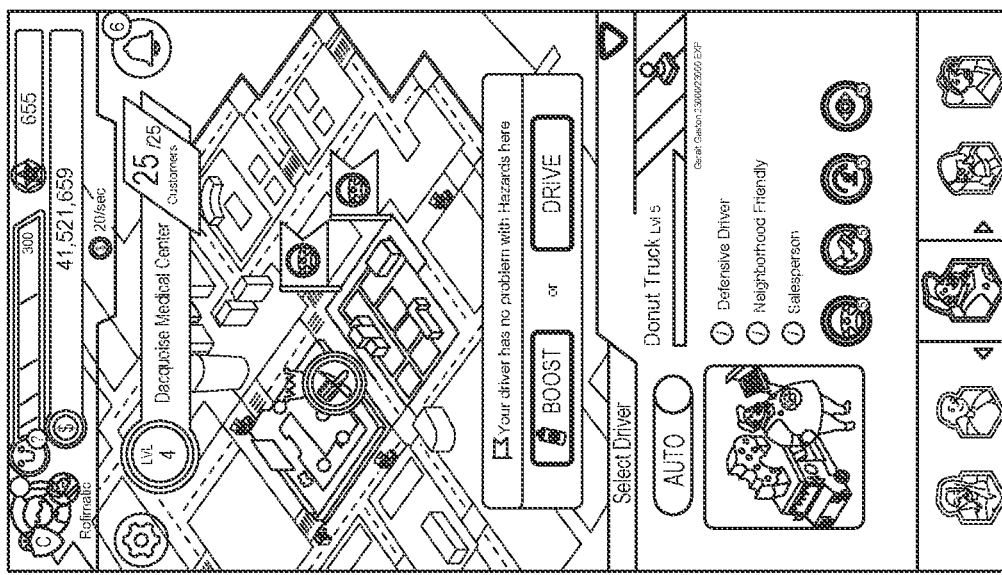

FIG. 7A depicts an example interface associated with a virtual environment, the example interface including an autodrive mode selection overlay configured for a user (e.g., player) to select whether to send a virtual character onto one or more automatic virtual drives. In certain examples, during a virtual drive, the virtual character completes a virtual trip based on a plurality of scores of a plurality of virtual skills (e.g., braking, steering, speeding, focus). In some examples, when the user selects to disable the autodrive mode, the system sends the virtual character onto one or more manual virtual drives. In certain examples, during a manual drive, the virtual character completes a virtual trip based on user input during the virtual trip, such as via one or more interactive commands on an interactive interface (e.g., of a mobile device).

Figure 7B:
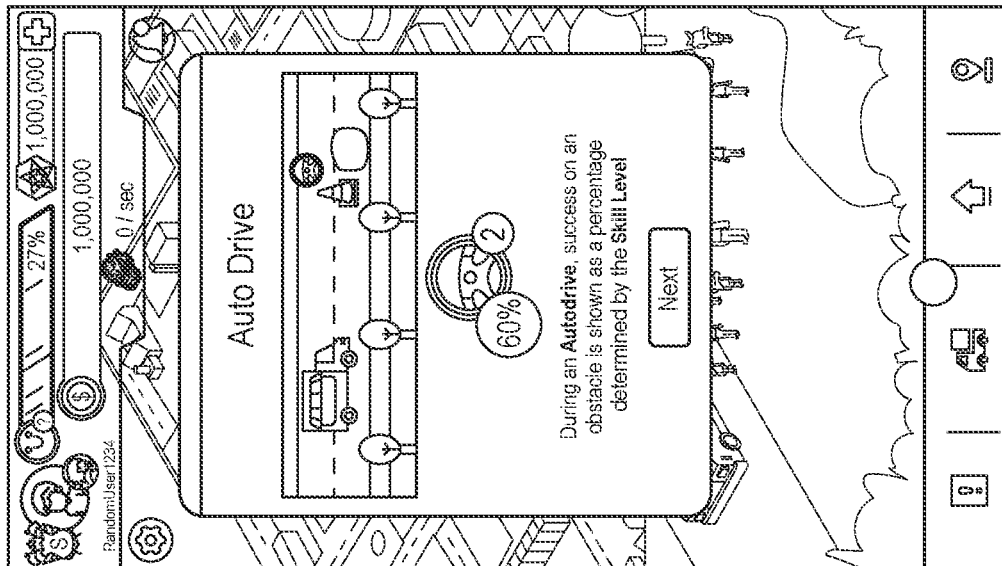

FIG. 7B depicts an example interface associated with a virtual environment, the example interface including a presentation of a trip success prediction or an obstacle avoidance success prediction. In some examples, during an autodrive, a virtual character's likelihood of success in overcoming an obstacle is shown, for example, as a percentage, and the likelihood of success being determined by a corresponding virtual skill. For example, the depicted obstacle is a steering obstacle, such as a pothole, and the virtual character's likelihood of success in avoiding the steering obstacle is determined, based at least in part upon the virtual character's virtual steering skill (e.g., a rating of 2), to be 60%.

Figure 7C:
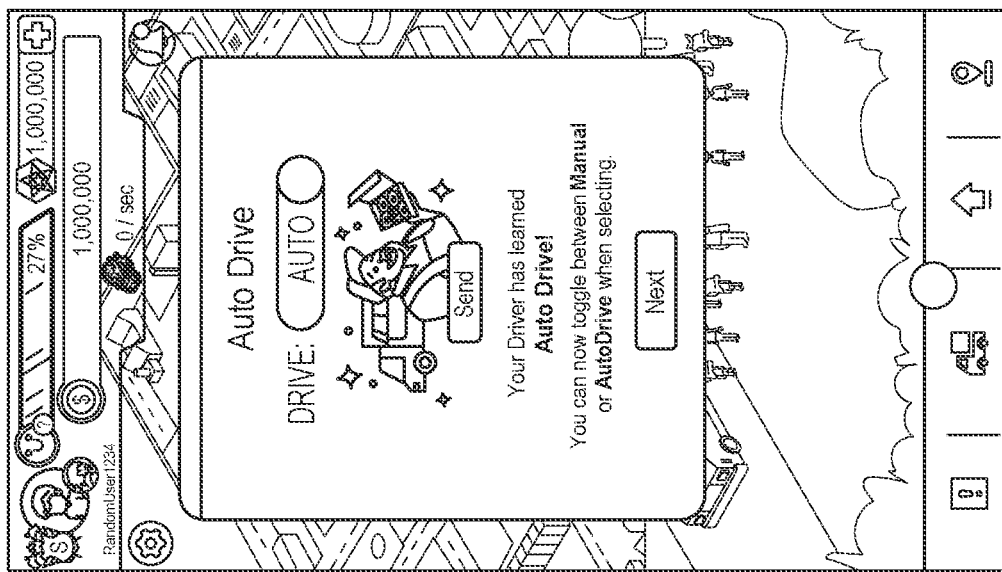

FIG. 7C depicts an example interface associated with a virtual environment, the example interface including a virtual map consisting of various roadways, buildings, homes, landscape elements, and/or the like. On the virtual map, the example interface further includes a virtual route corresponding to a virtual trip, the virtual route including one or more virtual obstacles to be encountered by a virtual character should a user sends the virtual character onto the virtual trip. In the depicted example, the one or more virtual obstacles include two steering obstacles. In various examples, the example interface further includes a trip success prediction for a virtual character, such as one selected by a user. The trip success prediction being determined based on a plurality of virtual skills and/or characteristics. In the depicted example, the trip success prediction is high, as indicated by the displayed text of "Your driver has no problem with Hazards here." In the depicted example, the virtual character has a virtual steering skill rating of 5, a virtual braking skill rating of 5, a virtual speeding braking skill rating of 5, and a virtual focus skill rating of 5. In the depicted example, the interface shows that the virtual character would travel the virtual trip with the autodrive mode activated. In various examples, the example interface presents a boost command configured to be selected by a user, which upon the user's selection, modifies, such as increases, the likelihood of success of the virtual character completing the virtual trip. In certain examples, the example interface presents a drive command configured to be selected by a user, which upon the user's selection, sends the virtual character onto the virtual trip. In various examples, the example interface presents a plurality of virtual characters, each selectable by a user, such as to be trained, to be sent onto a virtual trip, and to be played in the telematics-based game.

Figure 8A:
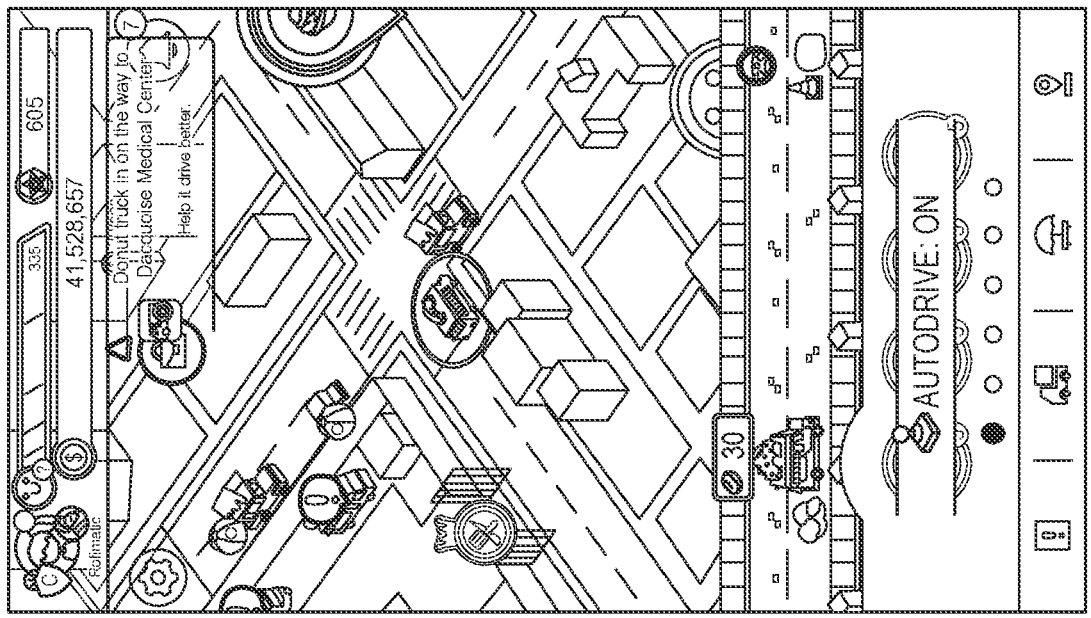

FIG. 8A depicts an example interface associated with a virtual environment, the example interface including a presentation of a gift received by a user or by a virtual character. For example, a gift is a boost drink, which may be referred to as a "driver-ade drink," configured to be used to increase a virtual character's one or more virtual skills, such as during one or more virtual trips, such as to improve a virtual character's likelihood of success in avoiding one or more virtual obstacles during the one or more virtual trips. In certain examples, a gift may be sent and received between friends, such as in-game friends of the telematics-based game.

Figure 8B:
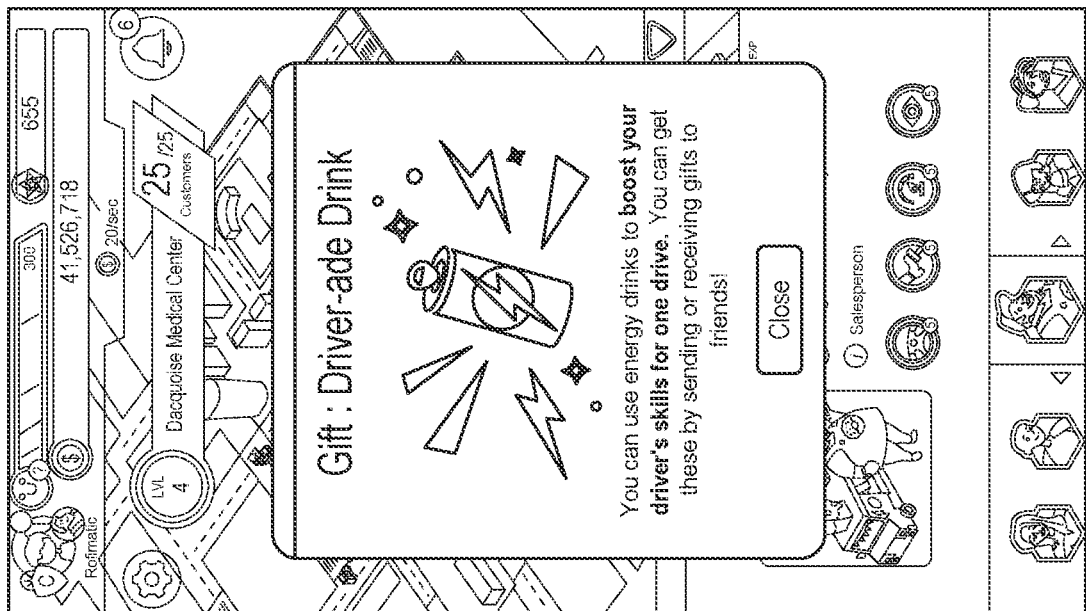

FIG. 8B depicts an example interface associated with a virtual environment, the example interface including a presentation of an ongoing virtual trip, such as in a first virtual map, which may be of a bigger size and presented with a three-dimensional perspective, and/or in a second virtual map, which may be of a smaller size and presented with a linear road. In certain examples, the first virtual map of the example interface shows where the virtual character is in a game world, which may include multiple unlockable regions or zones. In certain examples, the second virtual map of the example interface shows a virtual vehicle associated with a virtual character and one or more virtual obstacles to be encountered by the virtual vehicle on a virtual trip. In the depicted example, the example interface shows that the autodrive is activated, indicating that the virtual vehicle will automatically maneuver itself upon encountering the one or more virtual obstacles. In some examples, the example interface shows a number of in-game items (e.g. donuts), such as ones to be sold by the virtual character in the telematics-based game, such as to earn in-game currency. In various examples, the example interface allows a user to enter or exit autodrive mode, such as during a virtual trip.

Figures 9A, 9B, 9C:
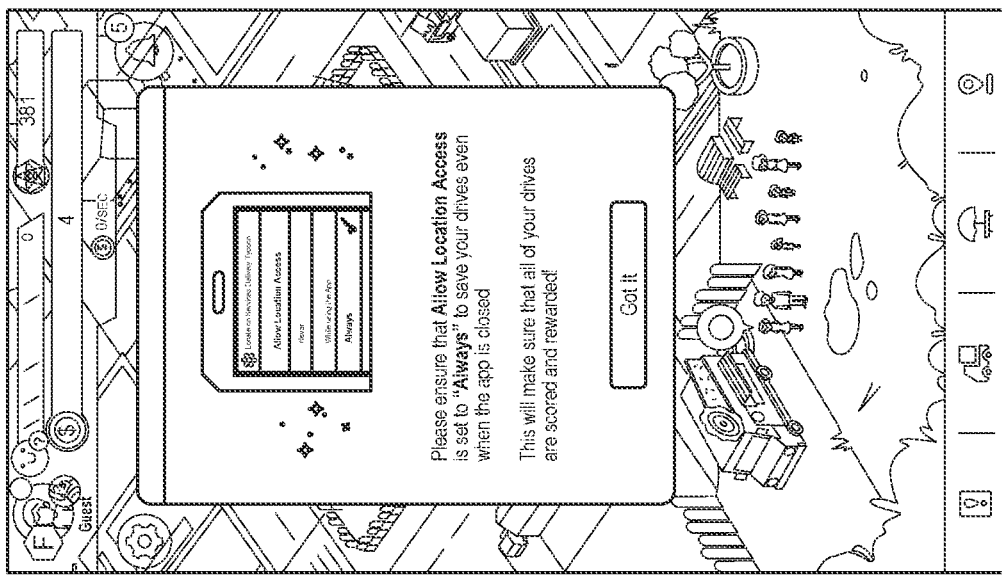

FIG. 9A depicts an example interface associated with a virtual environment, the example interface including a presentation to instruct a user to record a real drive to unlock a virtual character and an associated virtual vehicle. In some examples, recording a virtual trip includes activating one or more sensors on a real vehicle operated by the user, such as to generate telematics data indicative of the user's performance during one or more real trips.

FIG. 9B depicts an example interface associated with a virtual environment, the example interface including a trip scoring presentation to teach a user how a rating of a real trip, such as one driven by the user, influences a daily score assignable and/or a reward grantable to the user or to a virtual character. For example, a rating may be bumpy driving, okay driving, smooth driving, great driving, great driving, or excellent driving. For example, a reward may be a rankpoint, such as one that may be accumulated by a user or a virtual character, such as for a daily ranking, weekly ranking, and/or monthly ranking.

FIG. 9C depicts an example interface associated with a virtual environment, the example interface including a presentation to instruct a user to allow location access, such as to always allow location access, for the system to save the user's real drives, such as even when the application is closed in a mobile device.

Figure 10A:
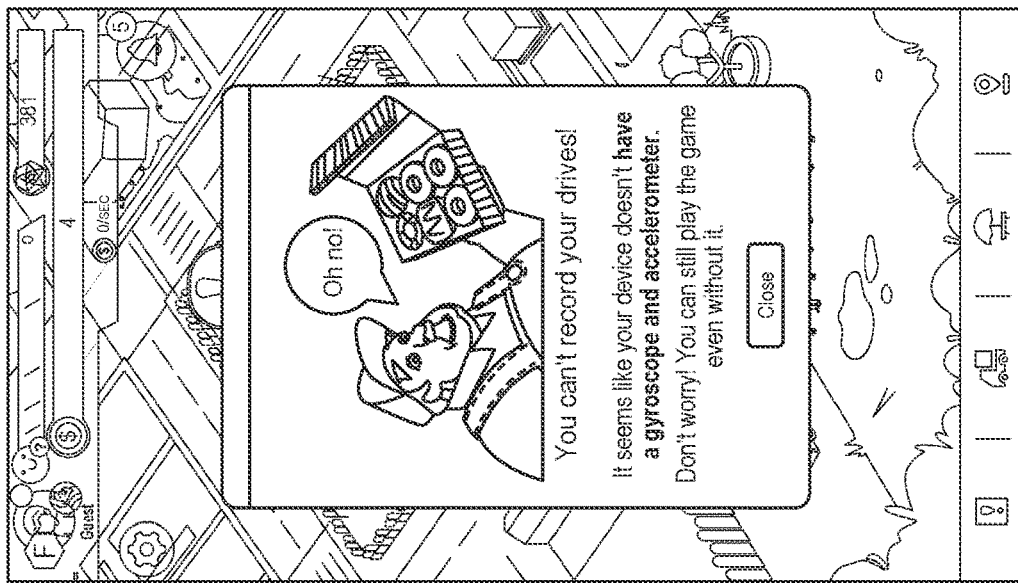

FIG. 10A depicts an example interface associated with a virtual environment, the example interface including a presentation to notify that a user's device is not equipped with one or more sensors for one or more functionalities of the telematics-based game, yet the user may still play the game.

Figure 10B:
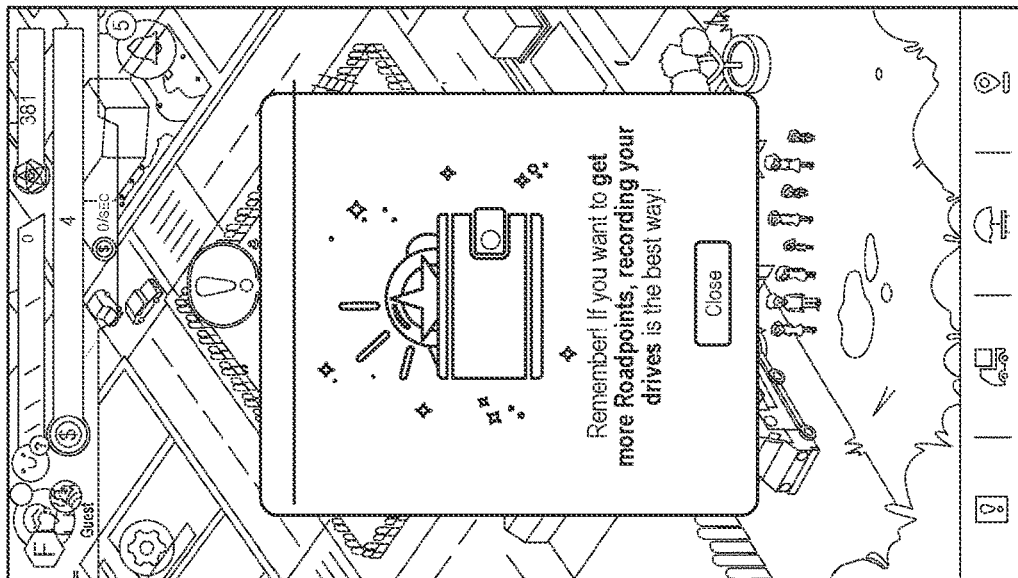

FIG. 10B depicts an example interface associated with a virtual environment, the example interface including a presentation to remind a user to record one or more real trips to earn in-game currency.

Figure 10C:
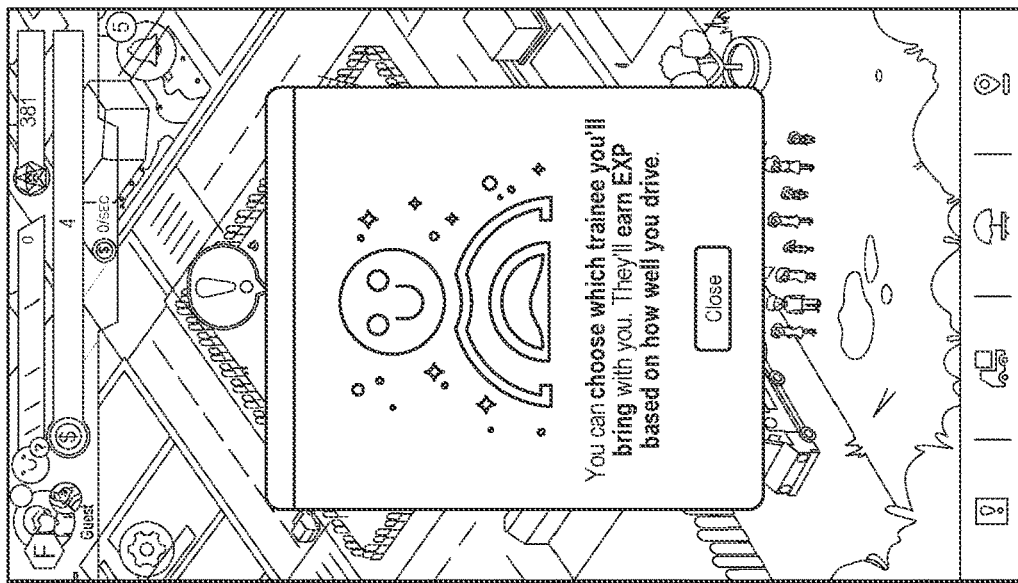

FIG. 10C depicts an example interface associated with a virtual environment, the example interface including a presentation to instruct a user to select a virtual character to be trained, such as to earn in-game experience. In some examples, the in-game experience is determined based on the user's performance in one or more real trips.

Figure 11C:
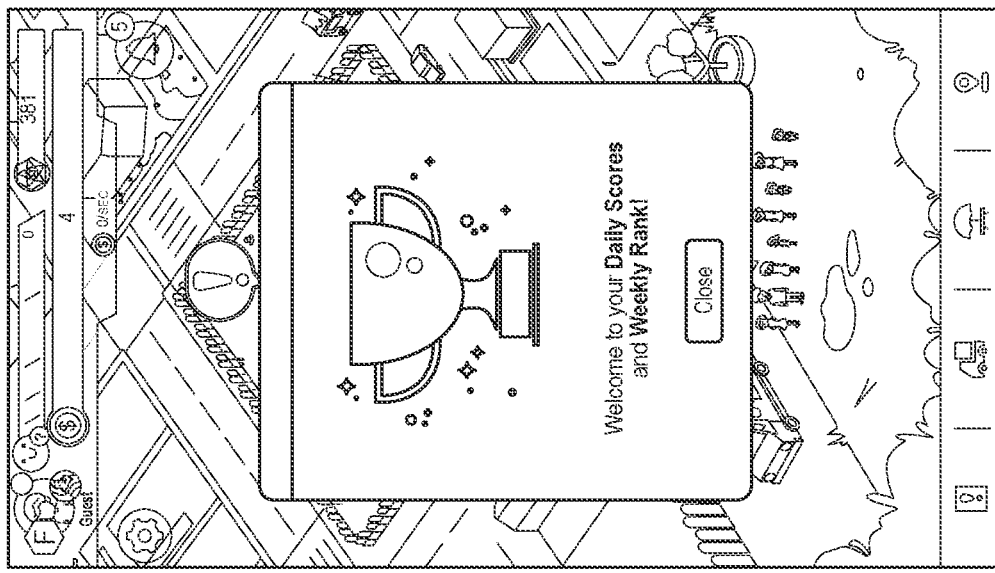
Figure 11B:
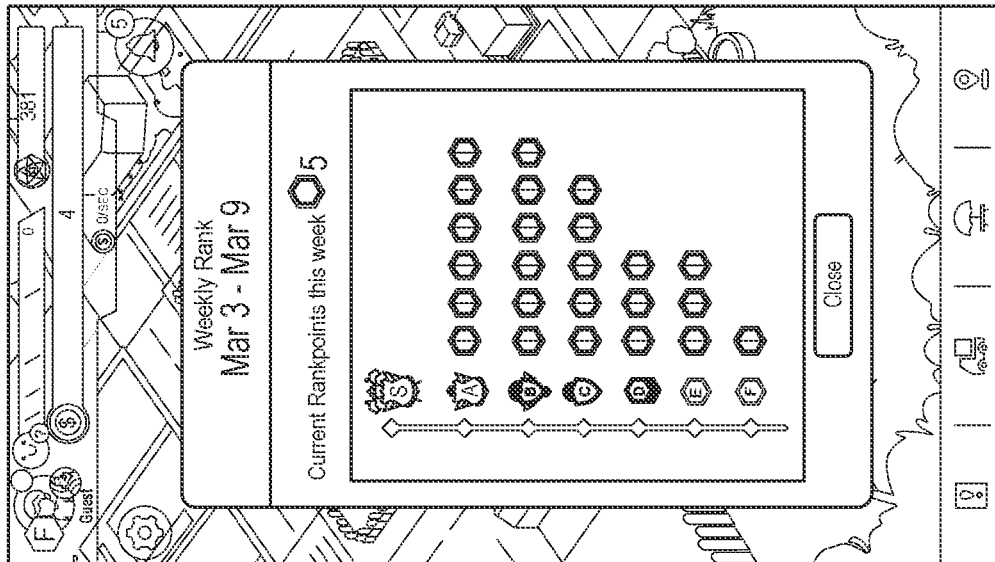
Figure 11A:
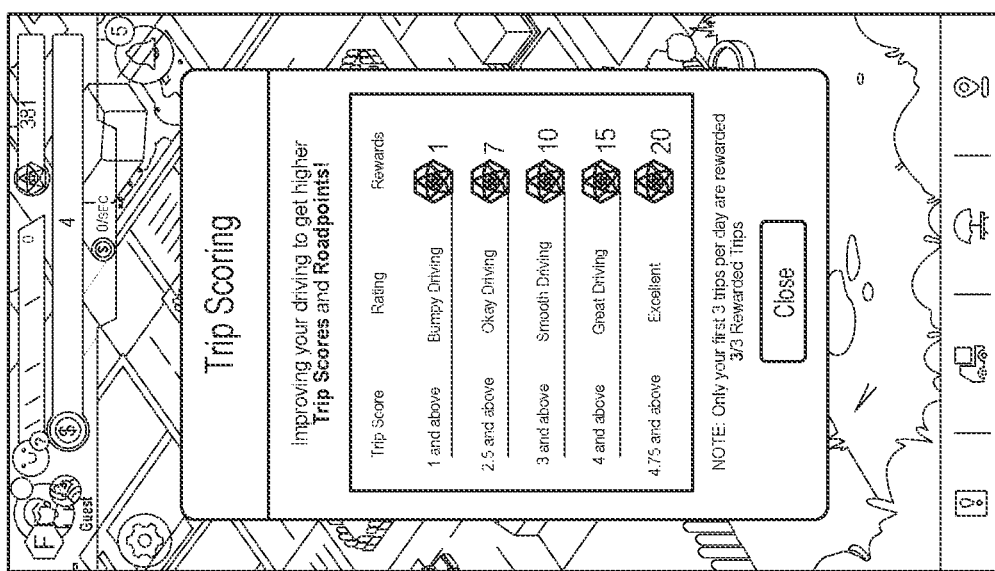

FIG. 11A depicts an example interface associated with a virtual environment, the example interface including a trip scoring presentation to teach a user how a rating of a real trip, such as one driven by the user, influences a daily score assignable and/or a reward grantable to the user or to a virtual character. For example, a rating may be bumpy driving, okay driving, smooth driving, great driving, great driving, or excellent driving. For example, a reward may be a first in-game currency, which may be referred to as roadpoints, such as one that may be accumulated and/or used to purchase one or more in-game items of the telematics-based game. In some examples, the first in-game currency may only be earned via the user's real driving during one or more real trips. In some examples, said in-game items may only be purchased using the first in-game currency.

FIG. 11B depicts an example interface associated with a virtual environment, the example interface including a weekly rank presentation to show a user his/her current rank and/or rankpoint accumulation for the week.

FIG. 11C depicts an example interface associated with a virtual environment, the example interface including a presentation to notify that the user has access to daily scores and weekly rank associated with the telematics-based game.

FIG. 12A depicts an example interface associated with a virtual environment, the example interface including a presentation showing a trip summary, such as a real trip summary, such as an unclaimed trip summary yet to be applied to a virtual character. In some examples, the trip summary includes experience gained for one or more skills, such as in-game experience (or skill points) earned for one or more virtual skills. In the depicted example, during a real trip and based at least in part upon a user's real driving during the real trip, 4900 skill points (e.g., skillpoints) or experience was gained for the virtual steering skill, and 7200 skill points (e.g., skillpoints) or experience was gained for the virtual braking skill. In the example interface, a reward associated with the real trip is further presented, which may include a level-up for a virtual character and/or roadpoints. In the example interface, one or more historic real trips and their associated rewards may be presented to the user. In the example interface, a user may select one or more completed real trips to apply the rewards to the user's game profile and/or to a character profile of a virtual character selected by the user.

FIG. 12B depicts an example interface associated with a virtual environment, the example interface including a presentation showing a skill level page of a virtual driver. In the depicted example, the driver level as well as the driving skills have all been maxed out at level 5, with the corresponding skill points (e.g., skillpoints) maxed out at 5750 for the virtual character's virtual steering skill, braking skill, speeding skill, and focus skill.

FIG. 12C depicts an example interface associated with a virtual environment, the example interface including a presentation showing a weekly summary for a user, the weekly summary indicating the quantity of real trips driven by the user in a given week, a daily score, roadpoints and/or rankpoints earned during each day, and a weekly rank.

Figures 13A, 13B, 13C:
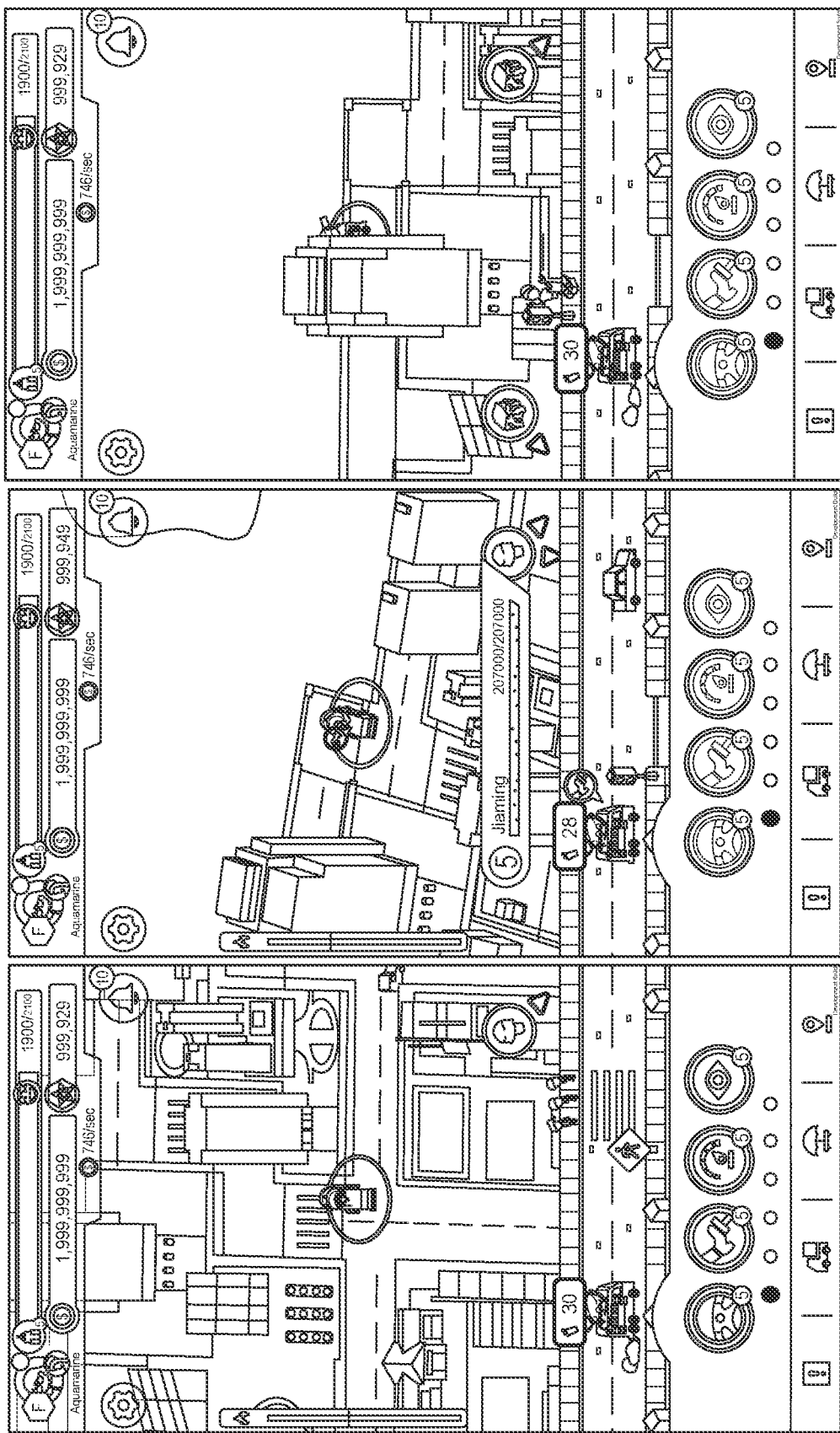

FIG. 13A depicts an example interface associated with a virtual environment, the example interface including a presentation of an ongoing virtual trip, such as in a first virtual map and in a second virtual map. In the depicted example, the example interface shows that manual drive is activated or that the autodrive is deactivated, indicating that the virtual vehicle will be controlled by a user's interaction with one or more selectable commands. In the depicted example, the virtual vehicle is approaching a crosswalk, which may be a braking obstacle, which upon encountering by the virtual vehicle, may be avoided upon a manual selection, by the user, of the braking command.

FIG. 13B depicts an example interface associated with a virtual environment, the example interface including a presentation of an ongoing virtual trip, such as in a first virtual map and in a second virtual map. In the depicted example, the example interface shows that manual drive is activated or that the autodrive is deactivated, indicating that the virtual vehicle will be controlled by a user's interaction with one or more selectable commands. In the depicted example, the virtual vehicle is approaching a red light, which may be a braking obstacle, which upon encountering by the virtual vehicle, may be avoided upon a manual selection, by the user, of the braking command.

FIG. 13C depicts an example interface associated with a virtual environment, the example interface including a presentation of an ongoing virtual trip, such as in a first virtual map and in a second virtual map. In the depicted example, the example interface shows that manual drive is activated or that the autodrive is deactivated, indicating that the virtual vehicle will be controlled by a user's interaction with one or more selectable commands. In the depicted example, the virtual vehicle is approaching a greenlight, which is not an obstacle, thus a manual input here to brake or steer would result in a deduction in trip performance.

Figures 14A, 14B, 14C:
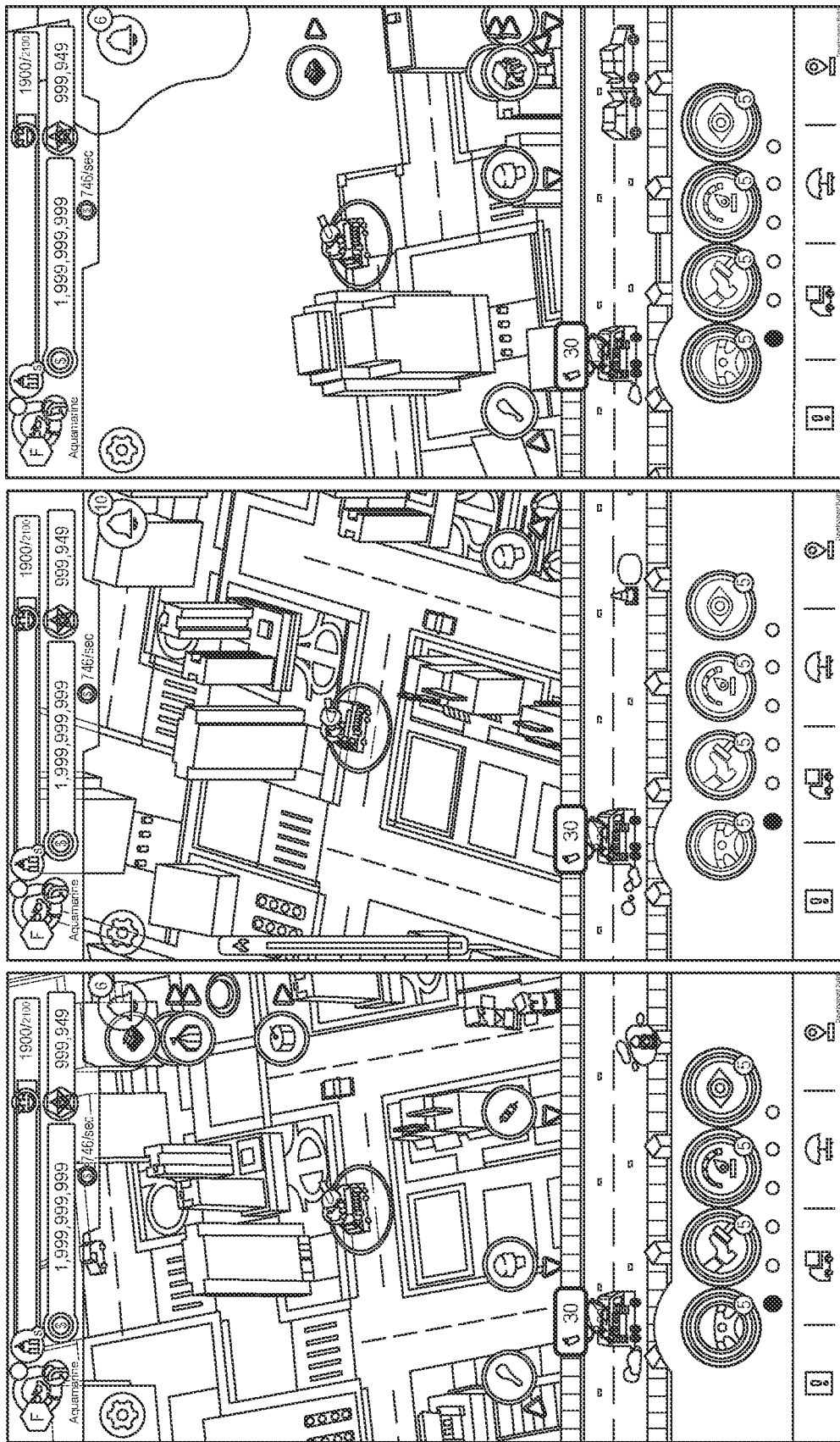

FIG. 14A depicts an example interface associated with a virtual environment, the example interface including a presentation of an ongoing virtual trip, such as in a first virtual map and in a second virtual map. In the depicted example, the example interface shows that manual drive is activated or that the autodrive is deactivated, indicating that the virtual vehicle will be controlled by a user's interaction with one or more selectable commands. In the depicted example, the virtual vehicle is approaching a puddle, which may be a steering obstacle, which upon encountering by the virtual vehicle, may be avoided upon a manual selection, by the user, of the steering command.

FIG. 14B depicts an example interface associated with a virtual environment, the example interface including a presentation of an ongoing virtual trip, such as in a first virtual map and in a second virtual map. In the depicted example, the example interface shows that manual drive is activated or that the autodrive is deactivated, indicating that the virtual vehicle will be controlled by a user's interaction with one or more selectable commands. In the depicted example, the virtual vehicle is approaching a pothole, which may be a steering obstacle, which upon encountering by the virtual vehicle, may be avoided upon a manual selection, by the user, of the steering command.

FIG. 14C depicts an example interface associated with a virtual environment, the example interface including a presentation of an ongoing virtual trip, such as in a first virtual map and in a second virtual map. In the depicted example, the example interface shows that manual drive is activated or that the autodrive is deactivated, indicating that the virtual vehicle will be controlled by a user's interaction with one or more selectable commands. In the depicted example, the virtual vehicle is approaching a car accident, which may be a steering obstacle, which upon encountering by the virtual vehicle, may be avoided upon a manual selection, by the user, of the steering command.

Figure 15C:
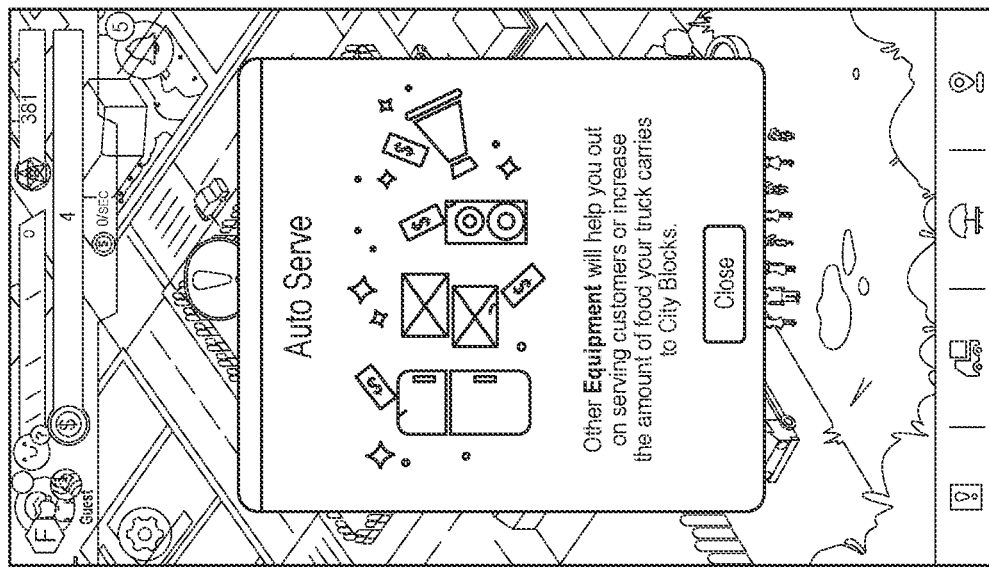
Figure 15B:
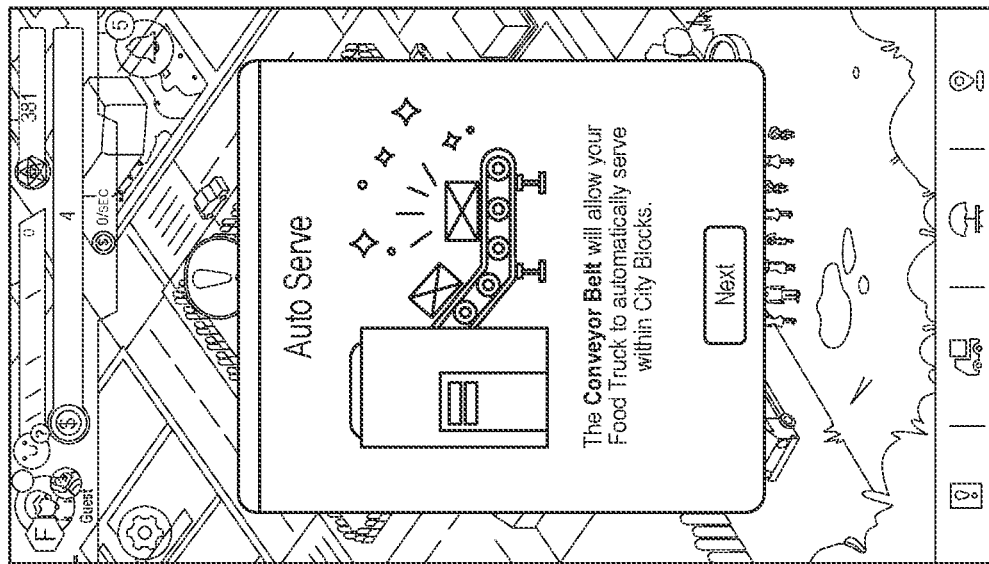
Figure 15A:
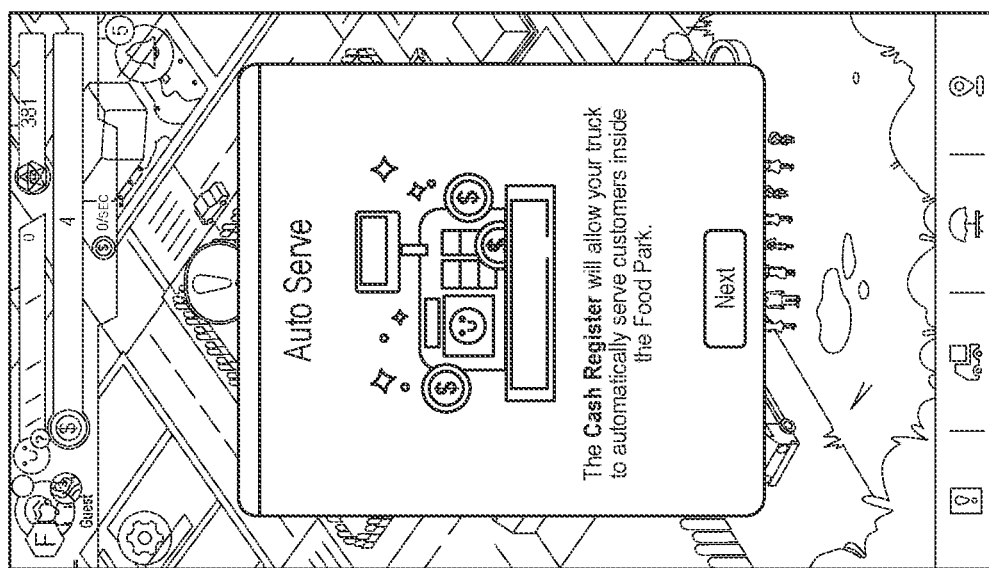

FIGS. 15A, 15B, and 15C depicts example interfaces associated with a virtual environment, the example interfaces including presentations of in-game items purchasable by a user in the telematics-based game. In the depicted examples, the in-game items are configured to facilitate in-game activities, such as to improve in-game currency earning rate.

Figure 16C:
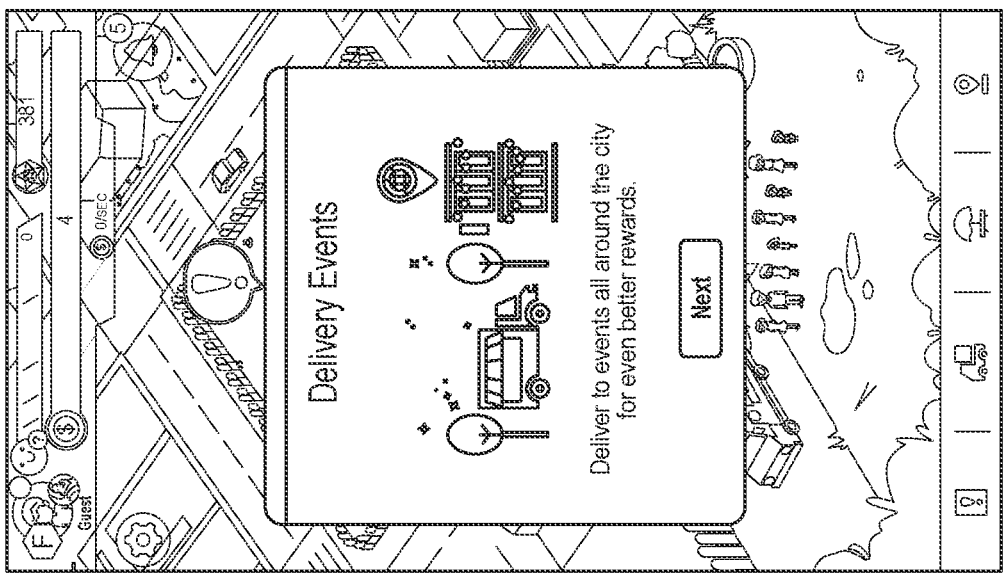
Figure 16B:
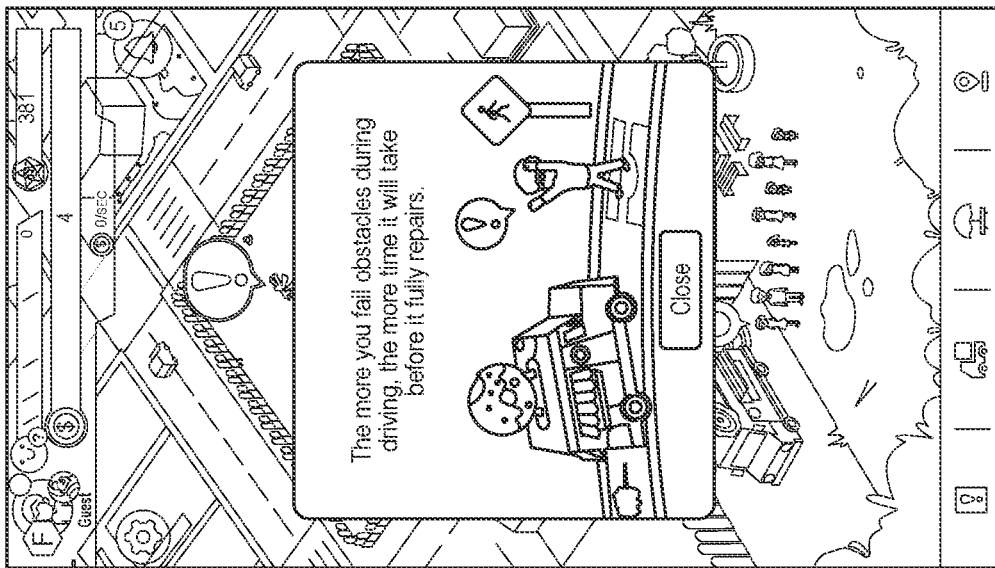
Figure 16A:
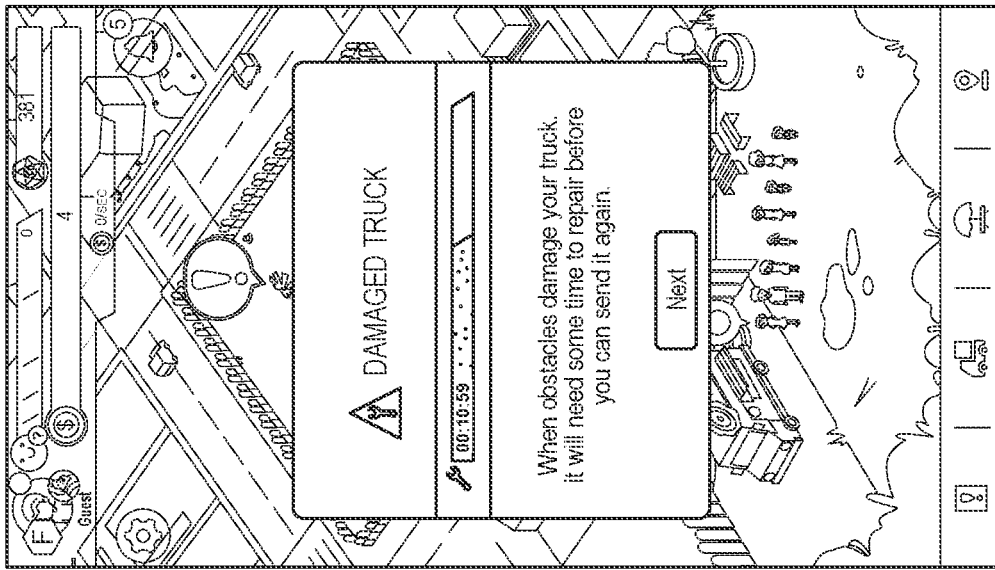

FIG. 16A depicts an example interface associated with a virtual environment, the example interface including a presentation of a vehicle condition of a virtual vehicle associated with a virtual character in the telematics-based game. In some examples, virtual vehicles may be damaged upon encountering one or more virtual obstacles. In certain examples, the degree of damage sustained by a virtual vehicle is at least dependent on an associated virtual character's one or more virtual skills (e.g., steering, braking, speeding, and/or focus). In various examples, the degree of damage sustained by a virtual vehicle is at least dependent on the difficulty of one or more virtual obstacles encountered by the virtual vehicle during one or more virtual trips. In some examples, interface presents a time remaining for a damaged virtual vehicle to be fully repaired, when it may again be sent on virtual trips.

FIG. 16B depicts an example interface associated with a virtual environment, the example interface including an explanatory presentation notifying a user that the more obstacles one fails during a virtual drive, the more time it would take for a virtual vehicle to be fully repaired due to the increased damage sustained.

FIG. 16C depicts an example interface associated with a virtual environment, the example interface including an explanatory presentation notifying a user that he/she may initiate virtual trips at various zones or regions of the game world to gain a variety of rewards.

Figure 17C:
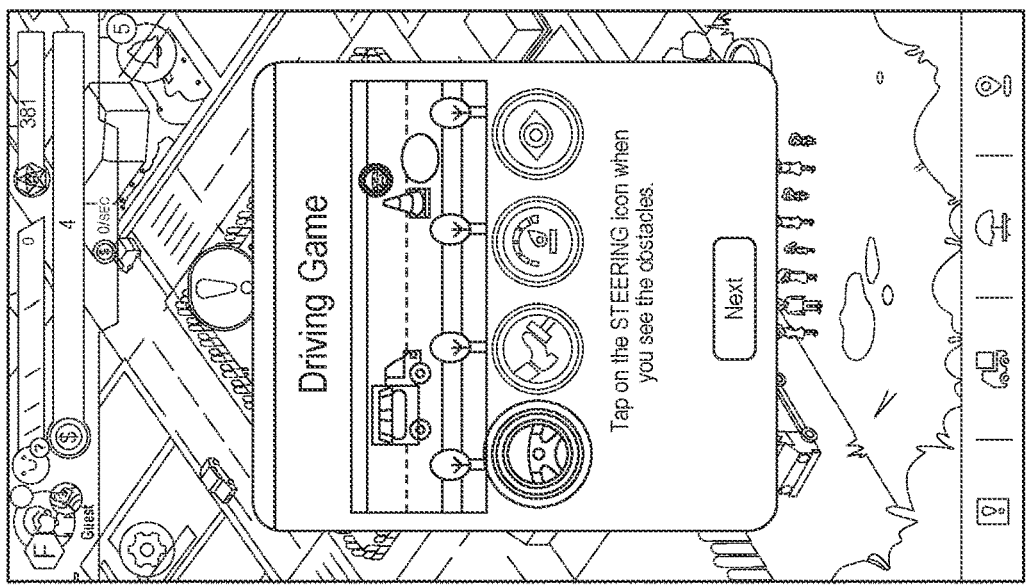
Figure 17B:
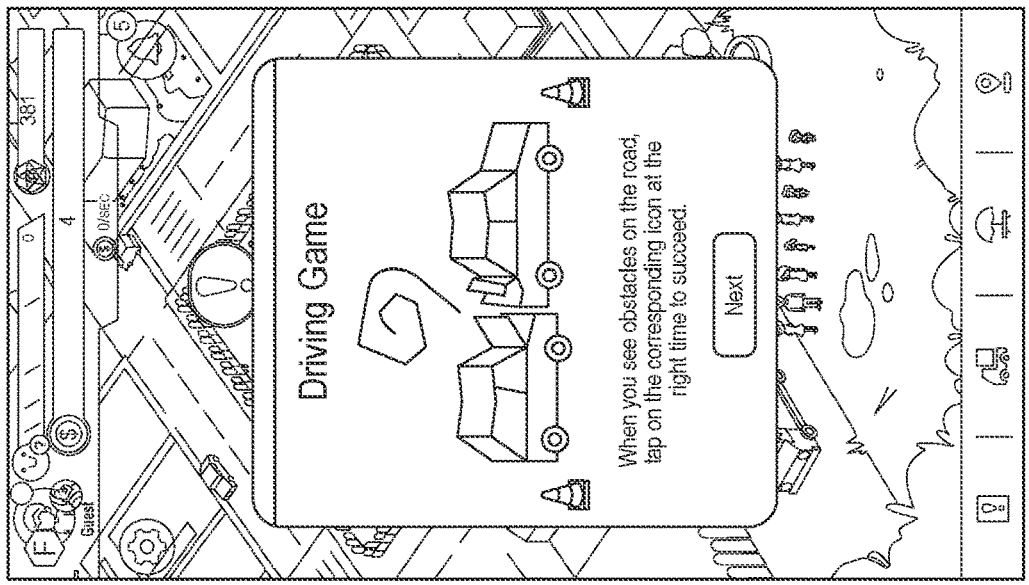
Figure 17A:
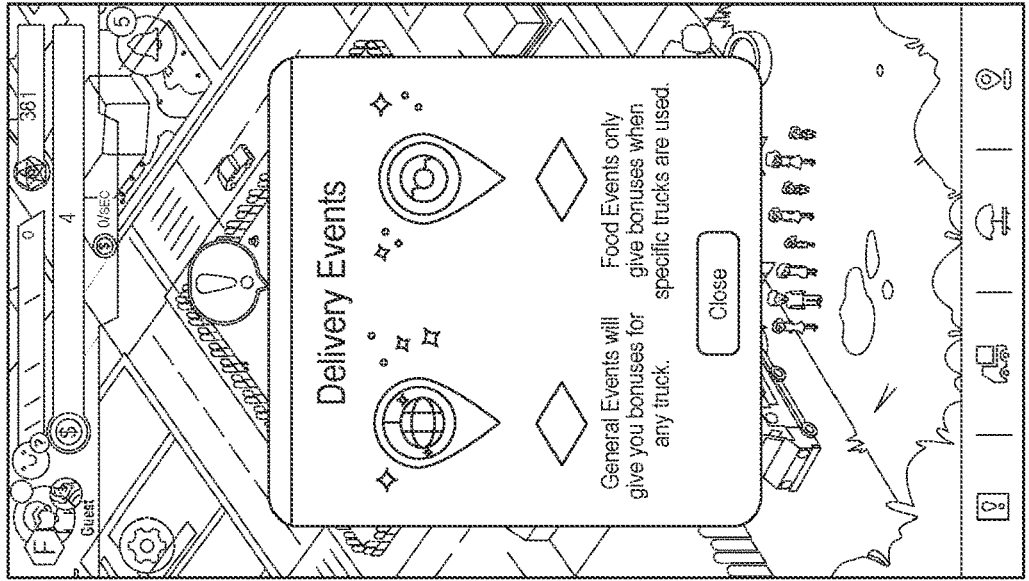

FIG. 17A depicts an example interface associated with a virtual environment, the example interface including an explanatory presentation notifying the user that the telematics-based game includes general events that are beneficial to any virtual vehicles of the game, as well as food events beneficial to only specific virtual vehicles of the game.

FIG. 17B depicts an example interface associated with a virtual environment, the example interface including an explanatory presentation notifying the user that during manual mode of the driving game, the user is to tap on a corresponding icon at the right time to succeed in controlling a virtual vehicle to overcome a corresponding obstacles.

FIG. 17C depicts an example interface associated with a virtual environment, the example interface including an explanatory presentation notifying the user that upon encountering a steering obstacle, tap on the steering icon to avoid the steering obstacle.

Figure 18C:
Figure 18B:
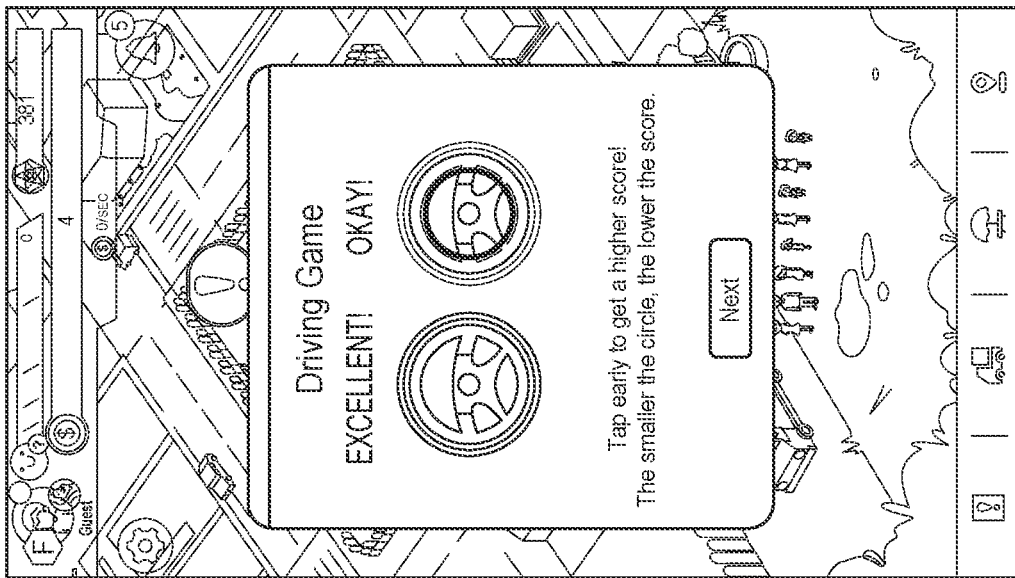
Figure 18A:
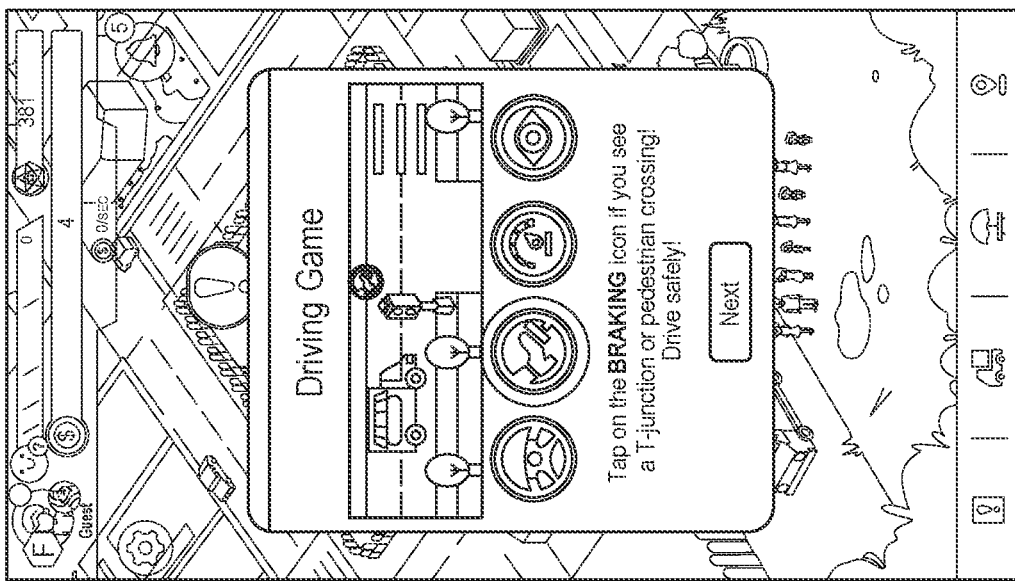

FIG. 18A depicts an example interface associated with a virtual environment, the example interface including an explanatory presentation notifying the user that upon encountering a braking obstacle, tap on the braking icon to avoid the braking obstacle.

FIG. 18B depicts an example interface associated with a virtual environment, the example interface including an explanatory presentation notifying the user that tapping the correct skill-associated icon early will gain a better score than tapping later.

FIG. 18C depicts an example interface associated with a virtual environment, the example interface including an explanatory presentation notifying the user that upon encountering a focus obstacle, tap on the focus icon to avoid the focus obstacle.

Figure 19C:
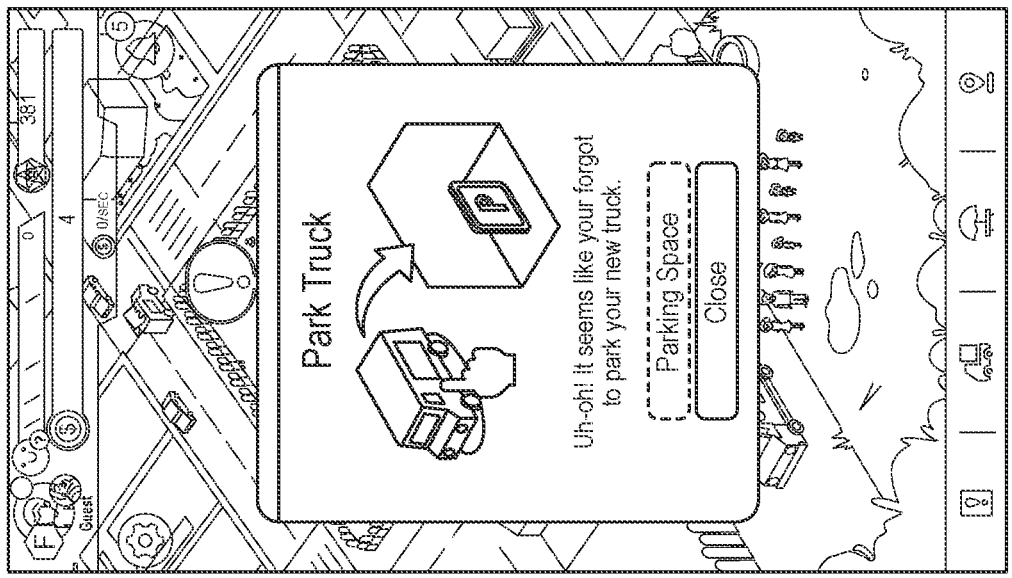
Figure 19B:
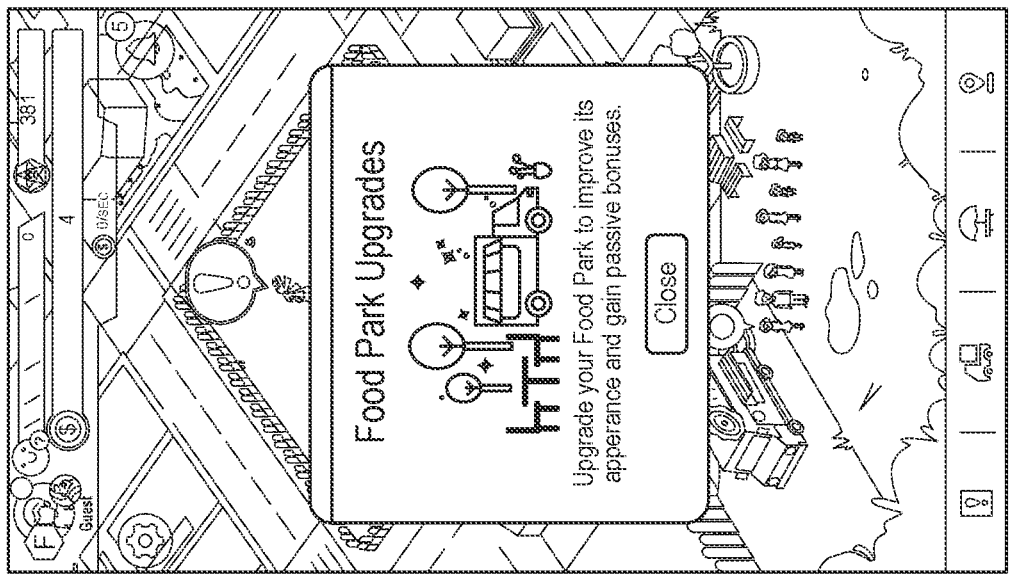
Figure 19A:

FIG. 19A depicts an example interface associated with a virtual environment, the example interface including an explanatory presentation notifying the user that upon encountering a speeding obstacle, tap on the speeding icon to avoid the speeding obstacle.

FIG. 19B depicts an example interface associated with a virtual environment, the example interface including an explanatory presentation notifying the user that the user may upgrade appearance and/or bonus-gaining items or features.

FIG. 19C depicts an example interface associated with a virtual environment, the example interface including an explanatory presentation notifying the user that the virtual vehicle still need to be parked.

Figures 20A, 20B, 20C:
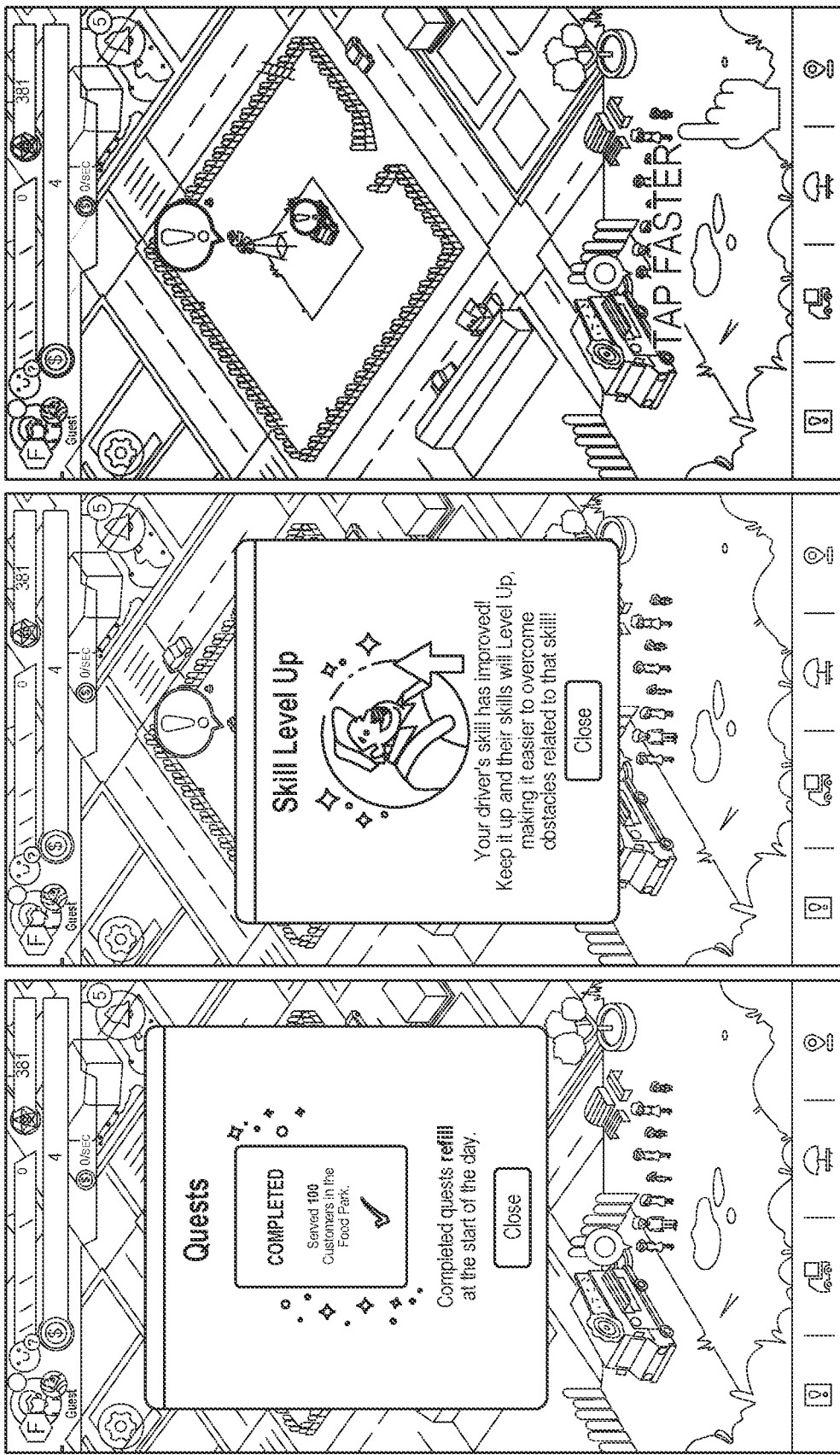

FIG. 20A depicts an example interface associated with a virtual environment, the example interface including an explanatory presentation notifying the user that one or more quests have been completed and new quests will be generated at the start of the day.

FIG. 20B depicts an example interface associated with a virtual environment, the example interface including an explanatory presentation notifying the user that a virtual character has leveled up a virtual skill (e.g., virtual steering skill, virtual braking skill, virtual focus skill, or virtual speeding skill), indicating that the virtual character has become more capable in avoiding an associated virtual obstacle.

FIG. 20C depicts an example interface associated with a virtual environment, the example interface including an explanatory presentation notifying the user that in a tapping game, the user may tap faster to gain points faster.

Figure 21B:
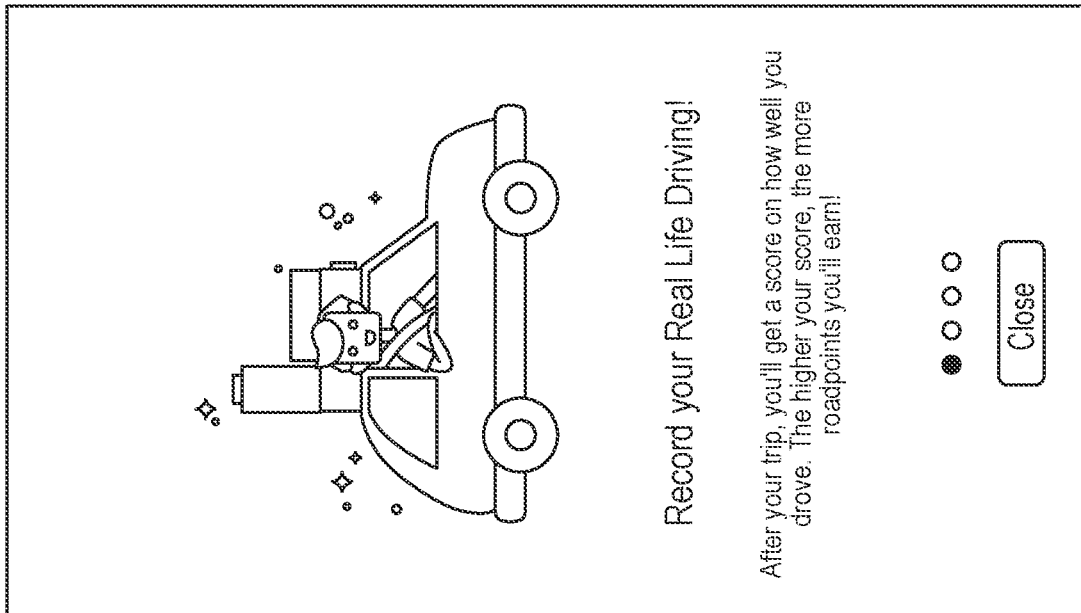
Figure 21A:
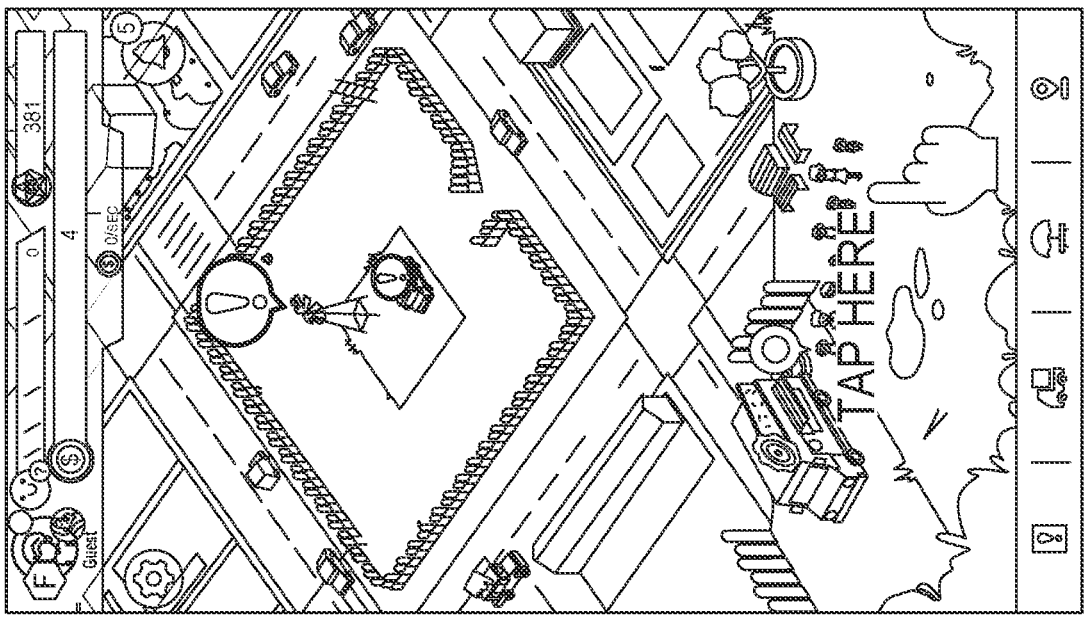

FIG. 21A depicts an example interface associated with a virtual environment, the example interface including an explanatory presentation notifying the user that in a tapping game, the user may tap at a specific region to gain points.

FIG. 21B depicts an example interface associated with a virtual environment, the example interface including an explanatory presentation notifying the user to record real life driving to gain roadpoints based on trip scores.

Figure 22:
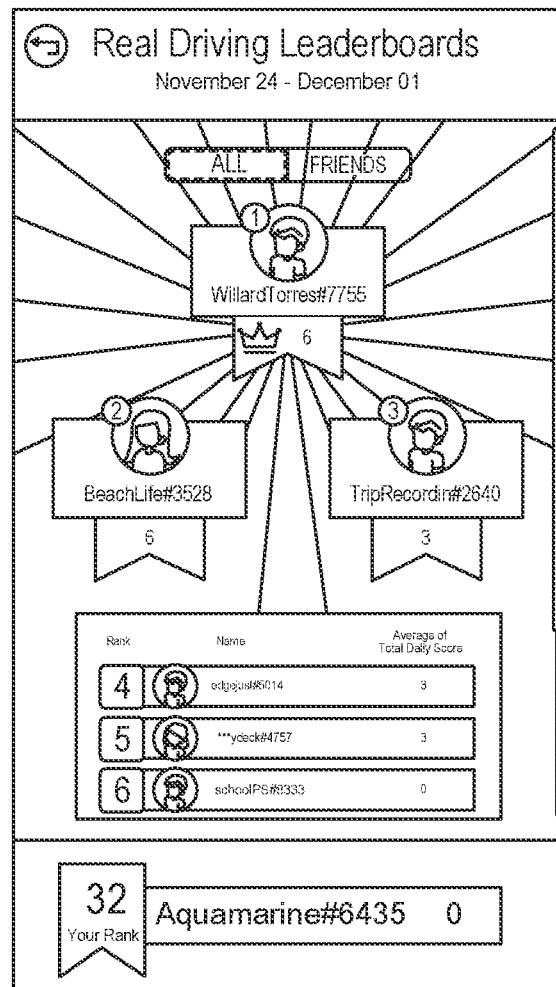

FIG. 22 depicts an example interface associated with a virtual environment, the example interface including a real driving leaderboard, such as a weekly real driving leaderboard, such as one displaying the user's current rank against one or more other players of the telematics-based game. As depicted, the ranking is based on daily score earned.

Figure 23B:
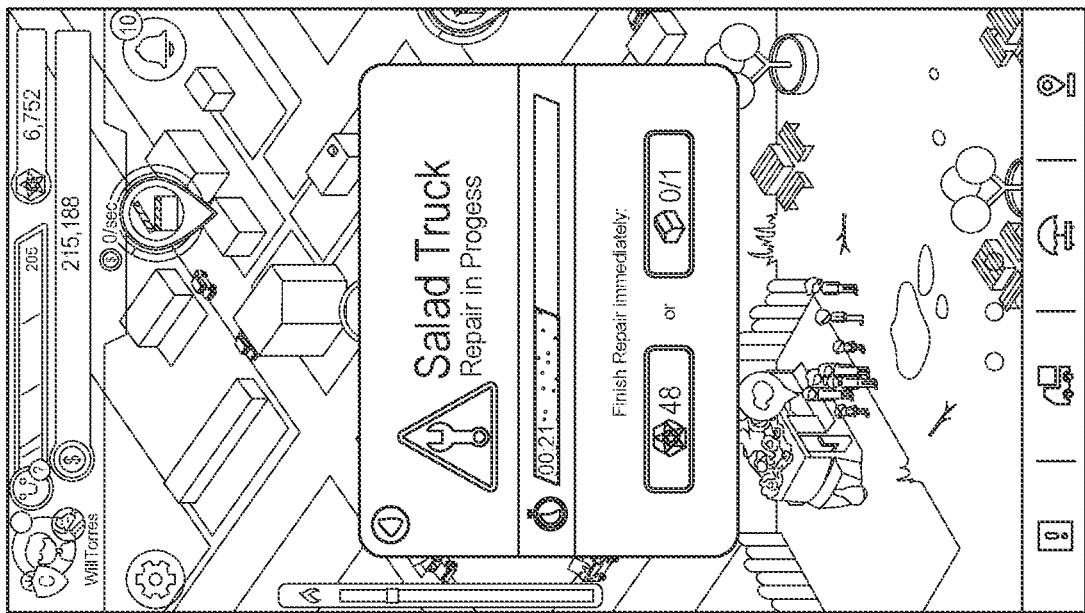
Figure 23A:
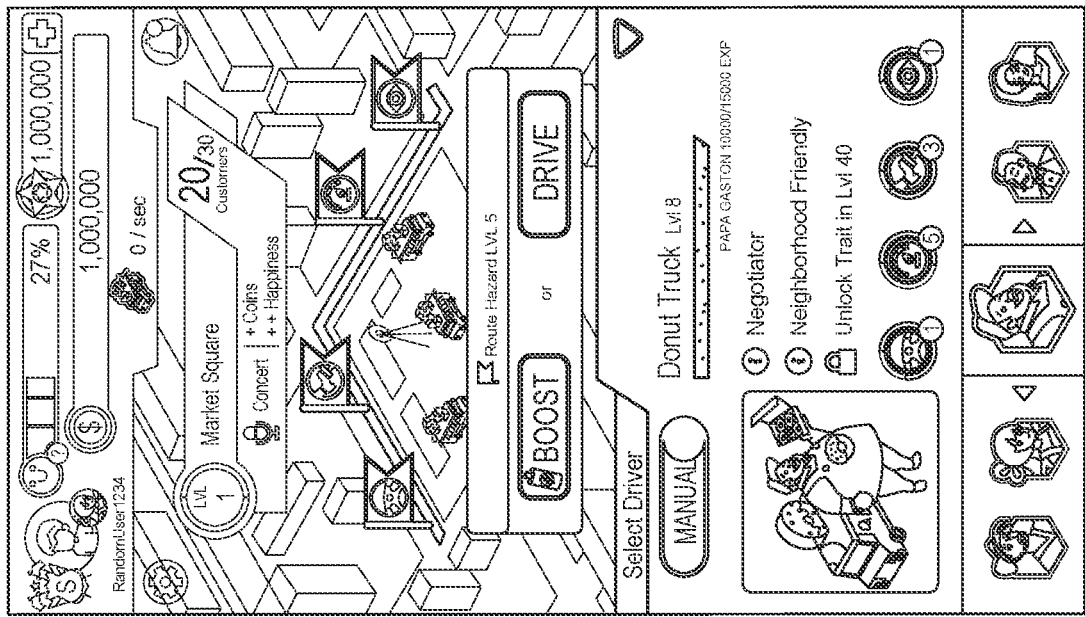

FIG. 23A depicts an example interface associated with a virtual environment, the example interface including a virtual map consisting of various roadways, buildings, homes, landscape elements, and/or the like. On the virtual map, the example interface further includes a virtual route corresponding to a virtual trip, the virtual route including one or more virtual obstacles to be encountered by a virtual character should a user sends the virtual character onto the virtual trip. In the depicted example, the one or more virtual obstacles include a focus obstacle, a speeding obstacle, a braking obstacle, and a steering obstacle. In various examples, the example interface further includes a trip difficulty level of the virtual trip, which may be determined based on the one or more obstacles of the virtual trip and/or the virtual character's one or more virtual skills. In the depicted example, the trip difficulty level is 5, and the virtual character has a virtual steering skill rating of 1, a virtual braking skill rating of 3, a virtual speeding braking skill rating of 5, and a virtual focus skill rating of 1. In the depicted example, the interface shows that the virtual character would travel the virtual trip with the autodrive mode deactivated. In various examples, the example interface presents a boost command configured to be selected by a user, which upon the user's selection, modifies, such as increases, the likelihood of success of the virtual character completing the virtual trip. In certain examples, the example interface presents a drive command configured to be selected by a user, which upon the user's selection, sends the virtual character onto the virtual trip. In various examples, the example interface presents a plurality of virtual characters, each selectable by a user, such as to be trained, to be sent onto a virtual trip, and to be played in the telematics-based game.

FIG. 23B depicts an example interface associated with a virtual environment, the example interface including a quick repair icon configured to be selected by the user to immediately finish a virtual vehicle repair. In some examples, a user may spend a certain amount of roadpoints to immediately repair a virtual vehicle.

Figure 24C:
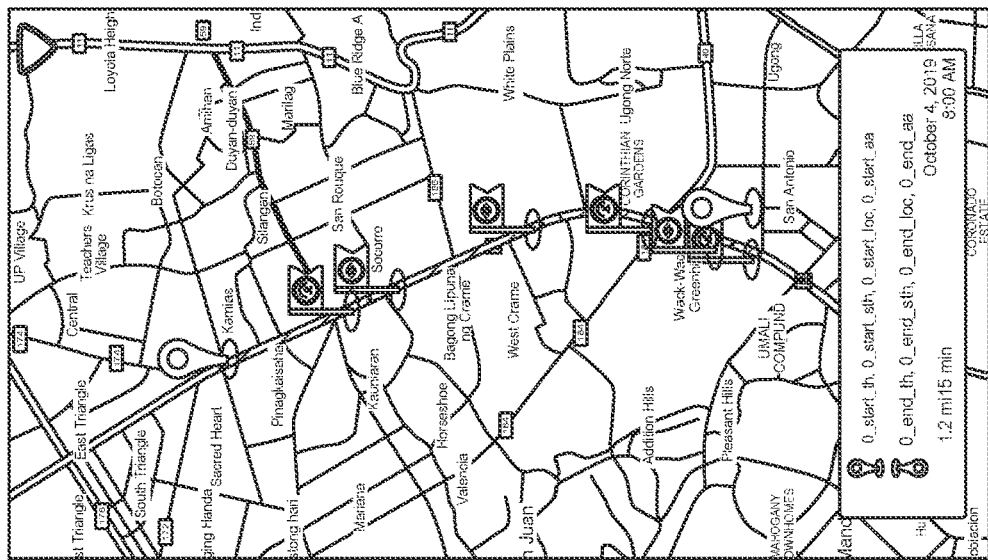
Figure 24B:
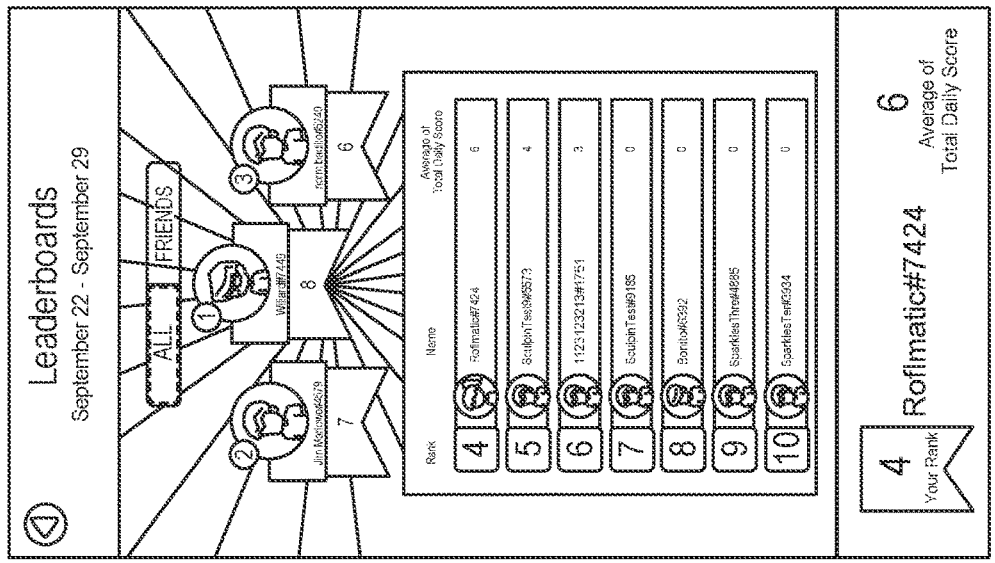
Figure 24A:
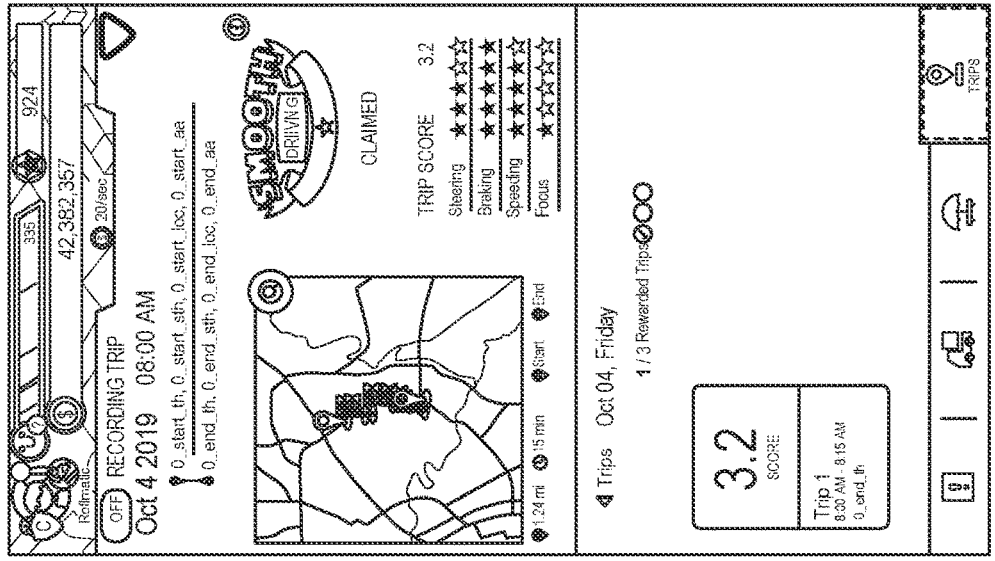

FIG. 24A depicts an example interface associated with a virtual environment, the example interface including a trip summary of a real trip driven by a user. As depicted, the interface presents a real map indicating the route taken by the user in the real trip. As depicted, the interface presents an overall trip score and a plurality of scores associated with a plurality of real skills (e.g., steering, braking, speeding, focus). As depicted, the interface presents a trip rating, which as indicated in the example, is "smooth driving."

FIG. 24B depicts an example interface associated with a virtual environment, the example interface including a real driving leaderboard, such as a weekly real driving leaderboard, such as one displaying the user's current rank against one or more other players of the telematics-based game. As depicted, the ranking is based on daily score earned.

FIG. 24C depicts an example interface associated with a virtual environment, the example interface including a real map indicating the route taken by the user in the real trip. As depicted, the real map includes one or more real obstacles encountered by the user during the real trip. In the depicted example, the user encountered three real speeding obstacles and three real focus obstacles, on the real trip.

Figure 25C:
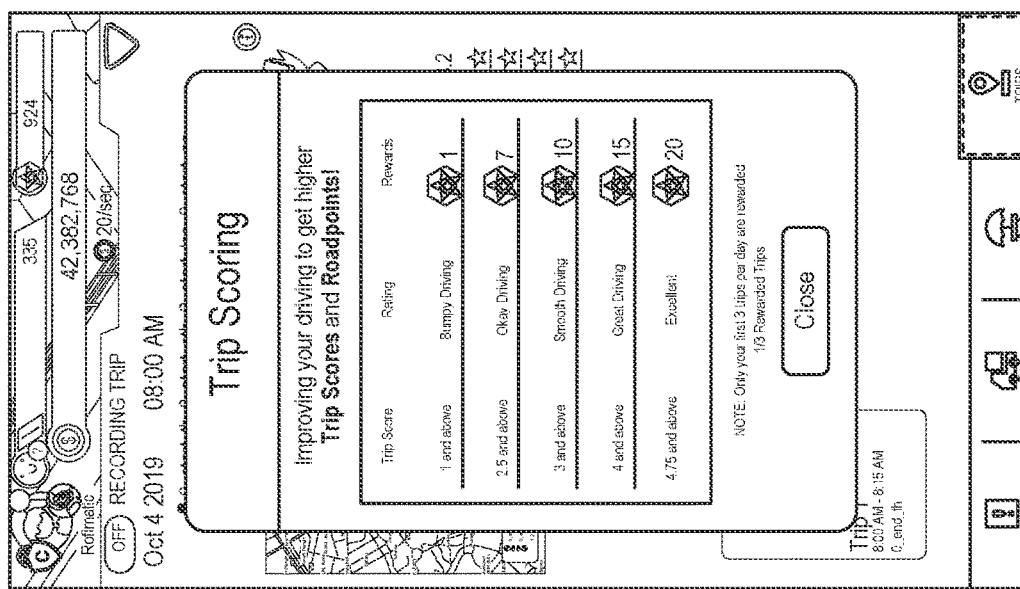
Figure 25B:
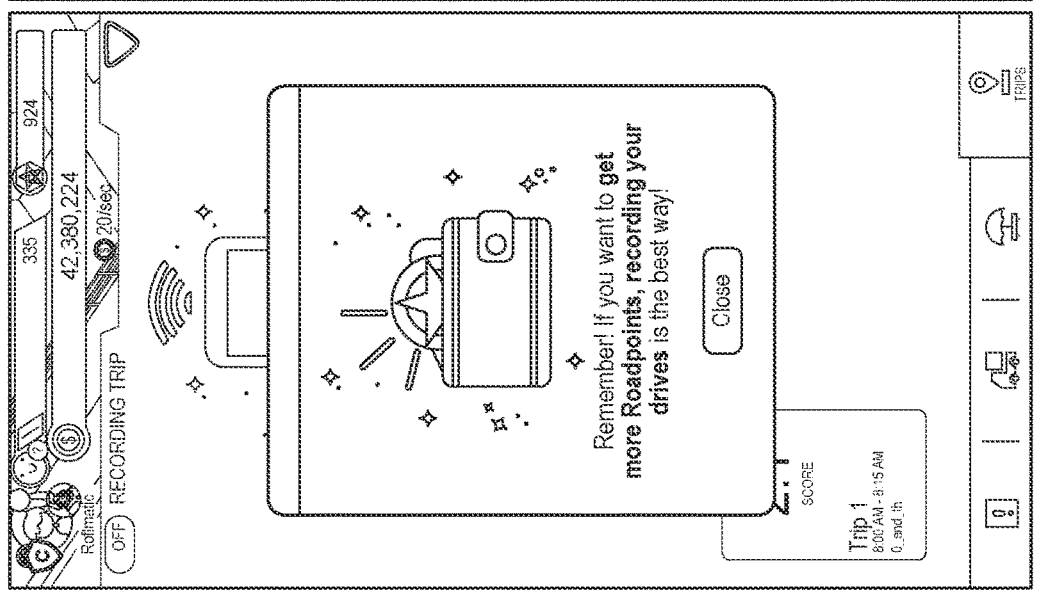
Figure 25A:
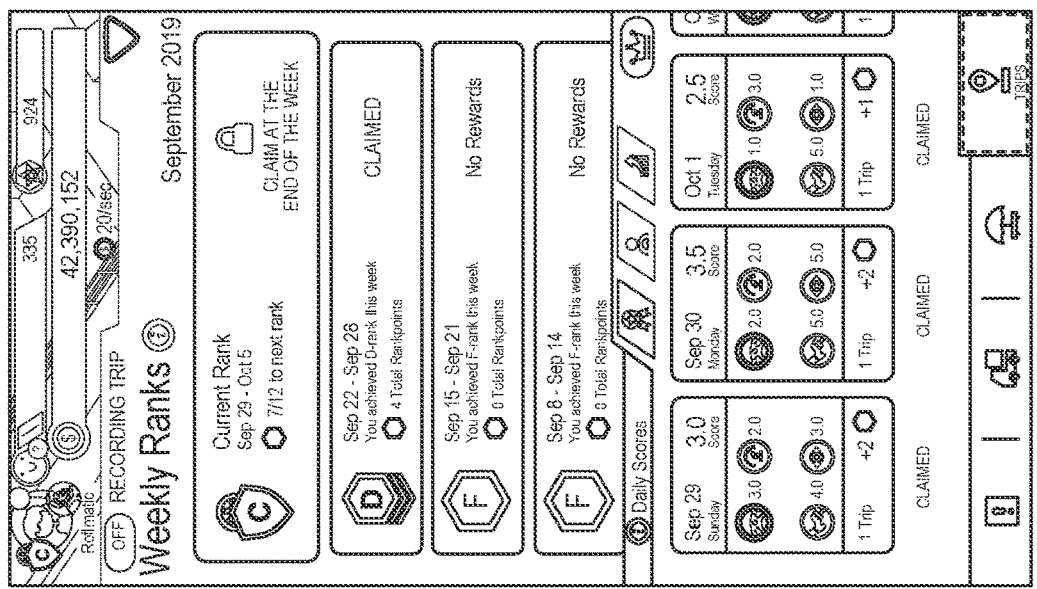

FIG. 25A depicts an example interface associated with a virtual environment, the example interface including a rank history notifying a user's historic real-world driving performances, such as weekly performances.

FIG. 25B depicts an example interface associated with a virtual environment, the example interface including a presentation to remind a user to record one or more real trips to earn in-game currency.

FIG. 25C depicts an example interface associated with a virtual environment, the example interface including a trip scoring presentation to teach a user how a rating of a real trip, such as one driven by the user, influences a daily score assignable and/or a reward grantable to the user or to a virtual character. For example, a rating may be bumpy driving, okay driving, smooth driving, great driving, great driving, or excellent driving. For example, a reward may be a first in-game currency, which may be referred to as roadpoints, such as one that may be accumulated and/or used to purchase one or more in-game items of the telematics-based game. In some examples, the first in-game currency may only be earned via the user's real driving during one or more real trips. In some examples, said in-game items may only be purchased using the first in-game currency.

Figures 26A, 26B:
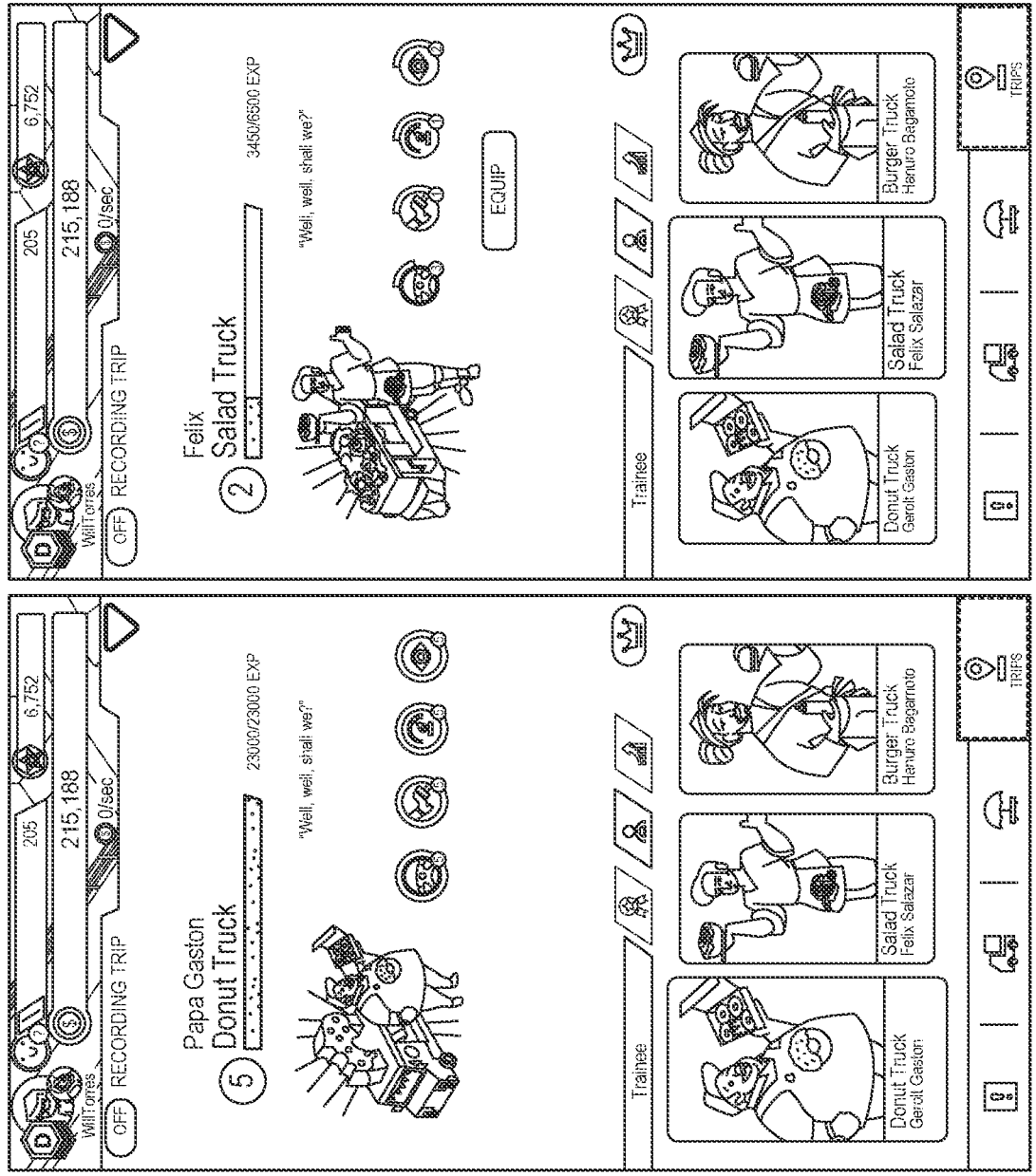

FIGS. 26A and 26B depict example interfaces associated with a virtual environment, the example interfaces displaying a character selection menu configured to present a plurality of selectable virtual characters and their plurality of virtual skill levels.

Figure 27C:
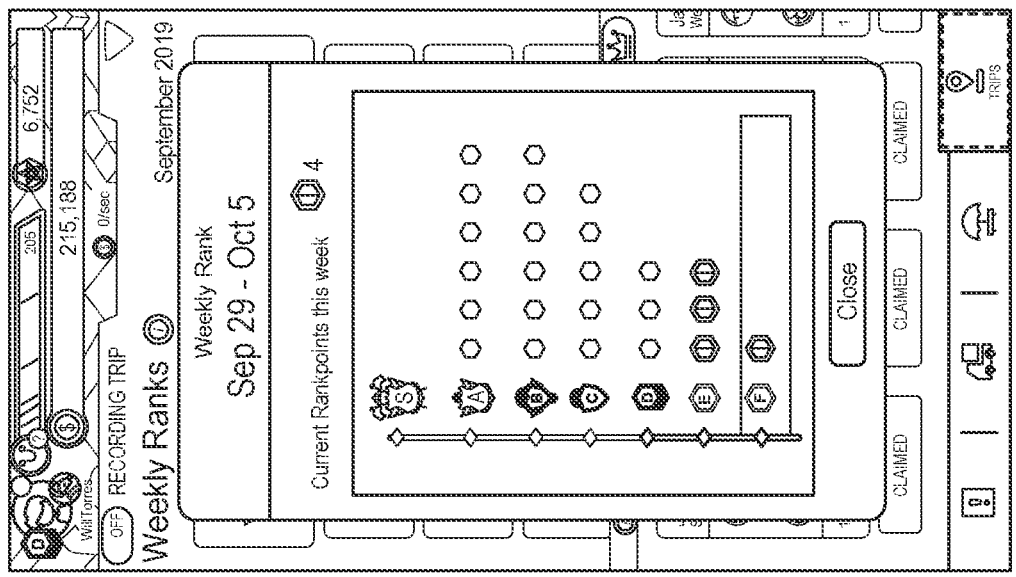
Figure 27B:
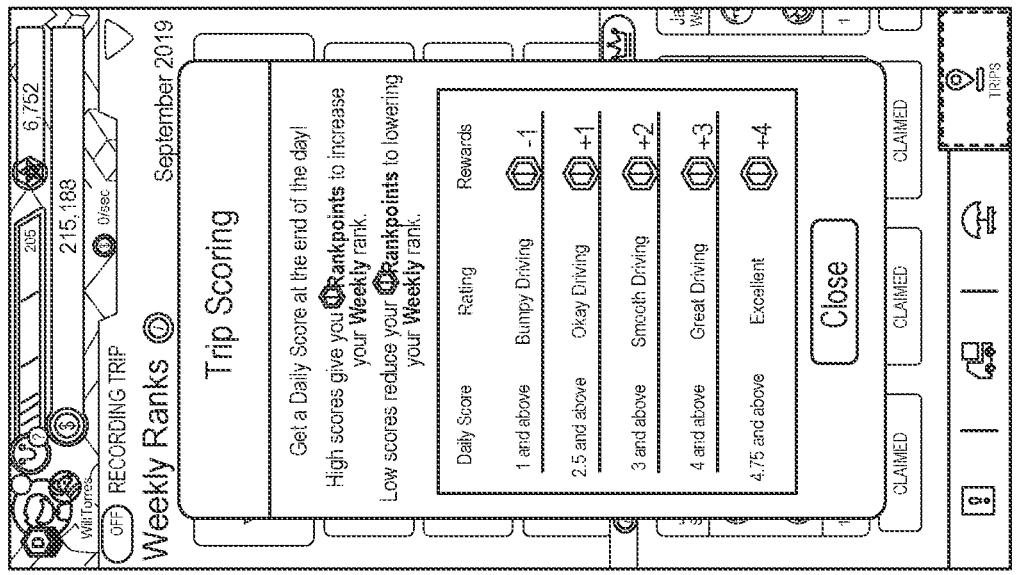
Figure 27A:
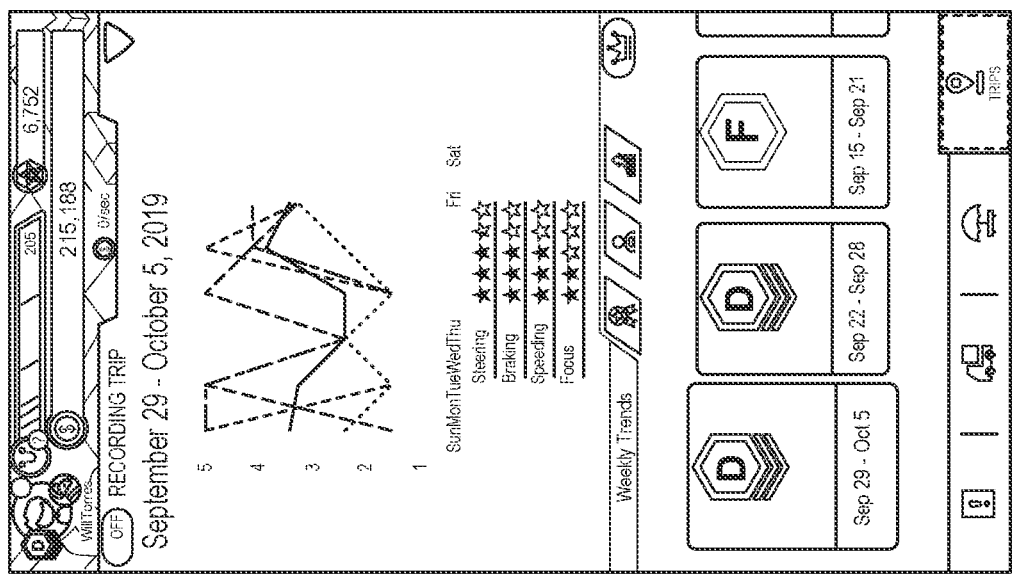

FIG. 27A depicts an example interface associated with a virtual environment, the example interface including a weekly performance of a user or a virtual character. In the depicted example, the weekly performance includes skill ratings of a plurality of real skills.

FIG. 27B depicts an example interface associated with a virtual environment, the example interface including a trip scoring presentation to teach a user how a rating of a real trip, such as one driven by the user, influences a daily score assignable and/or a reward grantable to the user or to a virtual character. For example, a rating may be bumpy driving, okay driving, smooth driving, great driving, great driving, or excellent driving. For example, a reward may be a rankpoint, such as one that may be accumulated by a user or a virtual character, such as for a daily ranking, weekly ranking, and/or monthly ranking.

FIG. 27C depicts an example interface associated with a virtual environment, the example interface including a weekly rank presentation to show a user his/her current rank and/or rankpoint accumulation for the week.

Figures 28A, 28B, 28C:
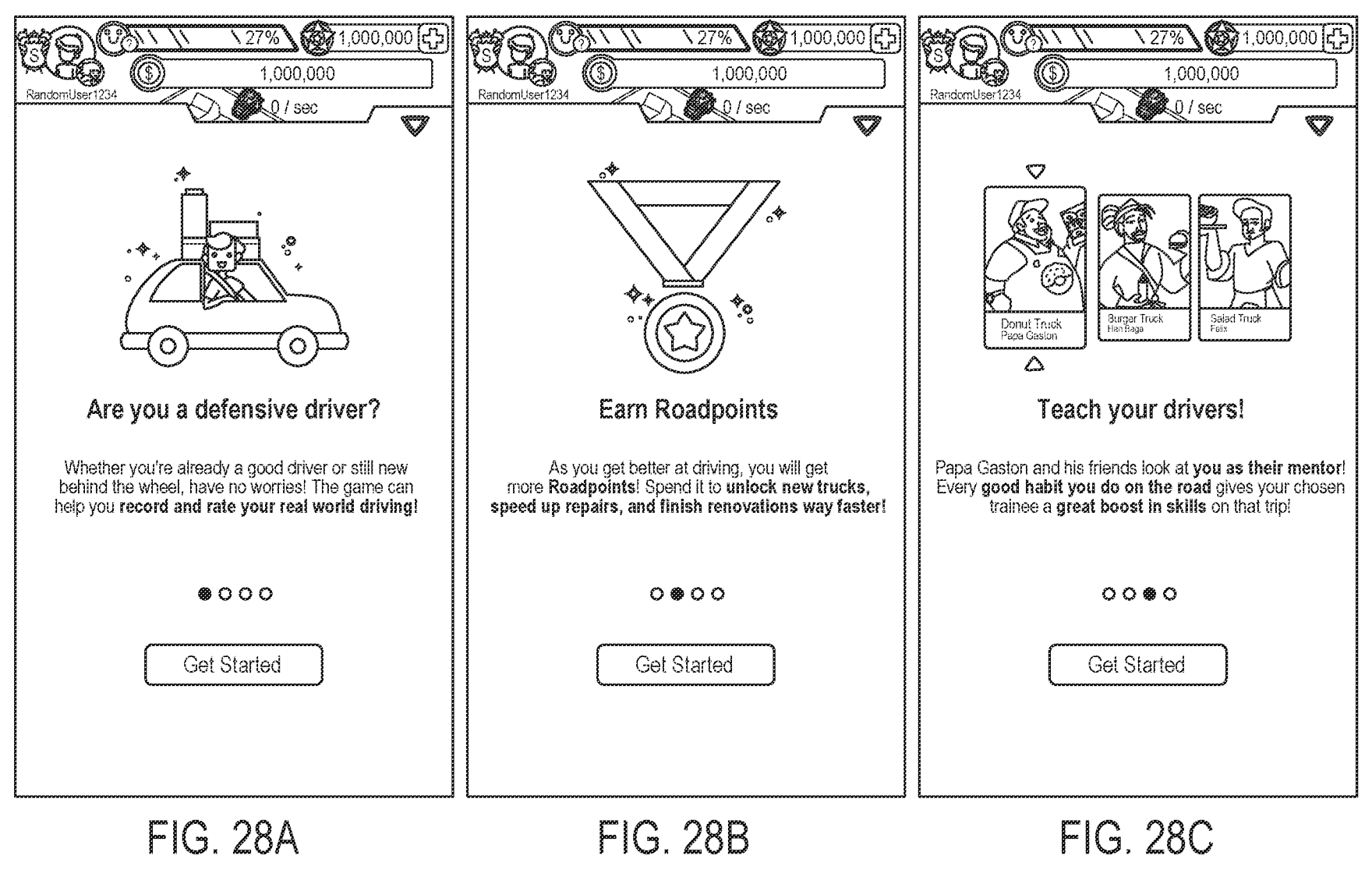

FIG. 28A depicts an example interface associated with a virtual environment, the example interface including an explanatory presentation to notify a user that the game may record and rate real driving of the user to help identify whether the user is a defensive driver.

FIG. 28B depicts an example interface associated with a virtual environment, the example interface including an explanatory presentation to notify a user that roadpoints may be used in-game to perform certain tasks.

FIG. 28C depicts an example interface associated with a virtual environment, the example interface including an explanatory presentation to notify a user that the user may select a virtual character from a plurality of virtual characters to train, such as by operating a real vehicle with good habits during a real trip.

Figure 29:
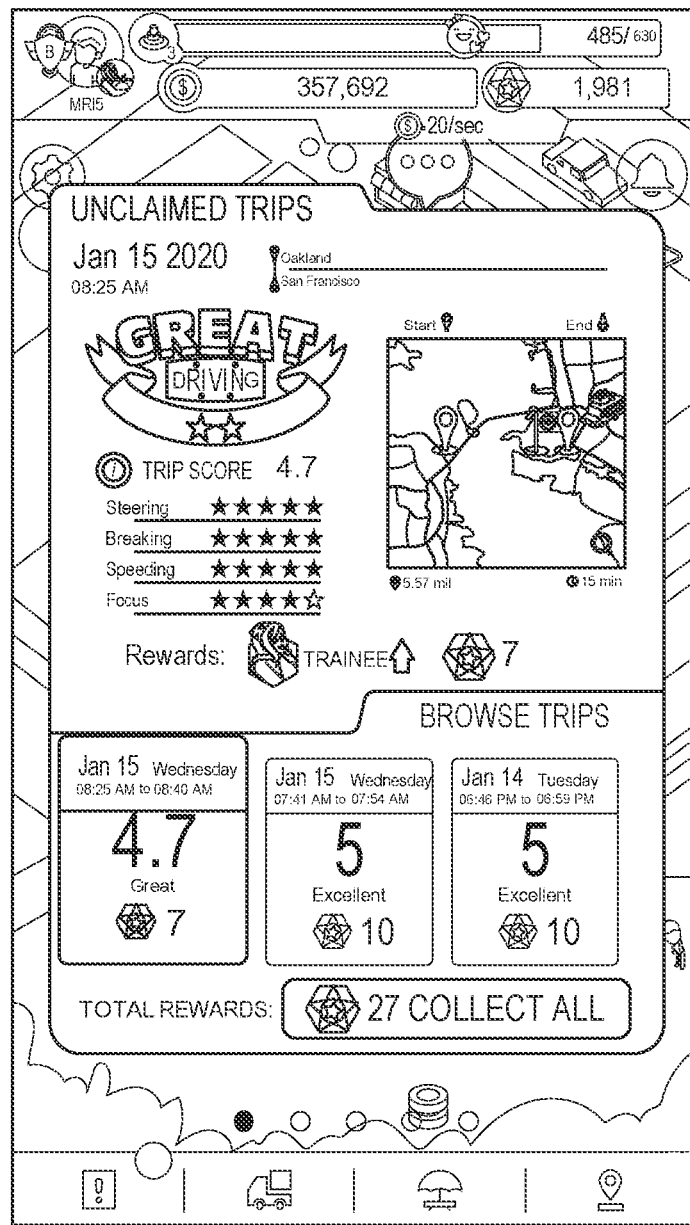

FIG. 29 depicts an example interface associated with a virtual environment, the example interface including a trip summary of a real trip driven by a user. As depicted, the interface presents a real map indicating the route taken by the user in the real trip. As depicted, the interface presents an overall trip score and a plurality of scores associated with a plurality of real skills (e.g., steering, braking, speeding, focus). As depicted, the interface presents a trip rating, which as indicated in the example, is "great driving." As depicted, the interface further presents rewards earned during the real trip, such as a trainee level-up and roadpoints.

Figure 30:
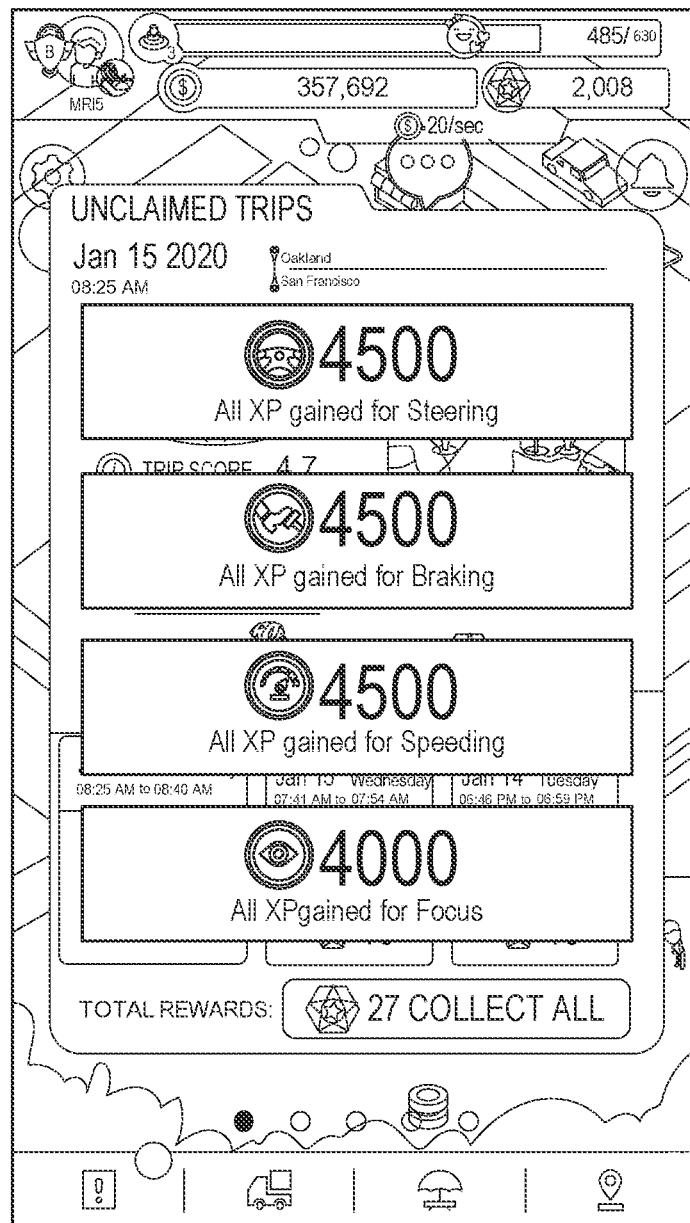

FIG. 30 depicts an example interface associated with a virtual environment, the example interface including a presentation showing experience gained for one or more skills, such as in-game experience (or skill points) earned for one or more virtual skills. In the depicted example, 4500 skill points (e.g., skillpoints) were gained for the virtual steering skill, 4500 skill points (e.g., skillpoints) were gained for the virtual braking skill, 4500 skill points (e.g., skillpoints) were gained for the virtual speeding skill, and 4000 skill points (e.g., skillpoints) were gained for the virtual focus skill.

Figure 31:
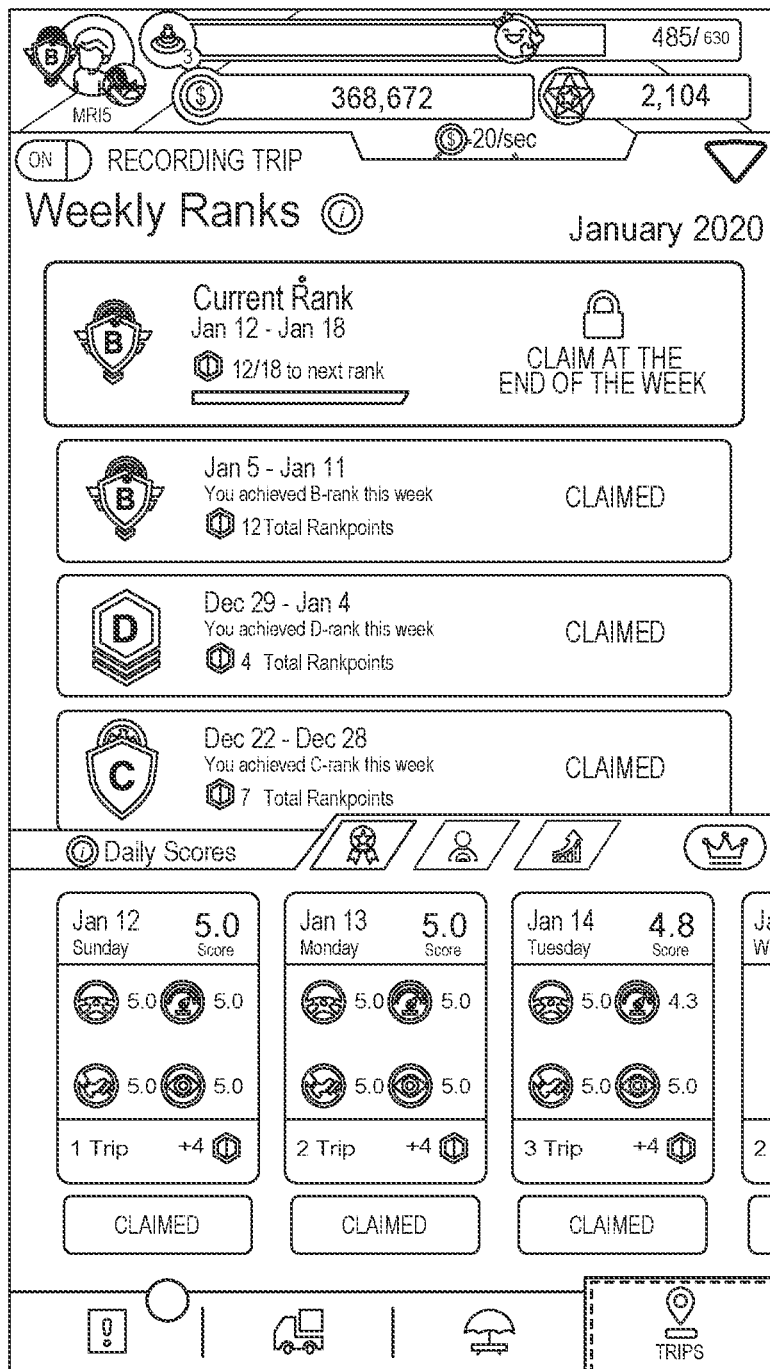

FIG. 31 depicts an example interface associated with a virtual environment, the example interface including a rank history notifying a user's historic real-world driving performances, such as weekly performances.

Figure 32:
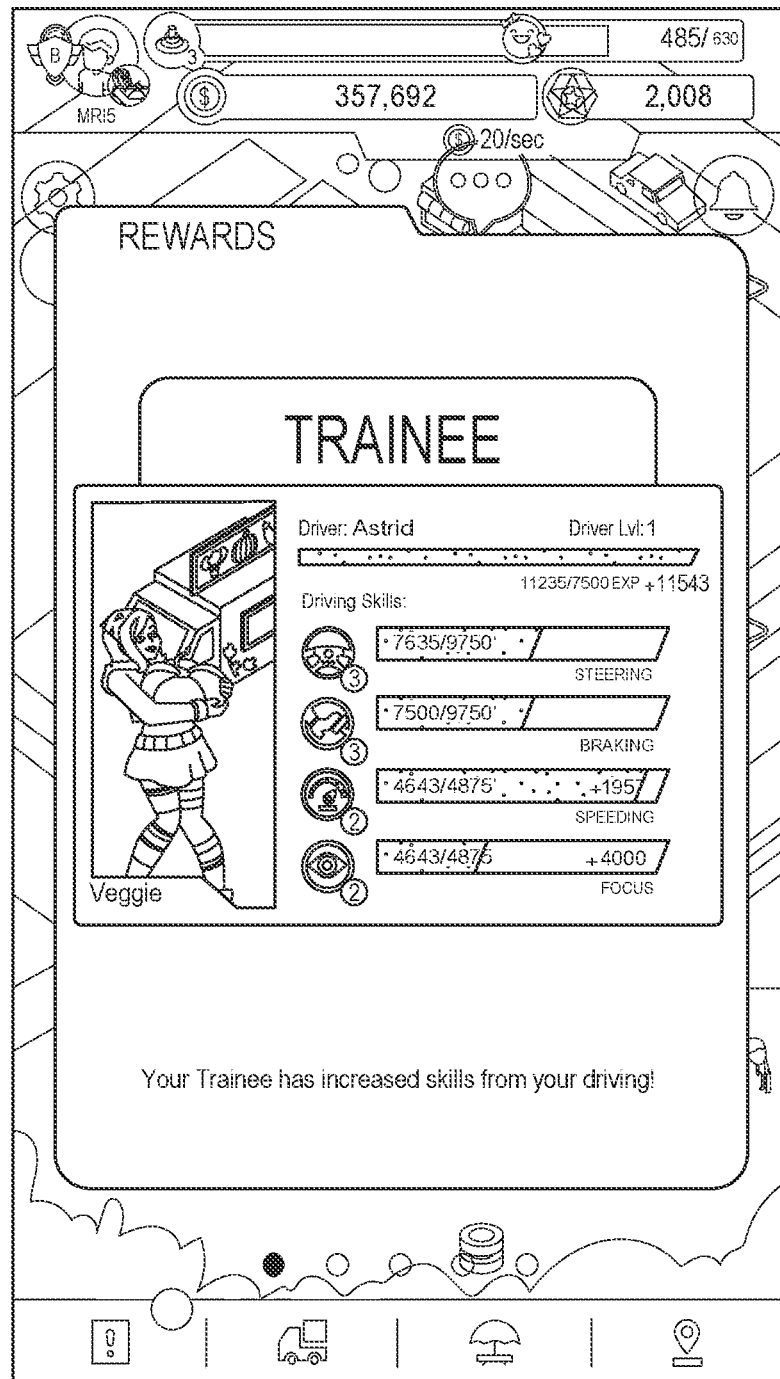

FIG. 32 depicts an example interface associated with a virtual environment, the example interface including a presentation showing a skill level page of a virtual driver. In the depicted example, the virtual driver is at level one, and has a virtual steering skill level of 3, a virtual braking skill level of 3, a virtual speeding skill level of 2, and a virtual focus level of 2.

Figure 33:
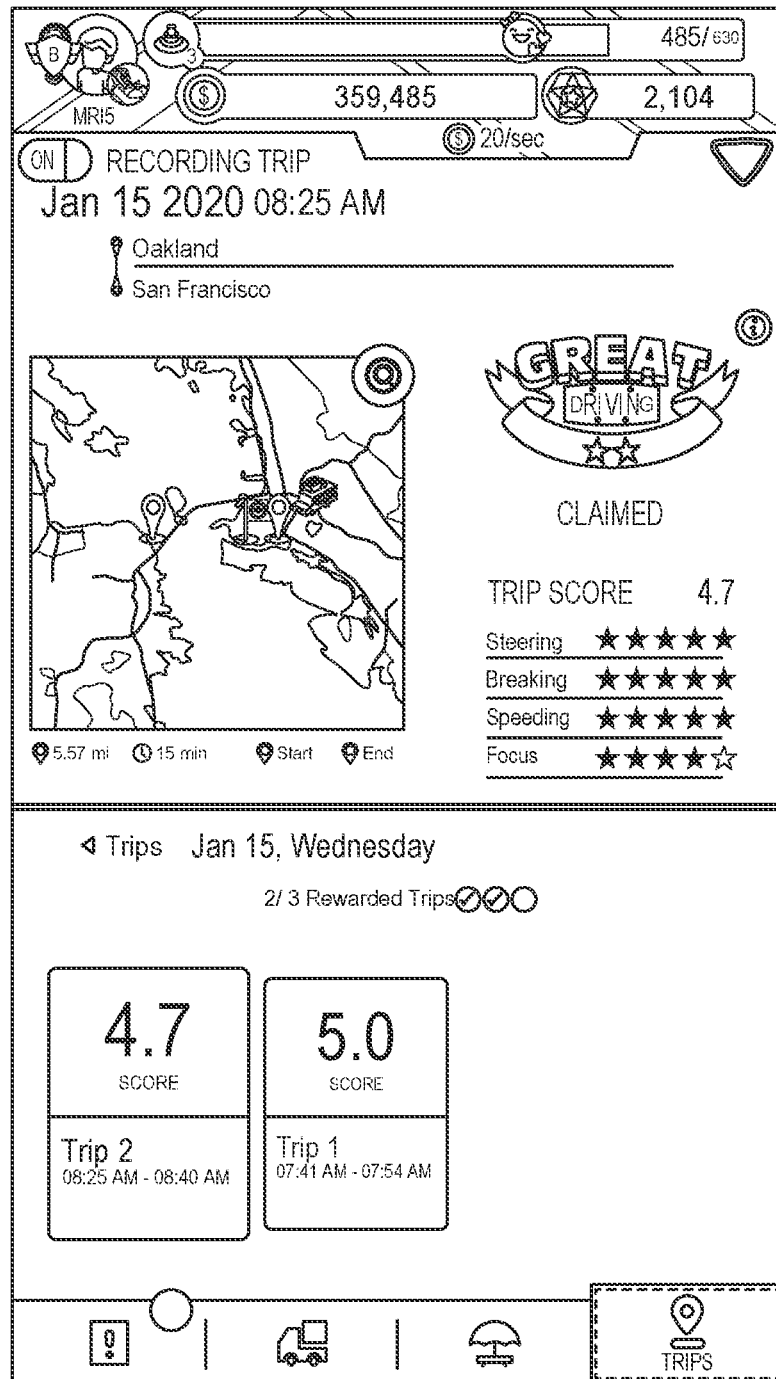

FIG. 33 depicts an example interface associated with a virtual environment, the example interface including a trip summary of a real trip driven by a user. As depicted, the interface presents a real map indicating the route taken by the user in the real trip. As depicted, the interface presents an overall trip score and a plurality of scores associated with a plurality of real skills (e.g., steering, braking, speeding, focus). As depicted, the interface presents a trip rating, which as indicated in the example, is "great driving." As depicted, the interface further presents rewards earned during the real trip, such as a trainee level-up and roadpoints.

Figure 34:
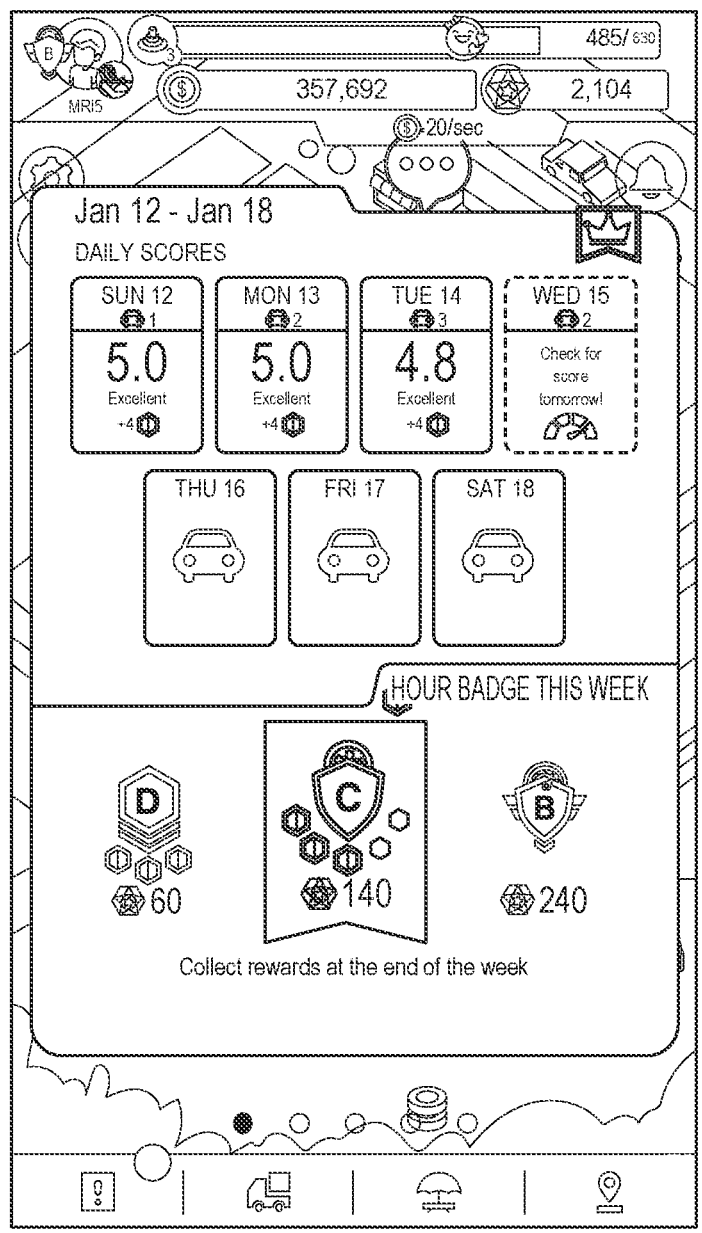

FIG. 34 depicts an example interface associated with a virtual environment, the example interface including a presentation showing a weekly summary for a user, the weekly summary indicating the quantity of real trips driven by the user in a given week, a daily score, roadpoints and/or rankpoints earned during each day, and a weekly rank.

Examples of Certain Embodiments of the Present Disclosure

Certain embodiments of the present disclosure are directed to telematics data processing. More particularly, some embodiments of the disclosure provide methods and systems for training a virtual operator based at least in part upon a real-world vehicle operator. Merely by way of example, some embodiments of the disclosure includes connecting one or more real-world driving behaviors of a real-world vehicle operator to one or more driving behavior of a virtual operator in a telematics-based game, but it would be recognized that the disclosure has a much broader range of applicability.

In certain embodiments, systems and/or methods of the present disclosure provide entertainment to a user, wherein the entertainment is generated based at least in part upon telematics data associated with the user. In some examples, the entertainment is a telematics-based game playable by the user.

In certain embodiments, systems and/or methods of the present disclosure provide one or more indicators associated with the driving behavior of a driver based at least in part upon telematics data associated with the driver. In some examples, systems and/or methods of the present disclosure modify an insurance policy of the driver based at least in part upon the driving behavior, such as through recurring automatic policy-updates. In some examples, such automatic policy-updates act as an incentive for the driver to improve their driving behavior.

In certain embodiments, systems and/or methods of the present disclosure provide a calibration session for calibrating one or more base scores corresponding to one or more driving characteristics (e.g., speeding, braking, steering, focus). In some examples, systems and methods provide a plurality of driving sessions, each driving session of the plurality of driving sessions corresponds to a set of driving scores, and each set of driving scores corresponds to a set of driving characteristics (e.g., speeding, braking, steering, focus).

In certain embodiments, systems and/or methods of the present disclosure provide a game, which may be called Foodtruck Fury or Food Truck Fury, that allows Google sign-up and/or Facebook sign-up. In some examples, the game provided is a tapper genre game, such as one including buttons for steering, braking, accelerating, and/or focusing. In some examples, the game provided includes a Food Truck Park where one or more food trucks may operate. In some examples, each food truck is associated with one virtual driver. In some examples, each virtual driver can level up, such as via in-game interactions and/or based on one or more driving behaviors of an associated real-world driver.

In certain embodiments, systems and/or methods of the present disclosure provide a game including a game map having a plurality of regions, some of which may be unlockable, such as being inaccessible by a food truck until it is unlocked.

In certain embodiments, systems and/or methods of the present disclosure provide a game including a food truck having a plurality of food items, some of which may be unlockable, such as being unavailable for sale until it is unlocked.

In certain embodiments, systems and/or methods of the present disclosure provide a game including one or more story-based missions, game controls tutorials, zombie-based story.

In certain embodiments, systems and/or methods of the present disclosure provide a game including roadpoints (or other currencies under a different name) earnable by a user and/or a driver. For example, roadpoints may be earned by a driver via driving in the real world. In some examples, the amount of roadpoints earned by a driver corresponds to the driving behavior of the driver during the real-world drive. For example, the better the driver drives in the real world, the greater the amount of roadpoints the driver is awarded. In certain examples, the roadpoints are a type of hard currency, such as one that can only be earned via real-world driving, such as cannot be earned by purchasing with real-world currencies (e.g., United States Dollars). In some examples, the roadpoints may be used to upgrade a virtual driver, a food truck, and/or a food park, and/or to purchase items, equipment, gifts, and/or recipes. In certain examples, systems and methods of the present disclosure provide a game including a soft currency (e.g., regular points/dollars), which may be used to upgrade a virtual driver, a food truck, and/or a food park, and/or to purchase items, equipment, gifts, and/or recipes. In some examples, one or more types of purchases or upgrades available via the use of hard currency is not available via the use of soft currency.

In certain embodiments, systems and/or methods of the present disclosure provide a game including receiving telematics data associated with a driver/player/user, such as data collected using GPS, accelerometer, and/or gyroscope. In some examples, systems and/or methods of the present disclosure provide a game including granting roadpoints based at least in part upon the received telematics data.

In certain embodiments, systems and/or methods of the present disclosure provide a game including a virtual driver trainable (e.g., having levels for leveling up, corresponding to one or more virtual driver's driving characteristics) by a real-world driver, such as based at least in part upon telematics data associated with the real-world driver. In some examples, systems and/or methods of the present disclosure provide a game including a plurality of virtual drivers (e.g., each virtual driver corresponding to a food truck of a plurality of food trucks) trainable by a real-world driver, such as one at a time. For example, a user/driver/player may select one virtual driver from the plurality of virtual drivers as a trainee, such as one who gains experience based at least in part upon one or more driving behaviors of the real-world driver. In some examples, the same trainee can gain experience and/or level up through one or more driving trips driven by the real-world driver, such as until the user/player/driver selects another virtual driver as a new trainee. In some examples, one or more virtual drivers may have driving scores (e.g., corresponding to driving characteristics) different from that of the real-world driver, such as owing to the one-on-one training mechanism. In various examples, a virtual driver levels up, such as when selected as a trainee, faster if the real-world drive showed better driving behavior (e.g., having higher driving scores corresponding to one or more driving characteristics). In some examples, each driving trip of the real-world driver may be graded, such as Excellent, Great, Fair, or Bumpy, which may influence how the virtual driver levels.

In certain embodiments, systems and/or methods of the present disclosure provide a game including mini games that a player may play to level up the virtual drivers.

In certain embodiments, systems and/or methods of the present disclosure provide a game including a manual-drive mode, which when activated, the in-game food truck driven by the virtual driver is controlled by the player. In some examples, systems and methods of the present disclosure provide a game including an auto-drive mode, which when activated (e.g., by a player), would send an in-game food truck driven by the virtual driver on autopilot. For example, under auto-drive mode, a food truck may automatically drive to a destination without a player's interaction and/or automatically deliver food items at one or more destinations. In some examples, under auto-drive mode, a virtual driver may be sent on one or more tasks/missions/challenges, which the success rate/chance of completing each task of the one or more tasks corresponds to at least the levels of the driver characteristics of the virtual driver. In various examples, a player may control a plurality of food trucks simultaneously (e.g., spinning gameplay), such as by managing the tasks executable by the virtual drivers. In some examples, one or more zones of the map are harder zones having tasks of higher levels, which may correspond to the need for a virtual driver to have higher levels in order to have a high success rate in auto-drive mode.

In certain embodiments, systems and/or methods of the present disclosure provide a game for a player to play during a first time period, drive during a second time period (e.g., without playing the game), then claim reward in a third time period based at least in part upon the driving performed in the second time period. In some examples, the game limits rewardable driving trips to a specific number (e.g., three) per day.

In certain embodiments, systems and/or methods of the present disclosure provide a game for incentivizing a driver, as a player of the game, to drive better, such as for incentivizing improving in the driving characteristics of steering, braking, speeding, and/or focus.

In certain embodiments, systems and/or methods of the present disclosure provide a game including social network support, such as one allowing incorporation of one or more friend lists. In some examples, gifts may be sent between players, such as to friends, such as by sending a food truck to deliver said gifts. In some examples, the gift may depend on the rating of a virtual driver. In certain examples, each player is ranked weekly.

In certain embodiments, systems and/or methods of the present disclosure provide a game including a game map that is shared by various players, such as at different instances. In some examples, the game map is a ghost map of a real-world map. For example, as a ghost map, the real-world driving of a driver who is a player of the game, would travel in the virtual map according to the real-world driving.

In certain embodiments, systems and/or methods of the present disclosure provide a game including collaborative modes, such as a collaborative assault mode for multiple player to assault a city together.

In certain embodiments, systems and/or methods of the present disclosure provide a game with large player base, such as one imposed with an age limit and/or without a verification of insurance policy.

In certain embodiments, systems and/or methods of the present disclosure provide a game with driving score and/or level tracking over time.

In certain embodiments, systems and/or methods of the present disclosure provide a game where the actual driving of a real-world driver interacts with the virtual driving of the virtual driver in the game.

Examples of Systems According to Some Embodiments of the Present Disclosure

The present embodiments may relate to, inter alia, facilitating virtual operation of virtual vehicles within a virtual environment based on real-world vehicle operation data. The present embodiments may further relate to presenting the virtual operation of the virtual vehicles in a user interface for review by real-life operators of real-life vehicles.

According to certain aspects, systems and methods may generate a data model representative of real-life operation of a real-life vehicle by a real-life operator, where the data model may include various performance characteristics and metrics. Additionally, the data model may indicate certain real-life routes, roadways, or the like on which the real-life vehicle has operated, along with the frequency of such operation. The systems and methods may access the data model and, based on the data model, may determine operation of a virtual vehicle within a virtual environment, where the operation may include a set of virtual movements or maneuvers for the virtual vehicle to undertake within the virtual environment.

Additionally, the systems and methods may display, in a user interface, a visual representation of the virtual operation of the virtual vehicle for review by the real-life operator. The systems and methods may periodically or continuously update the virtual operation based on updated real-life vehicle operation data. In some scenarios, the real-life operator may recognize certain limitations and areas for improvement in the virtual operation of the virtual vehicle. Because the virtual operation of the virtual vehicle is based on the real-life operation of the real-life vehicle, the real-life operator may be motivated to modify or adjust his/her real-life vehicle operation in order to correct or address the limitations and areas for improvement identified in the virtual operation of the virtual vehicle. For example, the real-life operator may ascertain that he/she travels too fast on a work commute, and may make efforts to reduce his/her speed.

The systems and methods therefore offer numerous benefits. In particular, by incorporating virtual vehicle operation that corresponds to real-world vehicle operation, the systems and methods may effectively penetrate psychological barriers that vehicle operators possess in decreasing the perceived low risks associated with vehicle operation. Accordingly, vehicular safety may improve, thereby increasing the safety of vehicle operators and those otherwise affected by vehicle operation.

The embodiments as discussed herein describe virtual vehicle operation and real-life vehicle operation. It should be appreciated that the term "virtual" describes simulated features, components, individuals, and the like, that do not physically exist, have not physically occurred, or are not physically occurring in the real-world environment, but is rather made by software and hardware components to appear to physically exist. Further, it should be appreciated that the term "real-life" or "real-world" (or, in some cases, components without mention of the term "virtual"), in contrast, describes actual features, components, individuals, and the like, that do physically exist, have physically occurred, or are physically occurring in the real-world environment. In some embodiments, the virtual vehicle operation may be at least partially embodied in augmented reality, wherein virtual display data may be overlaid on real-world image data.

For example, a vehicle may be, an automobile, car, truck, tow truck, snowplow, boat, motorcycle, motorbike, scooter, recreational vehicle, or any other type of vehicle capable of roadway or water travel. According to some examples, the vehicle may be capable of operation by a vehicle operator, and may be capable of at least partial (or total) autonomous operation by a computer via the collection and analysis of various sensor data.

In various embodiments, a system or of the present disclosure may be permanently or removably installed in a vehicle, and may generally be an on-board computing device capable of performing various functionalities relating to analyzing vehicle operation data and facilitating virtual vehicle operation (and, in some cases, at least partial autonomous vehicle operation). Thus, the system may be particularly configured with particular elements to thereby be able to perform functions relating to these functionalities. Further, the computer may be installed by the manufacturer of the vehicle, or as an aftermarket modification or addition to the vehicle.

In various embodiments, a system of the present disclosure may include an electronic device that may be associated with a vehicle, where the electronic device may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistants), pager, computing device configured for wireless communication, and/or the like. The electronic device may include a location module (e.g., a GPS chip), an image sensor, an accelerometer, a clock, a gyroscope, a compass, a yaw rate sensor, a tilt sensor, and/or other sensors. In some examples, an electronic device may belong to or be otherwise associated with an individual, where the individual may be an operator of the vehicle or otherwise associated with the vehicle. For example, the individual may own the vehicle, may rent the vehicle for a variable or allotted time period, or may operate vehicle as part of a ride share. According to embodiments, the individual may carry or otherwise have possession of the electronic device during operation of the vehicle.

In various embodiments, a computer may operate in conjunction with an electronic device to perform any or all of the functions described herein as being performed by the vehicle. In other embodiments, the computer may perform all of the functionalities described herein, in which case the electronic device may not be present or may not be connected to the computer. In still other embodiments, the electronic device may perform all of the functionalities described herein. Still further, in some embodiments, the computer and/or the electronic device may perform any or all of the functions described herein in conjunction with one or more of the back-end components. For example, in some embodiments or under certain conditions, the electronic device and/or the computer may function as client devices that outsource some or most of the processing to one or more of the back-end components.

In various examples, a computer and/or an electronic device may communicatively interface with one or more on-board sensors that are disposed on or within a vehicle and that may be utilized to monitor the vehicle and the environment in which the vehicle is operating. In particular, the one or more on-board sensors may sense conditions associated with the vehicle and/or associated with the environment in which the vehicle is operating, and may generate sensor data indicative of the sensed conditions. For example, the sensor data may include a location and/or operation data indicative of operation of the vehicle. In some configurations, at least some of the on-board sensors may be fixedly disposed at various locations on the vehicle.

Additionally or alternatively, at least some of the on-board sensors may be incorporated within or connected to the computer. Still additionally or alternatively, in some configurations, at least some of the on-board sensors may be included on or within the electronic device. In some examples, the on-board sensors may communicate respective sensor data to the computer and/or to the electronic device, and the sensor data may be processed using the computer and/or the electronic device to determine when the vehicle is in operation as well as determine information regarding operation of the vehicle. In some situations, the on-board sensors may communicate respective sensor data indicative of the environment in which the vehicle is operating.

According to embodiments, the sensors may include one or more of a GPS unit, a radar unit, a LIDAR unit, an ultrasonic sensor, an infrared sensor, some other type of electromagnetic energy sensor, a microphone, a radio (e.g., to support wireless emergency alerts or an emergency alert system), an inductance sensor, a camera, an accelerometer, an odometer, a system clock, a gyroscope, a compass, a geo-location or geo-positioning unit, a location tracking sensor, a proximity sensor, a tachometer, a speedometer, and/or the like. Some of the on-board sensors (e.g., GPS, accelerometer, or tachometer units) may provide sensor data indicative of, for example, the vehicle's location, speed, position speeding, direction, responsiveness to controls, movement, etc.

Other sensors may be directed to the interior or passenger compartment of the vehicle, such as cameras, microphones, pressure sensors, weight sensors, thermometers, or similar sensors to monitor any passengers, operations of instruments included in the vehicle, operational behaviors of the vehicle, and/or conditions within the vehicle. For example, on-board sensors directed to the interior of the vehicle may provide sensor data indicative of, for example, in-cabin temperatures, in-cabin noise levels, data from seat sensors (e.g., indicative of whether or not an individual is using a seat, and thus the number of passengers being transported by the vehicle), data from seat belt sensors, data regarding the operations of user controlled devices such as windshield wipers, defrosters, traction control, mirror adjustment, interactions with on-board user interfaces, etc. Additionally, the on-board sensors may further detect and monitor the health of the occupant(s) of the vehicle (e.g., blood pressure, heart rate, blood sugar, temperature, etc.). Moreover, the on-board sensors may additionally detect various criminal acts, including auto thefts, car jackings, and/or the like. In these scenarios, the vehicle may initiate communications to relevant responders (e.g., a police station) of the detected act(s).

Some of the sensors disposed at the vehicle (e.g., radar, LIDAR, camera, or other types of units that operate by using electromagnetic energy) may actively or passively scan the environment external to the vehicle for obstacles (e.g., emergency vehicles, other vehicles, buildings, pedestrians, trees, gates, barriers, animals, etc.) and their movement, weather conditions (e.g., precipitation, wind, visibility, or temperature), roadways, road conditions (e.g., lane markings, potholes, road material, traction, or slope), road topography, traffic conditions (e.g., traffic density, traffic congestion, etc.), signs or signals (e.g., traffic signals, speed limits, other jurisdictional signage, construction signs, building signs or numbers, or control gates), and/or other information indicative of the environment of the vehicle. Information or data that is generated or received by the on-board sensors may be communicated to the computer and/or to the electronic device.

In some embodiments, systems of the present disclosure may include or be communicatively connected to one or more data storage devices or entities, which may be adapted to store data related to the operation of the vehicle, the environment and context in which the vehicle is operating, and/or other information. For example, the one or more data storage devices may be implemented as a data bank or a cloud data storage system, at least a portion of which may be locally accessed by systems of the present disclosure using a local access mechanism such as a function call or database access mechanism, and/or at least a portion of which may be remotely accessed by the systems of the present disclosure using a remote access mechanism such as a communication protocol. The systems of the present disclosure may access data stored in the one or more data storage devices when executing various functions and tasks associated with the present disclosure.

In various embodiments, systems of the present disclosure may further include a set of third-party sources, which may be any system, entity, repository, or the like, capable of obtaining and storing data that may be indicative of situations and circumstances associated with vehicle operation, or data associated with the operator of a vehicle. For example, one of the third-party sources may be a social network provider storing a set of contacts or connections associated with the operator of the vehicle. In some examples, the set of third-party sources may be included as part of the one or more data storage devices. In embodiments, the third-party source(s) may store data indicative of vehicle operation regulations. For example, the third-party source may store speed limit information, direction of travel information, lane information, and/or similar information. The third-party source(s) may also maintain or obtain real-time data indicative of traffic signals for roadways (e.g., which traffic signals currently have red lights or green lights). It should be appreciated that the one or more data storage devices or entities may additionally or alternatively store the data indicative of vehicle operation regulations.

In some embodiments, systems of the present disclosure includes a communication component configured to transmit information to and receive information from other external sources, such as emergency vehicles, other vehicles and/or infrastructure or environmental components disposed within the environment of the vehicle. The communication component may include one or more wireless transmitters or transceivers operating at any desired or suitable frequency or frequencies.

In some embodiments, the systems of the present disclosure may include one or more environmental communication components or devices that may be used for monitoring the status of one or more system components and/or for receiving data generated by other sensors that may be associated with, or may detect or be detected by, the vehicle and disposed at locations that are off-board the vehicle. As generally referred to herein, with respect to a vehicle, "off-board sensors" or "environmental sensors" are sensors that are not transported by the vehicle. The data collected by the off-board sensors is generally referred to herein as "sensor data," "off-board sensor data," or "environmental sensor data" with respect to the vehicle.

At least some of the off-board sensors may be disposed on or at the one or more infrastructure components or other types of components that are fixedly disposed within the environment in which a vehicle is traveling. In some examples, infrastructure components may include roadways, bridges, traffic signals, gates, switches, crossings, parking lots or garages, toll booths, docks, hangars, or other similar physical portions of a transportation system's infrastructure, for example. Other types of infrastructure components at which off-board sensors may be disposed may include a traffic light, a street sign, a railroad crossing signal, a construction notification sign, a roadside display configured to display messages, a billboard display, a parking garage monitoring device, etc. Off-board sensors that are disposed on or near infrastructure components may generate data relating to the presence and location of obstacles or of the infrastructure component itself, weather conditions, traffic conditions, operating status of the infrastructure component, and/or behaviors of various vehicles, pedestrians, and/or other moving objects within the vicinity of the infrastructure component, for example.

In some embodiments, one or more environmental communication devices may be communicatively connected (either directly or indirectly) to one or more off-board sensors, and thereby may receive information relating to the condition and/or location of the infrastructure components, of the environment surrounding the infrastructure components, and/or of the other vehicle(s) or objects within the environment of the vehicle. In some examples, the one or more environmental communication devices may receive and/or transmit information from the vehicle.

According to some embodiments, a computer and/or an electronic device may retrieve or otherwise access data from any combination of the sensors where the data is generated during real-world operation of the vehicle by the operator. The computer and/or the electronic device may generate a data model that is representative of the real-world operation of the vehicle by the operator, where the data model may include data related to performance characteristics associated with the real-world operation.

Additionally, the computer and/or the electronic device may facilitate virtual operation of a virtual vehicle by a virtual operator within a virtual environment. In particular, the virtual operation may be based on the data model representative of the real-world operation of the vehicle. According to embodiments, either or both of the computer and the electronic device may be configured with a user interface configured to present or display content. The computer and/or the electronic device may cause the user interface(s) to display or present the virtual environment, and depict the virtual operation of the virtual vehicle by the virtual operator within the virtual environment. Additionally, the user interface(s) may present statistics, data, and other information associated with the virtual operation of the virtual vehicle for review by the operator of the vehicle.

In various embodiments, a system of the present disclosure includes a memory, a set of sensors, a processor, a user interface, and a server (such as a server associated with a remote computing system). According to some examples, the processor and the user interface may be embodied within an electronic device associated with a vehicle and the set or sensors may be disposed on, throughout, or within various portions of the vehicle.

In various embodiments, a system of the present disclosure is configured to generate, via the set of sensors, a set of vehicle operation data that reflects operation of the vehicle by the operator. In some examples, the set of sensors may generate the set of vehicle operation data continuously or over the course or one or more time periods. In some examples, the set of sensors may provide the set of vehicle operation data to the processor, such as in real-time or near-real-time as the set of sensors generates the set of vehicle operation data.

In various embodiments, the processor may generate a data model based at least in part upon a portion of the set of vehicle operation data, where the data model may generally represent operation of the vehicle by the operator. In an embodiment, the data model may reflect the following vehicle operation or performance characteristics: speeding, braking, and/or steering, where each characteristic may have a relative performance associated therewith. For example, each vehicle operation characteristic in the data model may have a number rating on a scale from one (1) to ten (10).

In various embodiments, the processor may generate the data model according to various data analysis techniques, calculations, algorithms, and/or the like. Generally, the data analysis techniques process and analyze the raw sensor data and generate a set of information (e.g., structured information) from which vehicle operation metrics may be identified or determined. For example, the processor may process raw angular and linear speeding data, and may generate, for the data model, metrics corresponding to the speeding, braking, and steering performance of the vehicle operator. After generating the data model, the processor may provide the data model to the memory. Subsequently, the memory may store the data model.

In some embodiments, the processor may initiate a virtual trip, such as in response to a selection by a user (e.g., the operator of the vehicle), in response to an occurrence of a condition, or automatically at a certain time. According to embodiments, the virtual trip may have an associated virtual vehicle that is operated by a virtual operator within a virtual environment. In association with initiating the virtual trip, the processor may cause the user interface to display certain visual content associated with the virtual trip. For example, the user interface may display an indication of the virtual vehicle on a virtual map, and/or other content. Certain aspects of the virtual trip may be selectable or configurable by the operator, such as via the user interface, as further discussed herein. For example, the operator may select different virtual operators to "train" or accumulate statistics using the data model.

In some embodiments, prior to, after, or concurrently with initiating the virtual trip, the processor may retrieve the data model from the memory. In an optional implementation, the processor may additionally retrieve additional data (e.g., social networking data) from the server. According to embodiments, the social network data may be based on one or more contacts of the operator, where the one or more contacts may have one or more associated additional virtual vehicles with one or more additional virtual vehicle operators. Virtual operation of the one or more additional virtual vehicles may be based on one or more additional data models associated with real-life vehicle operation by the one or more contacts of the operator. According to embodiments, the virtual trip associated with the virtual operator may reflect at least some of the virtual operation of the one or more additional virtual vehicles, as further discussed herein.

In various embodiments, after retrieving the data model, the processor may determine, based on at least part of the data model, a set of virtual vehicle movements for the virtual vehicle. Generally, the set of virtual vehicle movements may reflect the vehicle operation characteristics included in the data model, where the relative performance level(s) of the set of virtual vehicle movements may correspond to the relative performance level(s) of the vehicle operation characteristics. For example, if the data model reflects that the operator has a score of 8.5 out of 10.0 in the speeding characteristic in real-life vehicle operation, the corresponding virtual vehicle operator may also have a score of 8.5 out of 10.0 in a virtual speeding characteristic, for which the set of virtual vehicle movements may account (i.e., the speeding of the virtual vehicle is very good). In an additional example, if the data model reflects that the operator has a score of 3.0 out of 10.0 in the steering characteristic in real-life vehicle operation, the corresponding virtual vehicle operator may also have a score of 3.0 out of 10.0 in a virtual steering characteristic, for which the set of virtual vehicle movements may account (i.e., the steering of the virtual vehicle is not good).

According to some embodiments, the set of virtual vehicle movements may be associated with one or more vignettes or scenes that may be incorporated into or associated with the virtual environment. Generally, a vignette may be a virtual recreation of an encounter or driving event that may occur in real life. For example, a vignette may be a virtual vehicle's interaction with a pedestrian walkway (i.e., the approach to, stopping at, and speeding from the pedestrian walkway); another vignette may be a virtual vehicle's approach to and right-hand turn through a red light; and another vignette may be a virtual vehicle's switching lanes in traffic. It should be appreciated that additional vignettes are envisioned.

In some embodiments, the processor may determine a set of virtual vehicle movements in associated with a given vignette based on a relevant portion of the data model. For example, for a pedestrian crosswalk vignette, if the data model indicates that the operator is prone to sudden stopping, a virtual vehicle movement may be a sudden stop by the virtual vehicle upon approach to the pedestrian crosswalk. As another example, for a right-hand turn through a red light vignette, if the data model indicates that the operator comes to a full stop at red lights prior to a right-hand turn, a virtual vehicle movement may similarly be a full stop by the virtual vehicle upon approach to the red light prior to turning right.

According to alternative or additional embodiments, the set of virtual vehicle movements may be associated with a game or challenge that may be incorporated into or associated with the virtual environment. Generally, a game may have a set of goals or challenges to be carried out by a virtual vehicle within the virtual environment. For example, a game may be a simulated delivery of one or more products or goods from a first virtual location to a second virtual location; and another game may be a ride share simulation facilitated by the virtual vehicle from a first virtual location to a second virtual location. It should be appreciated that additional games are envisioned.

In some embodiments, the processor may determine a set of virtual vehicle movements associated with a given game based on a relevant portion of the data model. For example, for a delivery game, if the data model indicates that the operator is prone to sudden speeding, a virtual vehicle movement may be a sudden speeding by the virtual vehicle upon initiating a delivery from a first location. As another example, for a ride sharing simulation with the virtual vehicle transporting a virtual passenger, if the data model indicates that the operator is prone to sudden stops, a virtual vehicle movement may be a sudden stop by the virtual vehicle approaching a stop sign.

In certain embodiments, after determining the set of virtual vehicle movements, the processor may provide data indicative of the set of virtual vehicle movements to the user interface. In turn, the user interface may display the set of virtual vehicle movements in association with the virtual trip. In some examples, the user interface may periodically or continuously display and update the virtual trip according to the determined set of virtual vehicle movements.

In embodiments, the operator of the vehicle may view the virtual trip displayed by the user interface, as well as any vignettes or games included therein. By viewing the virtual trip, the operator may be inclined or motived to adjust real-world vehicle operating behavior, especially to improve aspects or areas that may need improvement. For example, if the operator notices that the virtual operator is prone to sudden or hectic lane changes, the operator may make an effort to execute smoother real-life lane changes. As an additional example, if the operator notices that the virtual operator speeds through virtual school zones, the operator may make an effort to slow down through real-life school zones.

In some embodiments, if the virtual trip is associated with a game or challenge, the processor may determine a virtual reward based on the virtual operation of the virtual vehicle in association with the virtual trip, such as by determining that the virtual vehicle has achieved a virtual goal within the virtual environment (where the virtual reward may correspond to the virtual goal). Additionally, the processor may apply the virtual reward to an account of the operator.

In various embodiments, the user interface may display, such as upon completion of a real-world trip, a virtual trip summary of an associated virtual trip, where the virtual trip summary may contain scores, points, achievements, or the like, which may be associated with any vignettes or games included in the virtual trip. Additional or alternatively, the virtual trip summary may contain ratings for certain virtual vehicle operation characteristics for the corresponding virtual driver, which may correspond to the vehicle operation characteristics for the operator included in the data model. Accordingly, the operator may review the virtual trip summary and be motivated to modify or improve any real-world driving behaviors in response to reviewing the virtual trip summary.

Examples of Various Embodiments of the Present Disclosure

According to various embodiments, a computer-implemented method for training a virtual character of a telematics-based game includes: receiving telematics data associated with one or more real trips during which a user operated a real vehicle; determining, based at least in part upon the telematics data, a plurality of skill points associated with a plurality of real skills exhibited by the user during the one or more real trips; receiving, from the user, a selection of a virtual character, the virtual character having a character profile and a plurality of virtual ratings associated with a plurality of virtual skills; training the virtual character by at least updating, based at least in part upon the plurality of skill points, the plurality of virtual ratings; generating, based at least in part upon the character profile, one or more virtual occurrences to be encountered by the virtual character; determining, based at least in part upon the updated plurality of virtual ratings, one or more outcomes associated with the one or more virtual occurrences; updating the character profile by at least applying the one or more virtual occurrences based on the associated one or more outcomes to the virtual character; and presenting the updated character profile to the user. In some examples, the method is implemented according to method 200 of FIG. 2, and/or method 400 of FIG. 4, and/or configured to be implemented by system 100 of FIG. 1, system 300 of FIG. 3, device 5000 of FIG. 5, and/or system 7000 of FIG. 6.

In some embodiments, each virtual occurrence of the one or more virtual occurrences includes one or more virtual obstacles to be encountered by the virtual character.

In some embodiments, each outcome of the one or more outcomes correspond to a likelihood of success of the virtual character overcoming the one or more virtual obstacles in each virtual occurrence of the one or more virtual occurrences.

In some embodiments, the plurality of real skills includes a real steering skill, a real braking skill, a real speeding skill, and/or a real focus skill. In some examples, the plurality of virtual skills includes a virtual steering skill, a virtual braking skill, a virtual speeding skill, and/or a virtual focus skill.

In some embodiments, each virtual occurrence of the one or more virtual occurrences includes a steering difficulty corresponding to one or more virtual steering obstacles, a braking difficulty corresponding to one or more virtual braking obstacles, a speeding difficulty corresponding to one or more virtual speeding obstacles, and/or a focus difficulty corresponding to one or more virtual focus obstacles.

In some embodiments, determining the one or more outcomes includes determining the one or more outcomes based at least in part upon the steering difficulty, the braking difficulty, the speeding difficulty, the focus difficulty, a virtual steering rating of the virtual steering skill, a virtual braking rating of the virtual braking skill, a virtual speeding rating of the virtual speeding skill, and/or a virtual focus rating of the virtual focus skill.

In some embodiments, generating the one or more virtual occurrences includes generating the one or more virtual occurrences based further in part upon one or more unlocked regions of a virtual map of the telematics-based game.

In some embodiments, updating the character profile includes updating a vehicle condition of a virtual vehicle associated with the virtual character. In some examples, the vehicle condition is indicative of a degree of damage sustained by the virtual vehicle during the one or more virtual occurrences based on the associated one or more outcomes.

In some embodiments, presenting the updated character profile includes presenting the updated vehicle condition of the virtual vehicle to the user.

In some embodiments, training the virtual character includes: updating, based at least in part upon the plurality of skill points, a plurality of fill-levels corresponding to the plurality of virtual skills; and increasing one or more virtual ratings of the plurality of virtual ratings upon any of the fill-levels of the plurality of fill-levels exceeding one or more predetermined fill targets.

According to various embodiments, a system for training a virtual character of a telematics-based game includes: a data receiving module configured to receive telematics data associated with one or more real trips during which a user operated a real vehicle; a skill point determining module configured to determine, based at least in part upon the telematics data, a plurality of skill points associated with a plurality of real skills exhibited by the user during the one or more real trips; a user input module configured to receive, from the user, a selection of a virtual character, the virtual character having a character profile and a plurality of virtual ratings associated with a plurality of virtual skills; a character training module configured to train the virtual character by at least updating, based at least in part upon the plurality of skill points, the plurality of virtual ratings; a virtual occurrence generating module configured to generate, based at least in part upon the character profile, one or more virtual occurrences to be encountered by the virtual character; an outcome determining module configured to determine, based at least in part upon the updated plurality of virtual ratings, one or more outcomes associated with the one or more virtual occurrences; a character profile updating module configured to update the character profile by at least applying the one or more virtual occurrences based on the associated one or more outcomes to the virtual character; and a presenting module configured to present the updated character profile to the user. In some examples, the system is configured accordingly to system 100 of FIG. 1, system 300 of FIG. 3, device 5000 of FIG. 5, and/or system 7000 of FIG. 6, and/or configured to perform method 200 of FIG. 2, and/or method 400 of FIG. 4.

In some embodiments, the outcome determining module is configured to determine the one or more outcomes based at least in part upon: a plurality of occurrence difficulties including a steering difficulty associated with one or more virtual steering obstacles, a braking difficulty associated with one or more virtual braking obstacles, a speeding difficulty associated with one or more virtual speeding obstacles, and/or a focus difficulty associated with one or more virtual focus obstacles; and the plurality of virtual ratings corresponding to the plurality of virtual skills, the plurality of virtual ratings including a virtual steering rating of a virtual steering skill, a virtual braking rating of a virtual braking skill, a virtual speeding rating of a virtual speeding skill, and/o a virtual focus rating of a virtual focus skill.

In some embodiments, the virtual occurrence generating module is configured to generate the one or more virtual occurrences based further in part upon one or more unlocked regions of a virtual map of the telematics-based game.

In some embodiments, the character profile updating module is configured to update a vehicle condition of a virtual vehicle associated with the virtual character, the vehicle condition indicative of a degree of damage sustained by the virtual vehicle during the one or more virtual occurrences based on the associated one or more outcomes.

In some embodiments, the presenting module is configured to present the updated vehicle condition of the virtual vehicle to the user.

In some embodiments, the character training module is configured to: update, based at least in part upon the plurality of skill points, a plurality of fill-levels corresponding to the plurality of virtual skills; and increase one or more virtual ratings of the plurality of virtual ratings upon any of the fill-levels of the plurality of fill-levels exceeding one or more predetermined fill targets.

According to various embodiments, a non-transitory computer-readable medium with instructions stored thereon, that upon execution by a processor, causes the processor to perform: receiving telematics data associated with one or more real trips during which a user operated a real vehicle; determining, based at least in part upon the telematics data, a plurality of skill points associated with a plurality of real skills exhibited by the user during the one or more real trips; receiving, from the user, a selection of a virtual character, the virtual character having a character profile and a plurality of virtual ratings associated with a plurality of virtual skills; training the virtual character by at least updating, based at least in part upon the plurality of skill points, the plurality of virtual ratings; generating, based at least in part upon the character profile, one or more virtual occurrences to be encountered by the virtual character; determining, based at least in part upon the updated plurality of virtual ratings, one or more outcomes associated with the one or more virtual occurrences; updating the character profile by at least applying the one or more virtual occurrences based on the associated one or more outcomes to the virtual character; and presenting the updated character profile to the user. In some examples, the—transitory computer-readable medium, upon execution by a processor associated with system 100 of FIG. 1, system 300 of FIG. 3, device 5000 of FIG. 5, and/or system 7000 of FIG. 6, causes the corresponding system to perform method 200 of FIG. 2, and/or method 400 of FIG. 4.

One or More Examples of Machine Learning According to Various Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

One or More Examples of Modules According to Various Embodiments

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Additional Considerations According to Various Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for training a virtual character defined by a character profile and a plurality of virtual ratings associated with a plurality of virtual skills, the method comprising:
   receiving telematics data associated with one or more real trips during which a user operated a real vehicle;
   determining, based at least in part upon the telematics data, a plurality of skill points associated with a plurality of real skills exhibited by the user during the one or more real trips;
   training the virtual character by at least updating, based at least in part upon the plurality of skill points, the plurality of virtual ratings;
   generating, based at least in part upon the character profile, one or more virtual occurrences to be encountered by the virtual character;
   determining, based at least in part upon the plurality of virtual ratings, as updated, one or more outcomes associated with the one or more virtual occurrences;
   updating the character profile by at least applying the one or more virtual occurrences based on the associated one or more outcomes to the virtual character; and
   providing a reward based upon the one or more outcomes.

2. The computer-implemented method of claim 1, wherein each virtual occurrence of the one or more virtual occurrences includes one or more virtual obstacles to be encountered by the virtual character.

3. The computer-implemented method of claim 2, wherein each outcome of the one or more outcomes correspond to a likelihood of success of the virtual character overcoming the one or more virtual obstacles in each virtual occurrence of the one or more virtual occurrences.

4. The computer-implemented method of claim 3, wherein:
the plurality of real skills includes a real steering skill, a real braking skill, a real speeding skill, and a real focus skill; and
the plurality of virtual skills includes a virtual steering skill, a virtual braking skill, a virtual speeding skill, and a virtual focus skill.

5. The computer-implemented method of claim 4, wherein each virtual occurrence of the one or more virtual occurrences includes a steering difficulty corresponding to one or more virtual steering obstacles, a braking difficulty corresponding to one or more virtual braking obstacles, a speeding difficulty corresponding to one or more virtual speeding obstacles, and a focus difficulty corresponding to one or more virtual focus obstacles.

6. The computer-implemented method of claim 5, wherein the determining the one or more outcomes includes determining the one or more outcomes based at least in part upon the steering difficulty, the braking difficulty, the speeding difficulty, the focus difficulty, a virtual steering rating of the virtual steering skill, a virtual braking rating of the virtual braking skill, a virtual speeding rating of the virtual speeding skill, and a virtual focus rating of the virtual focus skill.

7. The computer-implemented method of claim 1, wherein the generating the one or more virtual occurrences includes generating the one or more virtual occurrences based further in part upon one or more unlocked regions of a virtual map.

8. The computer-implemented method of claim 1, wherein the updating the character profile includes updating a vehicle condition of a virtual vehicle associated with the virtual character, the vehicle condition being indicative of a degree of damage sustained by the virtual vehicle during the one or more virtual occurrences based on the associated one or more outcomes.

9. The computer-implemented method of claim 8, further comprising presenting the character profile, as updated, including the updated vehicle condition of the virtual vehicle to the user.

10. The computer-implemented method of claim 1, wherein the training the virtual character includes:
updating, based at least in part upon the plurality of skill points, a plurality of fill-levels corresponding to the plurality of virtual skills; and
increasing one or more virtual ratings of the plurality of virtual ratings upon any of the fill-levels of the plurality of fill-levels exceeding one or more predetermined fill targets.

11. The computer-implemented method of claim 1, further comprising presenting the character profile, as updated, to the user.

12. The computer-implemented method of claim 1, wherein:
providing the reward comprises providing the reward to the virtual character; and
updating the character profile comprises updating the character profile to include the reward.

13. The computer-implemented method of claim 1, wherein providing the reward comprises providing the reward to the user.

14. A system for training a virtual character, the system comprising:
a data receiving module configured to receive telematics data associated with one or more real trips during which a user operated a real vehicle;
a skill point determining module configured to determine, based at least in part upon the telematics data, a plurality of skill points associated with a plurality of real skills exhibited by the user during the one or more real trips;
a user input module configured to receive, from the user, a selection of a virtual character, the virtual character having a character profile and a plurality of virtual ratings associated with a plurality of virtual skills;
a character training module configured to train the virtual character by at least updating, based at least in part upon the plurality of skill points, the plurality of virtual ratings;
a virtual occurrence generating module configured to generate, based at least in part upon the character profile, one or more virtual occurrences to be encountered by the virtual character;
an outcome determining module configured to determine, based at least in part upon the plurality of virtual ratings, as updated, one or more outcomes associated with the one or more virtual occurrences;
a character profile updating module configured to update the character profile by at least applying the one or more virtual occurrences based on the associated one or more outcomes to the virtual character; and
a reward module configured to grant a reward based upon the one or more outcomes.

15. The system of claim 14, wherein the outcome determining module is configured to determine the one or more outcomes based at least in part upon:
a plurality of occurrence difficulties including a steering difficulty associated with one or more virtual steering obstacles, a braking difficulty associated with one or more virtual braking obstacles, a speeding difficulty associated with one or more virtual speeding obstacles, and a focus difficulty associated with one or more virtual focus obstacles; and
the plurality of virtual ratings corresponding to the plurality of virtual skills, the plurality of virtual ratings including a virtual steering rating of a virtual steering skill, a virtual braking rating of a virtual braking skill, a virtual speeding rating of a virtual speeding skill, and a virtual focus rating of a virtual focus skill.

16. The system of claim 14, wherein the virtual occurrence generating module is configured to generate the one or more virtual occurrences based further in part upon one or more unlocked regions of a virtual map.

17. The system of claim 14, wherein the character profile updating module is configured to update a vehicle condition of a virtual vehicle associated with the virtual character, the vehicle condition indicative of a degree of damage sustained by the virtual vehicle during the one or more virtual occurrences based on the associated one or more outcomes.

18. The system of claim 17, further comprising a presenting module configured to present the character profile, as updated, including the updated vehicle condition of the virtual vehicle to the user.

19. The system of claim 14, wherein the character training module is configured to:

update, based at least in part upon the plurality of skill points, a plurality of fill-levels corresponding to the plurality of virtual skills; and increase one or more virtual ratings of the plurality of virtual ratings upon any of the fill-levels of the plurality of fill-levels exceeding one or more predetermined fill targets.

20. The system of claim 14, further comprising a presenting module configured to present the character profile, as updated, to the user.

21. The system of claim 20, wherein the character profile updating module is configured to update the character profile to include the reward.

22. The system of claim 14, wherein the reward module is configured to grant the reward to the user.

* * * * *